US012062509B2

(12) United States Patent
Park et al.

(10) Patent No.: US 12,062,509 B2
(45) Date of Patent: Aug. 13, 2024

(54) ARC PATH FORMING UNIT AND DIRECT CURRENT RELAY INCLUDING SAME

(71) Applicant: LS ELECTRIC CO., LTD., Anyang-si (KR)

(72) Inventors: Jinhee Park, Anyang-si (KR); Jungwoo Yoo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 167 days.

(21) Appl. No.: 17/638,702

(22) PCT Filed: Apr. 7, 2020

(86) PCT No.: PCT/KR2020/004650
§ 371 (c)(1),
(2) Date: Feb. 25, 2022

(87) PCT Pub. No.: WO2021/040172
PCT Pub. Date: Mar. 4, 2021

(65) Prior Publication Data
US 2022/0415593 A1 Dec. 29, 2022

(30) Foreign Application Priority Data
Aug. 28, 2019 (KR) ........................ 10-2019-0106063

(51) Int. Cl.
*H01H 33/18* (2006.01)
*H01H 33/53* (2006.01)

(52) U.S. Cl.
CPC .......... *H01H 33/182* (2013.01); *H01H 33/53* (2013.01)

(58) Field of Classification Search
CPC ...... H01H 33/182; H01H 33/18; H01H 33/53; H01H 33/185; H01H 33/56; H01H 9/443;
(Continued)

(56) References Cited

U.S. PATENT DOCUMENTS

| | | | | |
|---|---|---|---|---|
| 8,749,331 B2 * | 6/2014 | Kashimura | ............ | H01H 51/22 335/126 |
| 8,853,585 B2 * | 10/2014 | Tachikawa | ............ | H01H 9/443 335/201 |

(Continued)

FOREIGN PATENT DOCUMENTS

| | | |
|---|---|---|
| CN | 104882335 A | 9/2015 |
| CN | 106252162 A | 12/2016 |

(Continued)

OTHER PUBLICATIONS

Translation of CN106710965 (Original document published May 24, 2017) (Year: 2017).*

(Continued)

*Primary Examiner* — William A Bolton
(74) *Attorney, Agent, or Firm* — K&L Gates LLP

(57) ABSTRACT

An arc path forming unit and a direct current relay including same are illustrated. The arc path forming unit according to an embodiment of the present invention comprises multiple magnets. Each of the magnets is configured to form a magnetic field at a point where each stationary contact is located. Each of the magnets located adjacent to each stationary contact is configured such that the opposite surfaces thereof have different polarities. A current flowing through a stationary contact and a movable contact and a magnetic field formed by each of the magnets generate an electromagnetic force. The electromagnetic force travels in a direction away from the center of the direct current relay. Therefore, a generated arc travels in the direction of the electromagnetic force and is thus moved in a direction away from the center of the direct current relay. Accordingly, the direct current relay can be prevented from being damaged.

20 Claims, 29 Drawing Sheets

(58) Field of Classification Search
CPC ........ H01H 9/446; H01H 50/54; H01H 50/60; H01H 50/38; H01H 51/02; H01H 51/01; H01H 51/22; H01H 36/0073
USPC .......... 218/23, 22, 24, 26, 31, 110; 335/133, 335/201, 202
See application file for complete search history.

(56) References Cited

U.S. PATENT DOCUMENTS

| | | | | |
|---|---|---|---|---|
| 8,946,580 | B2 * | 2/2015 | Hoffmann | H01H 9/443 218/26 |
| 9,330,872 | B2 * | 5/2016 | Kubono | H01H 50/546 |
| 9,460,871 | B2 * | 10/2016 | Naka | H01H 1/66 |
| 9,543,099 | B2 * | 1/2017 | An | H01H 51/2209 |
| 9,748,065 | B2 * | 8/2017 | Shima | H01H 50/54 |
| 10,068,731 | B2 * | 9/2018 | Zhong | H01H 50/06 |
| 2016/0133404 | A1 | 5/2016 | Zhong et al. | |
| 2016/0300677 | A1 * | 10/2016 | Park | H01H 9/443 |
| 2019/0006140 | A1 * | 1/2019 | Shi | H01H 50/546 |
| 2019/0035585 | A1 * | 1/2019 | Minowa | H01H 50/56 |

FOREIGN PATENT DOCUMENTS

| | | | |
|---|---|---|---|
| CN | 205920941 | U | 2/2017 |
| CN | 106710965 | A | 5/2017 |
| CN | 207250372 | U | 4/2018 |
| CN | 208027938 | U | 10/2018 |
| CN | 108922827 | A | 11/2018 |
| JP | 2012160427 | A | 8/2012 |
| JP | 2015159131 | A | 9/2015 |
| JP | 2016024864 | A | 2/2016 |
| JP | 2016134308 | A | 7/2016 |
| KR | 101216824 | B1 | 12/2012 |
| KR | 20140016936 | A | 2/2014 |
| KR | 101696952 | B1 | 1/2017 |
| KR | 102009875 | B1 | 8/2019 |
| WO | 2014083769 | A1 | 6/2014 |
| WO | 2016002116 | A1 | 1/2016 |

OTHER PUBLICATIONS

Office Action for related Japanese Application No. 2022-513510; action dated Dec. 27, 2022; (10 pages).

International Search Report for related International Application No. PCT/KR2020/004650; report dated Mar. 4, 2021; (5 pages).

Written Opinion for related International Application No. PCT/KR2020/004650; report dated Mar. 4, 2021; (5 pages).

Extended European Search Report for related European Application No. 20856789.1; action dated Jul. 18, 2023; (8 pages).

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

ARC PATH FORMING UNIT AND DIRECT CURRENT RELAY INCLUDING SAME

CROSS-REFERENCE TO RELATED APPLICATIONS

This application is the National Stage filing under 35 U.S.C. 371 of International Application No. PCT/KR2020/004650, filed on Apr. 7, 2020, which claims the benefit of earlier filing date and right of priority to Korea utility model Application No. 10-2019-0106063 filed on Aug. 28, 2019, the contents of which are all hereby incorporated by reference herein in their entirety.

TECHNICAL FIELD

The present disclosure relates to an arc path forming unit and a direct current (DC) relay including the same, and more particularly, to an arc path forming unit having a structure capable of forming an arc discharge path using electromagnetic force and preventing damage on a DC relay, and a DC relay including the same.

BACKGROUND

A direct current (DC) relay is a device that transmits a mechanical driving signal or a current signal using the principle of an electromagnet. The DC relay is also called a magnetic switch and generally classified as an electrical circuit switching device.

A DC relay includes a fixed contact and a movable contact. The fixed contact is electrically connected to an external power supply and a load. The fixed contact and the movable contact may be brought into contact with or separated from each other.

By the contact and separation between the fixed contact and the movable contact, electrical connection or disconnection through the DC relay is achieved. Such movement like the contact or separation is made by a drive unit that applies driving force.

When the fixed contact and the movable contact are separated from each other, an arc is generated between the fixed contact and the movable contact. The arc is a flow of high-pressure and high-temperature current. Accordingly, the generated arc must be rapidly discharged from the DC relay through a preset path.

An arc discharge path is formed by magnets provided in the DC relay. The magnets produce magnetic fields in a space where the fixed contact and the movable contact are in contact with each other. The arc discharge path may be formed by the formed magnetic fields and electromagnetic force generated by a flow of current.

Referring to FIG. 1, a space in which fixed contacts 1100 and a movable contact 1200 provided in a DC relay 1000 according to the prior art are in contact with each other is shown. As described above, permanent magnets 1300 are provided in the space.

The permanent magnets 1300 include a first permanent magnet 1310 disposed at an upper side and a second permanent magnet 1320 disposed at a lower side. A lower side of the first permanent magnet 1310 is magnetized to an N pole, and an upper side of the second permanent magnet 1320 is magnetized to an S pole. Accordingly, a magnetic field is generated in a direction from the upper side to the lower side.

(a) of FIG. 1 illustrates a state in which current flows in through the left fixed contact 1100 and flows out through the right fixed contact 1100. According to the Fleming's left hand rule, electromagnetic force is formed outward as indicated with a hatched arrow. Accordingly, a generated arc can be discharged to outside along the direction of the electromagnetic force.

On the other hand, (b) of FIG. 1 illustrates a state in which current flows in through the right fixed contact 1100 and flows out through the left fixed contact 1100. According to the Fleming's left hand rule, electromagnetic force is formed inward as indicated with a hatched arrow. Accordingly, a generated arc moves inward along the direction of the electromagnetic force.

Several members for driving the movable contact 1200 to be moved up and down (in a vertical direction) are provided in a center region of the DC relay 1000, that is, in a space between the fixed contacts 1100. For example, a shaft, a spring member inserted through the shaft, etc. are provided at the position.

Therefore, when an arc generated as illustrated in (b) of FIG. 1 is to moved toward the center region, there is a risk that various members provided at the position may be damaged by energy of the arc.

In addition, as illustrated in FIG. 1, a direction of electromagnetic force formed inside the related art DC relay 1000 depends on a direction of current flowing through the fixed contacts 1200. Therefore, current preferably flows only in a preset direction, namely, in a direction illustrated in (a) of FIG. 1.

In other words, a user must consider the direction of the current whenever using the DC relay. This may cause inconvenience to the use of the DC relay. In addition, regardless of the user's intention, a situation in which a flowing direction of current applied to the DC relay is changed due to an inexperienced operation or the like cannot be excluded.

In this case, the members disposed in the center region of the DC relay may be damaged by the generated arc. This may be likely to reduce the lifespan of the DC relay and cause a safety accident.

Korean Registration Application No. 10-1696952 discloses a DC relay. Specifically, a DC relay having a structure capable of preventing movement of a movable contact using a plurality of permanent magnets is disclosed.

The DC relay having the structure can prevent the movement of the movable contact by using the plurality of permanent magnets, but there is a limitation in that any method for controlling a direction of an arc discharge path is not considered.

Korean Registration Application No. 10-1216824 discloses a DC relay. Specifically, a DC relay having a structure capable of preventing arbitrary separation between a movable contact and a fixed contact using a damping magnet is disclosed.

However, the DC relay having the structure merely proposes a method for maintaining a contact state between the movable contact and the fixed contact. That is, there is a limitation in that a method for forming a discharge path for an arc generated when the movable contact and the fixed contact are separated from each other is not introduced.

Korean Registration Application No. 10-1696952 (Jan. 16, 2017)

Korean Registration Application No. 10-1216824 (Dec. 28, 2012)

DISCLOSURE

The present disclosure describes an arc path forming unit having a structure capable of solving those problems, and a DC relay having the same.

The present disclosure also describes an arc path forming unit having a structure in which a generated arc does not extend toward a center region, and a DC relay having the same.

The present disclosure further describes an arc path forming unit having a structure capable of forming an arc discharge path toward an outside, regardless of a direction of current applied to a fixed contact, and a DC relay having the same.

The present disclosure further describes an arc path forming unit having a structure capable of minimizing damage on members located at a center region due to a generated arc, and a DC relay having the same.

The present disclosure further describes an arc path forming unit having a structure capable of sufficiently extinguishing a generated arc while the generated arc moves, and a DC relay having the same.

The present disclosure further describes an arc path forming unit is having a structure capable of increasing strength of magnetic fields for forming an arc discharge path, and a DC relay having the same.

The present disclosure further describes an arc path forming unit having a structure capable of changing an arc discharge path without an excessive structural change, and a DC relay having the same.

In order to achieve the aspects of the subject matter disclosed herein, there is provided with an arc path forming unit that may include a magnet frame having an inner space, and having a plurality of surfaces surrounding the inner space, and magnets coupled to the plurality of surfaces to form magnetic fields in the inner space. The plurality of surfaces may include a first surface extending in one direction, and a second surface disposed to face the first surface and extending in the one direction. The magnets may include a first magnet located on one side of the first surface in the extending direction, and a second magnet located on another side of the second surface in the extending direction, the another side being opposite to the one side. A first facing surface of the first magnet facing the second magnet and a second facing surface of the second magnet facing the first magnet may have the same polarity.

The plurality of surfaces of the arc path forming unit may include a third surface extending between one end portion of the first surface and one end portion of the second surface in the extending direction at predetermined angles with the first surface and the second surface, and a fourth surface extending between another end portion of the first surface and another end portion of the second surface in the extending direction at predetermined angles with the first surface and the second surface, and facing the third surface. The magnets may include a third magnet located on the third surface, and a fourth magnet located on the fourth surface and disposed to face the third magnet. A facing surface of the third magnet facing the fourth magnet and a facing surface of the fourth magnet facing the third magnet may have the same polarity.

In the arc path forming unit, a polarity of the facing surfaces of the first magnet and the second magnet may be different from a polarity of the facing surfaces of the third magnet and the fourth magnet.

In the arc path forming unit, the facing surfaces of the first magnet and the second magnet may have an S pole, and the facing surfaces of the third magnet and the fourth magnet may have an N pole.

In the arc path forming unit, fixed contactors extending in the one direction and a movable contactor configured to be brought into contact with or separated from the fixed contactors may be accommodated in the inner space. The fixed contactors may include a first fixed contactor located at one side in the extending direction and a second fixed contactor located at another side in the extending direction. The first magnet and the second magnet may be disposed such that an imaginary line connecting the first magnet and the second magnet intersects with an imaginary line connecting the first fixed contactor and the second fixed contactor.

In the arc path forming unit, the first magnet and the second magnet may be disposed such that the imaginary line connecting the first magnet and the second magnet intersects with the imaginary line connecting the first fixed contactor and the second fixed contactor at a point where the first magnet and the second magnet are spaced apart by the same distance, respectively, from the first fixed contactor to the second fixed contactor.

In the arc path forming unit, the first magnet may be disposed more adjacent to any one of the third surface and the fourth surface, and the second magnet may be disposed more adjacent to another one of the third surface and the fourth surface.

In the arc path forming unit, the third magnet may be disposed more adjacent to any one of the first surface and the second surface, and the fourth magnet may be disposed more adjacent to another one of the first surface and the second surface.

In the arc path forming unit, the first magnet may be disposed to be in contact with any one of the third surface and the fourth surface, and the second magnet may be disposed to be in contact with another one of the third surface and the fourth surface.

In the arc path forming unit, fixed contactors and a movable contactor configured to be brought into contact with or separated from the fixed contactor may be accommodated in the inner space. The fixed contactors may include a first fixed contactor located at one side in the extending direction and a second fixed contactor located at another side in the extending direction. The first magnet and the second magnet may be disposed such that an imaginary line connecting one end portion of the first magnet facing another side of the first surface opposite to the one side in the extending direction and one end portion of the second magnet facing another side of the second surface opposite to the one side in the extending direction passes through a center of the space as a point where vertical distances to the first surface and the second surface are the same and vertical distances to the third surface and the fourth surface are the same.

To achieve the aspect of the subject matter disclosed herein, there is provided a direct current relay that may include fixed contactors extending in one direction, a movable contactor configured to be brought into contact with or separated from the fixed contactors, an arc path forming unit having an inner space for accommodating the fixed contactors and the movable contactor, and configured to produce a magnetic field in the inner space so as to form a discharge path of an arc generated when the fixed contactors and the movable contactor are separated from each other. The arc path forming unit may include a magnet frame having an inner space and having a plurality of surfaces surrounding the inner space, and magnets coupled to the plurality of surfaces. The plurality of surfaces may include a first surface extending in one direction, and a second surface disposed to face the first surface and extending in the one direction. The magnets may include a first magnet located on one side of the first surface in the extending direction, and a second magnet located on another side of the second surface in the extending direction, the another side being opposite to the one side. A first facing surface of the first magnet facing the second magnet and a second facing surface of the second magnet facing the first magnet may have a same polarity.

In the direct current relay, the plurality of surfaces may include a third surface extending between the first surface and the second surface at predetermined angles with the first surface and the second surface, and a fourth surface extending between the first surface and the second surface at predetermined angles with the first surface and the second surface, and facing the third surface. The magnets may include a third magnet located on the third surface, and a fourth magnet located on the fourth surface and facing the third magnet. A facing surface of the third magnet facing the fourth magnet and a facing surface of the fourth magnet facing the third magnet may have the same polarity. The facing surfaces of the first magnet and the second magnet may have a different polarity from a polarity of the facing surfaces of the third magnet and the fourth magnet.

In the direct current relay, the third magnet may be disposed more adjacent to any one of the first surface and the fourth surface, and the fourth magnet may be disposed more adjacent to another one of the first surface and the second surface.

In the direct current relay, the first magnet may be disposed to be in contact with any one of the third surface and the fourth surface, and the second magnet may be disposed to be in contact with another one of the third surface and the fourth surface.

In the direct current relay, the fixed contactor may include a first fixed contactor located at one side in the extending direction and a second fixed contactor located at another side in the extending direction. The first magnet and the second magnet may be disposed such that an imaginary line connecting one end portion of the first magnet facing another side of the first surface opposite to the one side in the extending direction and one end portion of the second magnet facing another side of the second surface opposite to the one side in the extending direction passes through a center of the space as a point where vertical distances to the first surface and the second surface are the same and vertical distances to the third surface and the fourth surface are the same.

According to the present disclosure, the following effects can be achieved.

First, an arc path forming unit may produce a magnetic field inside an arc chamber. The magnetic field may generate electromagnetic force, together with current flowing through fixed contactors and a movable contactor. The electromagnetic force may be generated in a direction away from a center of the arc chamber.

Accordingly, a generated arc can be moved in the same direction as the electromagnetic force to be away from the center of the arc chamber. This can prevent the generated arc from being moved to a center region of the arc chamber.

In addition, magnets facing each other may be disposed such that sides thereof facing each other have the same polarity. Similarly, magnets adjacent to each other may be disposed such that sides thereof adjacent to each other have different polarities.

That is, the electromagnetic force generated in the vicinity of each fixed contactor may advance away from the center region, irrespective of a current-flowing direction.

Therefore, a user does not need to connect a power source to the direct current relay in consideration of a direction in which an arc moves. This can result in improving user convenience.

Also, as described above, the generated arc can be moved in the direction away from the center region of the arc chamber.

Accordingly, various components located at the center region can be prevented from being damaged due to the generated arc.

In addition, the generated arc can extend toward an outside of the fixed contactor, which is a wider space, other than toward the center of a magnet frame, which is a narrow space, i.e., toward a space between the fixed contactors.

Accordingly, the arc can be sufficiently extinguished while moving along a long path.

The arc path forming unit may include a plurality of magnets. The adjacent magnets may produce a main magnetic field with each other. Each magnet may produce a sub magnetic field by itself. The sub magnetic field can strengthen the main magnetic field.

This can result in increasing strength of the electromagnetic force generated by the main magnetic field. Accordingly, an arc discharge path can be effectively formed.

Also, each magnet can generate the electromagnetic force in various directions simply by changing an arrangement method and a polarity. At this time, a magnet frame having the magnets does not have to be changed in structure and shape.

Therefore, an arc discharge direction can be easily changed even without excessively changing an entire structure of the arc path forming unit. This may result in improving user convenience.

DETAILED DESCRIPTION

Hereinafter, an arc path forming unit and a DC relay including the same according to implementations of the present disclosure will be described in detail with reference to the accompanying drawings.

In the following description, descriptions of some components may be omitted to help understanding of the present disclosure.

1. Definition of Terms

It will be understood that when an element is referred to as being "connected with" another element, the element can be connected with the another element or intervening elements may also be present.

In contrast, when an element is referred to as being "directly connected with" another element, there are no intervening elements present.

A singular representation used herein may include a plural representation unless it represents a definitely different meaning from the context.

The term "magnetize" used in the following description refers to a phenomenon in which an object exhibits magnetism in a magnetic field.

The term "polarities" used in the following description refers to different properties belonging to an anode and a cathode of an electrode. In one implementation, the polarities may be classified into an N pole or an S pole.

The term "electric connection" used in the following description means a state in which two or more members are electrically connected.

The term "arc path" used in the following description means a path through which a generated arc is moved or extinguished.

Figure 1:
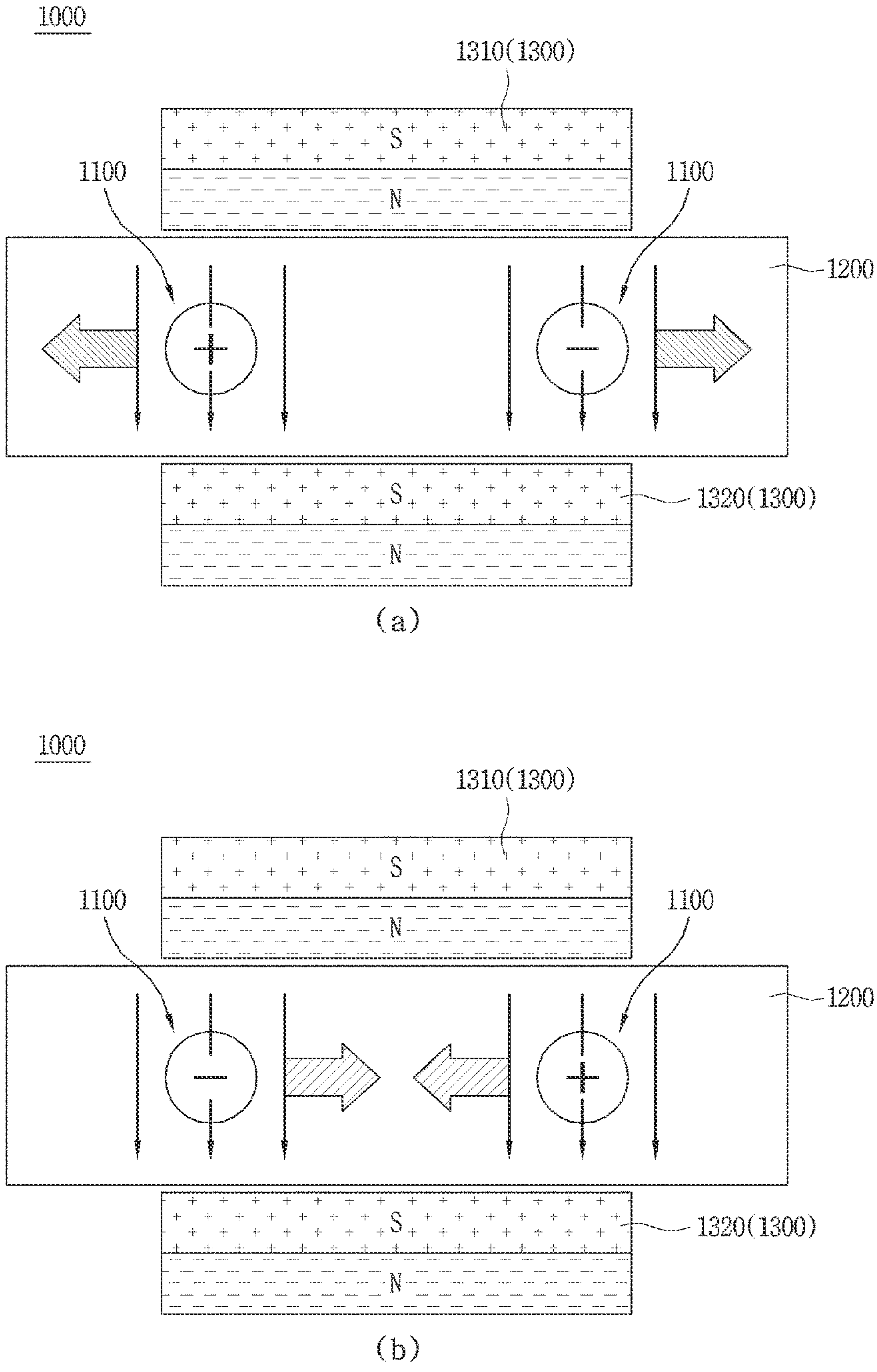
FIG. 1 is a planar view illustrating a process of forming an arc movement path in a direct current (DC) relay according to the related art.
Figure 2:
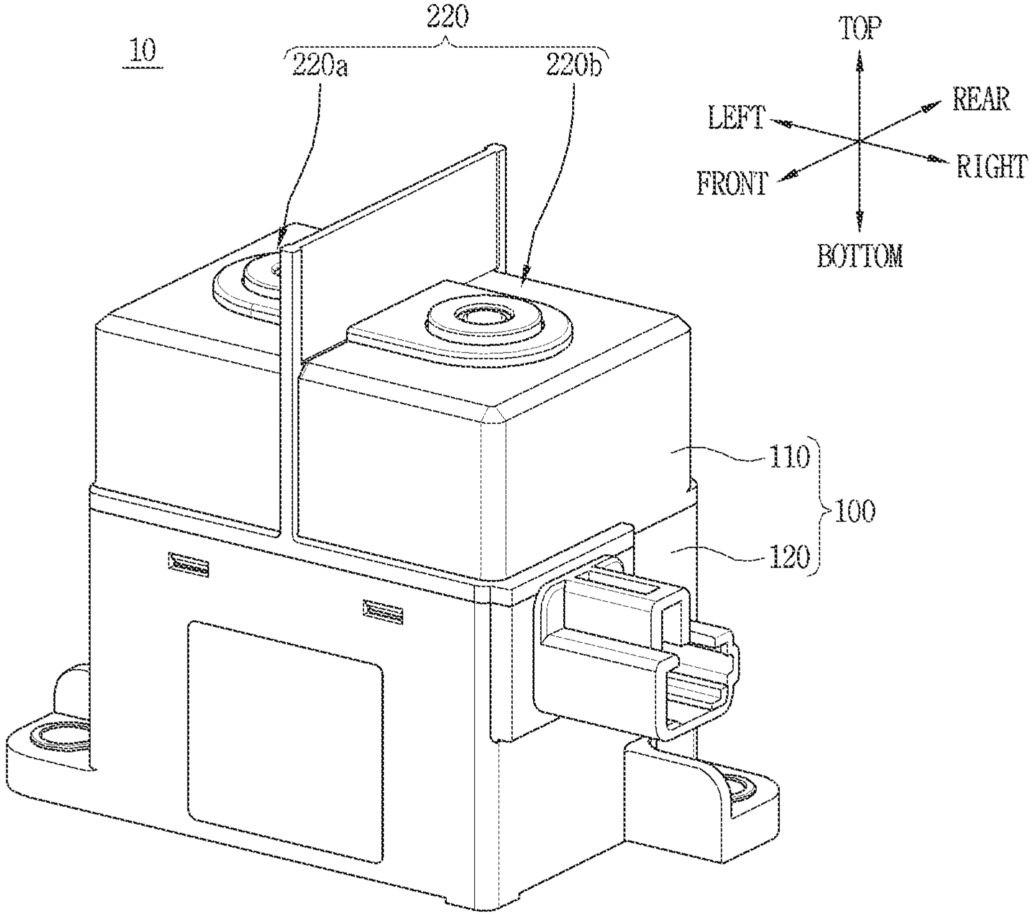
FIG. 2 is a perspective view of a DC relay in accordance with an implementation.

The terms "left", "right", "top", "bottom", "front" and "rear" used in the following description will be understood based on a coordinate system illustrated in FIG. 2.

Figure 3:
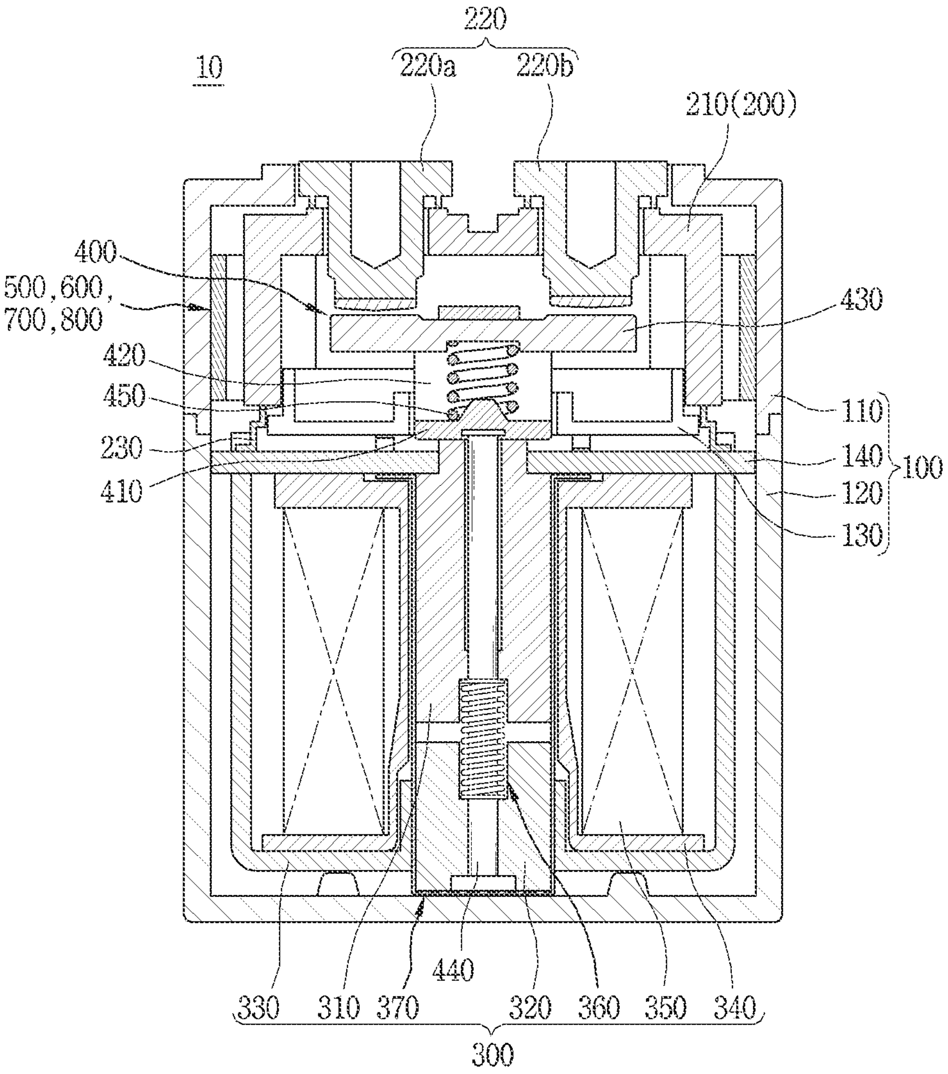
FIG. 3 is a cross-sectional view of the DC relay of FIG. 2.

2. Description of Configuration of DC Relay 10 According to Implementation Referring to FIGS. 2 and 3, a DC relay 10 according to an implementation may include a frame part 100, an opening/closing part 300, a core part 400, and a movable contactor part 400.

Referring to FIGS. 4 to 13, the DC relay 10 may include an arc path forming unit 500, 600. The arc path forming unit 500, 600, 700, 800 may form (define) a discharge path of a generated arc.

Hereinafter, each configuration of the DC relay 10 according to the implementation will be described with reference to the accompanying drawings, and the arc path forming unit 500, 600, 700, 800 will be described as a separate clause.

(1) Description of Frame Part 100

The frame part 100 may define appearance of the DC relay 10. A predetermined space may be defined inside the frame part 100. Various devices for the DC relay 10 to perform functions for applying or cutting off current transmitted from outside may be accommodated in the space.

That is, the frame part 100 may function as a kind of housing.

The frame part 100 may be formed of an insulating material such as synthetic resin. This may prevent an arbitrary electrical connection between inside and outside of the frame part 100.

The frame part 100 may include an upper frame 110, a lower frame 120, an insulating plate 130, and a supporting plate 140.

The upper frame 110 may define an upper side of the frame part 100. A predetermined space may be defined inside the upper frame 110.

The opening/closing part 200 and the movable contactor part 400 may be accommodated in an inner space of the upper frame 110. The arc path forming unit 500, 600, 700, 800 may also be accommodated in the inner space of the upper frame 110.

The upper frame 110 may be coupled to the lower frame 120. The insulating plate 130 and the supporting plate 140 may be disposed in a space between the upper frame 110 and the lower frame 120.

A fixed contactor (or stationary contactor, stationary contact) 220 of the opening/closing part 200 may be located on one side of the upper frame 110, for example, on an upper side of the upper frame 110 in the illustrated implementation. The fixed contactor 220 may be partially exposed to the upper side of the upper frame 110, to be electrically connected to an external power supply or a load.

To this end, a through hole through which the fixed contactor 220 is coupled may be formed at the upper side of the upper frame 110.

The lower frame 120 may define a lower side of the frame part 100. A predetermined space may be defined inside the lower frame 120. The core part 300 may be accommodated in the inner space of the lower frame 120.

The lower frame 120 may be coupled to the upper frame 110. The insulating plate 130 and the supporting plate 140 may be disposed in a space between the lower frame 120 and the upper frame 110.

The insulating plate 130 and the supporting plate 140 may electrically and physically isolate the inner space of the upper frame 110 and the inner space of the lower frame 120 from each other.

The insulating plate 130 may be located between the upper frame 110 and the lower frame 120. The insulating plate 130 may allow the upper frame 110 and the lower frame 120 to be electrically spaced apart from each other. To this end, the frame part 130 may be formed of an insulating material such as synthetic resin.

The insulating plate 130 can prevent arbitrary electrical connection between the opening/closing part 200, the movable contactor part 400, and the arc path forming unit 500, 600, 700, 800 that are accommodated in the upper frame 110 and the core part 300 accommodated in the lower frame 120.

A through hole (not illustrated) may be formed through a central portion of the insulating plate 130. A shaft 440 of the movable contactor part 400 may be coupled through the through hole (not illustrated) to be movable up and down.

The insulating plate 140 may be located on a lower side of the insulating plate 130. The insulating plate 130 may be supported by the supporting plate 140.

The supporting plate 140 may be located between the upper frame 110 and the lower frame 120.

The supporting plate 140 may allow the upper frame 110 and the lower frame 120 to be electrically spaced apart from each other. In addition, the supporting plate 140 may support the insulating plate 130.

For example, the supporting plate 140 may be formed of a magnetic material. In addition, the supporting plate 140 may configure a magnetic circuit together with a yoke 330 of the core part 300. The magnetic circuit may apply driving force to a movable core 320 of the core part 300 so as to move toward a fixed core 310.

A through hole (not illustrated) may be formed through a central portion of the supporting plate 140. The shaft 440 may be coupled through the through hole (not illustrated) to be movable up and down.

Therefore, when the movable core 320 is moved toward or away from the fixed core 310, the shaft 440 and a movable contactor (movable contact) 430 connected to the shaft 440 may also be moved in the same direction.

(2) Description of Opening/Closing Part 200

The opening/closing unit 200 may allow current to be applied to or cut off from the DC relay 10 according to an operation of the core part 300. Specifically, the opening/closing part 200 may allow or block an application of current as the fixed contactor 220 and the movable contactor 430 are brought into contact with or separated from each other.

The opening/closing part 200 may be accommodated in the inner space of the upper frame 110. The opening/closing part 200 may be electrically and physically spaced apart from the core part 300 by the insulating plate 130 and the supporting plate 140.

The opening/closing part 200 may include an arc chamber 210, a fixed contactor 220, and a sealing member 230.

In addition, the arc path forming unit 500, 600, 700, 800 may be disposed outside the arc chamber 210. The arc path forming unit 500, 600, 700, 800 may form a magnetic field for forming an arc path A.P of an arc generated inside the arc chamber 210. A detailed description thereof will be given later.

The arc chamber 210 may be configured to extinguish an arc at its inner space, when the arc is generated as the fixed contactor 220 and the movable contactor 430 are separated from each other. Therefore, the arc chamber 210 may also be referred to as an “arc extinguishing portion”.

The arc chamber 210 may hermetically accommodate the fixed contactor 220 and the movable contactor 430. That is, the fixed contactor 220 and the movable contactor 430 may be accommodated in the arc chamber 210. Accordingly, the arc generated when the fixed contactor 220 and the movable contactor 430 are separated from each other may not arbitrarily leak to the outside of the arc chamber 210.

The arc chamber 210 may be filled with extinguishing gas. The extinguishing gas may extinguish the generated arc and may be discharged to the outside of the DC relay 10 through a preset path. To this end, a communication hole (not illustrated) may be formed through a wall surrounding the inner space of the arc chamber 210.

The arc chamber 210 may be formed of an insulating material. In addition, the arc chamber 210 may be formed of a material having high pressure resistance and high heat resistance. This is because the generated arc is a flow of electrons of high-temperature and high-pressure. In one implementation, the arc chamber 210 may be formed of a ceramic material.

A plurality of through holes may be formed through an upper side of the arc chamber 210. The fixed contactor 220 may be coupled through each of the through holes (not illustrated).

In the illustrated implementation, the fixed contactor 220 may be provided by two, namely, a first fixed contactor **220*a* and a second fixed contactor 220*b*. Accordingly, the through hole (not illustrated) formed through the upper side of the arc chamber 210** may also be provided by two.

When the fixed contactor 220 is inserted through the through holes, the through holes may be sealed. That is, the fixed contactor 220 may be hermetically coupled to the through hole. Accordingly, the generated arc cannot be discharged to the outside through the through hole.

A lower side of the arc chamber 210 may be open. That is, the lower side of the arc chamber 210 may be in contact with the insulating plate 130 and the sealing member 230. That is, the lower side of the arc chamber 210 may be sealed by the insulating plate 130 and the sealing member 230.

Accordingly, the arc chamber 210 can be electrically and physically isolated from an outer space of the upper frame 110.

The arc extinguished in the arc chamber 210 may be discharged to the outside of the DC relay 10 through a preset path. In one implementation, the extinguished arc may be discharged to the outside of the arc chamber 210 through the communication hole (not illustrated).

The fixed contactor 220 may be brought into contact with or separated from the movable contactor 430, so as to electrically connect or disconnect the inside and the outside of the DC relay 10.

Specifically, when the fixed contactor 220 is brought into contact with the movable contactor 430, the inside and the outside of the DC relay 10 may be electrically connected. On the other hand, when the fixed contactor 220 is separated from the movable contactor 430, the electrical connection between the inside and the outside of the DC relay 10 may be released.

As the name implies, the fixed contactor 220 does not move. That is, the fixed contactor 220 may be fixedly coupled to the upper frame 110 and the arc chamber 210. Accordingly, the contact and separation between the fixed contactor 220 and the movable contactor 430 can be implemented by the movement of the movable contactor 430.

One end portion of the fixed contactor 220, for example, an upper end portion in the illustrated implementation, may be exposed to the outside of the upper frame 110. A power supply or a load may be electrically connected to the one end portion.

The fixed contactor 220 may be provided in plurality. In the illustrated implementation, the fixed contactor 220 may be provided by two, including a first fixed contactor **220*a* on a left side and a second fixed contactor 220*b*** on a right side.

The first fixed contactor 220*a* may be located to be biased to one side from a center of the movable contactor 430 in a longitudinal direction, namely, to the left in the illustrated implementation. Also, the second fixed contactor 220*b* may be located to be biased to another side from the center of the movable contactor 430 in the longitudinal direction, namely, to the right in the illustrated implementation.

A power supply may be electrically connected to any one of the first fixed contactor 220*a* and the second fixed contactor 220*b*. Also, a load may be electrically connected to another one of the first fixed contactor 220*a* and the second fixed contactor 220*b*.

The DC relay 10 may form an arc path A.P regardless of a direction of the power supply or load connected to the fixed contactor 220. This can be achieved by the arc path forming unit 500, 600, 700, 800 and a detailed description thereof will be described later.

Another end portion of the fixed contactor 220, for example, a lower end portion in the illustrated implementation may extend toward the movable contactor 430.

When the movable contactor 430 is moved toward the fixed contactor 220, namely, upward in the illustrated implementation, the lower end portion of the fixed contactor 220 may be brought into contact with the movable contactor 430. Accordingly, the outside and the inside of the DC relay 10 can be electrically connected.

The lower end portion of the fixed contactor 220 may be located inside the arc chamber 210.

When control power is cut off, the movable contactor 430 may be separated from the fixed contactor 220 by elastic force of a return spring 360.

At this time, as the fixed contactor 220 and the movable contactor 430 are separated from each other, an arc may be generated between the fixed contactor 220 and the movable contactor 430. The generated arc may be extinguished by the extinguishing gas inside the arc chamber 210, and may be discharged to the outside along a path formed by the arc path forming unit 500, 600, 700, 800.

The sealing member 230 may block arbitrary communication between the arc chamber 210 and the inner space of the upper frame 110. The sealing member 230 may seal the lower side of the arc chamber 210 together with the insulating plate 130 and the supporting plate 140.

In detail, an upper side of the sealing member 230 may be coupled to the lower side of the arc chamber 210. A radially inner side of the sealing member 230 may be coupled to an outer circumference of the insulating plate 130, and a lower side of the sealing member 230 may be coupled to the supporting plate 140.

Accordingly, the arc generated in the arc chamber 210 and the arc extinguished by the extinguishing gas may not arbitrarily flow into the inner space of the upper frame 110.

In addition, the sealing member 230 may prevent an inner space of a cylinder 370 from arbitrarily communicating with the inner space of the frame part 100.

(3) Description of Core Part 300

The core part 300 may allow the movable contactor part 400 to move upward as control power is applied. In addition, when the control power is not applied any more, the core part 300 may allow the movable contactor part 400 to move downward again.

As described above, the core part 300 may be electrically connected to an external power supply (not illustrated) to receive control power.

The core part 300 may be located below the opening/closing part 200. The core part 300 may be accommodated in the lower frame 120. The core part 300 and the opening/closing part 200 may be electrically and physically spaced apart from each other by the insulating plate 130 and the supporting plate 140.

The movable contactor part 400 may be located between the core part 300 and the opening/closing part 200. The movable contactor part 400 may be moved by driving force applied by the core part 300. Accordingly, the movable contactor 430 and the fixed contactor 220 can be brought into contact with each other so that the DC relay 10 can be electrically connected.

The core part 300 may include a fixed core 310, a movable core 320, a yoke 330, a bobbin 340, coils 350, a return spring 360, and a cylinder 370.

The fixed core 310 may be magnetized by a magnetic field generated in the coils 350 so as to generate electromagnetic attractive force. The movable core 320 may be moved toward the fixed core 310 (upward in FIG. 3) by the electromagnetic attractive force.

The fixed core 310 may not move. That is, the fixed core 310 may be fixedly coupled to the supporting plate 140 and the cylinder 370.

The movable core 310 may have any shape capable of being magnetized by the magnetic field so as to generate electromagnetic force. In one implementation, the fixed core 310 may be implemented as a permanent magnet or an electromagnet.

The fixed core 310 may be partially accommodated in an upper space inside the cylinder 370. Further, an outer circumference of the fixed core 310 may come in contact with an inner circumference of the cylinder 370.

The fixed core 310 may be located between the supporting plate 140 and the movable core 320.

A through hole (not illustrated) may be formed through a central portion of the fixed core 310. The shaft 440 may be coupled through the through hole (not illustrated) to be movable up and down.

The fixed core 310 may be spaced apart from the movable core 320 by a predetermined distance. Accordingly, a distance by which the movable core 320 can move toward the fixed core 310 may be limited to the predetermined distance. Accordingly, the predetermined distance may be defined as a "moving distance of the movable core 320".

One end portion of the return spring 360, namely, an upper end portion in the illustrated implementation may be brought into contact with the lower side of the fixed core 310. When the movable core 320 is moved upward as the fixed core 310 is magnetized, the return spring 360 may be compressed and store restoring force.

Accordingly, when application of control power is released and the magnetization of the fixed core 310 is terminated, the movable core 320 may be returned to the lower side by the restoring force.

When control power is applied, the movable core 320 may be moved toward the fixed core 310 by the electromagnetic attractive force generated by the fixed core 310.

As the movable core 320 is moved, the shaft 440 coupled to the movable core 320 may be moved toward the fixed core 310, namely, upward in the illustrated implementation. In addition, as the shaft 440 is moved, the movable contactor part 400 coupled to the shaft 440 may be moved upward.

Accordingly, the fixed contactor 220 and the movable contactor 430 may be brought into contact with each other so that the DC relay 10 can be electrically connected to the external power supply and the load.

The movable core 320 may have any shape capable of receiving attractive force by electromagnetic force. In one implementation, the movable core 320 may be formed of a magnetic material or implemented as a permanent magnet or an electromagnet.

The movable core 320 may be accommodated inside the cylinder 370. Also, the movable core 320 may be moved inside the cylinder 370 in the longitudinal direction of the cylinder 370, for example, in the vertical direction in the illustrated implementation.

Specifically, the movable core 320 may move toward the fixed core 310 and away from the fixed core 310.

The movable core 320 may be coupled to the shaft 440. The movable core 320 may move integrally with the shaft 440. When the movable core 320 moves upward or downward, the shaft 440 may also move upward or downward. Accordingly, the movable contactor 430 may also move upward or downward.

The movable core 320 may be located below the fixed core 310. The movable core 320 may be spaced apart from the fixed core 310 by a predetermined distance. As described above, the predetermined distance may be defined as the moving distance of the movable core 320 in the vertical (up/down) direction.

The movable core 320 may extend in the longitudinal direction. A hollow portion extending in the longitudinal direction may be recessed into the movable core 320 by a predetermined distance. The return spring 360 and a lower side of the shaft 440 coupled through the return spring 360 may be partially accommodated in the hollow portion.

A through hole may be formed through a lower side of the hollow portion in the longitudinal direction. The hollow portion and the through hole may communicate with each other. A lower end portion of the shaft 440 inserted into the hollow portion may proceed (be inserted) toward the through hole.

A space portion may be recessed into a lower end portion of the movable core 320 by a predetermined distance. The space portion may communicate with the through hole. A lower head portion of the shaft 440 may be located in the space portion.

The yoke 330 may form a magnetic circuit as control power is applied. The magnetic circuit formed by the yoke 330 may control a direction of electromagnetic field generated by the coils 350.

Accordingly, when control power is applied, the coils 350 may generate a magnetic field in a direction in which the movable core 320 moves toward the fixed core 310. The yoke 330 may be formed of a conductive material capable of allowing electrical connection.

The yoke 330 may be accommodated inside the lower frame 120. The yoke 330 may surround the coils 350. The coils 350 may be accommodated in the yoke 330 with being spaced apart from an inner circumferential surface of the yoke 330 by a predetermined distance.

The bobbin 340 may be accommodated inside the yoke 330. That is, the yoke 330, the coils 350, and the bobbin 340 on which the coils 350 are wound may be sequentially disposed in a direction from an outer circumference of the lower frame 120 to a radially inner side.

An upper side of the yoke 330 may come in contact with the supporting plate 140. In addition, the outer circumference of the yoke 330 may come in contact with an inner circumference of the lower frame 120 or may be located to be spaced apart from the inner circumference of the lower frame 120 by a predetermined distance.

The coils 350 may be wound around the bobbin 340. The bobbin 340 may be accommodated inside the yoke 330.

The bobbin 340 may include upper and lower portions formed in a flat shape, and a cylindrical pole portion extending in the longitudinal direction to connect the upper and lower portions. That is, the bobbin 340 may have a bobbin shape.

The upper portion of the bobbin 340 may come in contact with the lower side of the supporting plate 140. The coils 350 may be wound around the pole portion of the bobbin 340. A wound thickness of the coils 350 may be equal to or smaller than a diameter of the upper and lower portions of the bobbin 340.

A hollow portion may be formed through the pole portion of the bobbin 340 extending in the longitudinal direction. The cylinder 370 may be accommodated in the hollow portion. The pole portion of the bobbin 340 may be disposed to have the same central axis as the fixed core 310, the movable core 320, and the shaft 440.

The coils 350 may generate a magnetic field as control power is applied. The fixed core 310 may be magnetized by the electric field generated by the coils 350 and thus an electromagnetic attractive force may be applied to the movable core 320.

The coils 350 may be wound around the bobbin 340. Specifically, the coils 350 may be wound around the pole portion of the bobbin 340 and stacked on a radial outside of the pole portion. The coils 350 may be accommodated inside the yoke 330.

When control power is applied, the coils 350 may generate a magnetic field. In this case, strength or direction of the magnetic field generated by the coils 350 may be controlled by the yoke 330. The fixed core 310 may be magnetized by the electric field generated by the coils 350.

When the fixed core 310 is magnetized, the movable core 320 may receive electromagnetic force, namely, attractive force in a direction toward the fixed core 310. Accordingly, the movable core 320 can be moved toward the fixed core 310, namely, upward in the illustrated implementation.

The return spring 360 may apply restoring force to return the movable core 320 to its original position when control power is not applied any more after the movable core 320 is moved toward the fixed core 310.

The return spring 360 may store restoring force while being compressed as the movable core 320 is moved toward the fixed core 310. At this time, the stored restoring force may preferably be smaller than the electromagnetic attractive force, which is exerted on the movable core 320 as the fixed core 310 is magnetized. This can prevent the movable core 320 from being returned to its original position by the return spring 360 while control power is applied.

When control power is not applied any more, only the restoring force by the return spring 360 may be exerted on the movable core 320. Of course, gravity due to an empty weight of the movable core 320 may also be applied to the movable core 320. Accordingly, the movable core 320 can be moved away from the fixed core 310 to be returned to the original position.

The return spring 360 may be formed in any shape which is deformed to store the restoring force and returned to its original state to transfer the restoring force to outside. In one implementation, the return spring 360 may be configured as a coil spring.

The shaft 440 may be coupled through the return spring 360. The shaft 440 may move up and down regardless of the deformation of the return spring 360 in the coupled state with the return spring 360.

The return spring 360 may be accommodated in the hollow portion recessed in the upper side of the movable core 320. In addition, one end portion of the return spring 360 facing the fixed core 310, namely, an upper end portion in the illustrated implementation may be accommodated in a hollow portion recessed into a lower side of the fixed core 310.

The cylinder 370 may accommodate the fixed core 310, the movable core 320, the return spring 360, and the shaft 440. The movable core 320 and the shaft 440 may move up and down in the cylinder 370.

The cylinder 370 may be located in the hollow portion formed through the pole portion of the bobbin 340. An upper end portion of the cylinder 370 may come in contact with a lower surface of the supporting plate 140.

A side surface of the cylinder 370 may come in contact with an inner circumferential surface of the pole portion of the bobbin 340. An upper opening of the cylinder 370 may be closed by the fixed core 310. A lower surface of the cylinder 370 may come in contact with an inner surface of the lower frame 120.

(4) Description of Movable Contactor Part 400

The movable contactor part 400 may include the movable contactor 430 and components for moving the movable contactor 430. The movable contactor part 400 may allow the DC relay 10 to be electrically connected to an external power supply and a load.

The movable contactor part 400 may be accommodated in the inner space of the upper frame 110. The movable contactor part 400 may be accommodated in the arc chamber 210 to be movable up and down.

The fixed contactor 220 may be located above the movable contactor part 400. The movable contactor part 400 may be accommodated in the arc chamber 210 to be movable in a direction toward the fixed contactor 220 and a direction away from the fixed contactor 220.

The core part 300 may be located below the movable contactor part 400. The movement of the movable contactor part 400 may be achieved by the movement of the movable core 320.

The movable contactor part 400 may include a housing 410, a cover 420, a movable contactor 430, a shaft 440, and an elastic portion 450.

The housing 410 may accommodate the movable contactor 430 and the elastic portion 450 elastically supporting the movable contactor 430.

Figure 5:
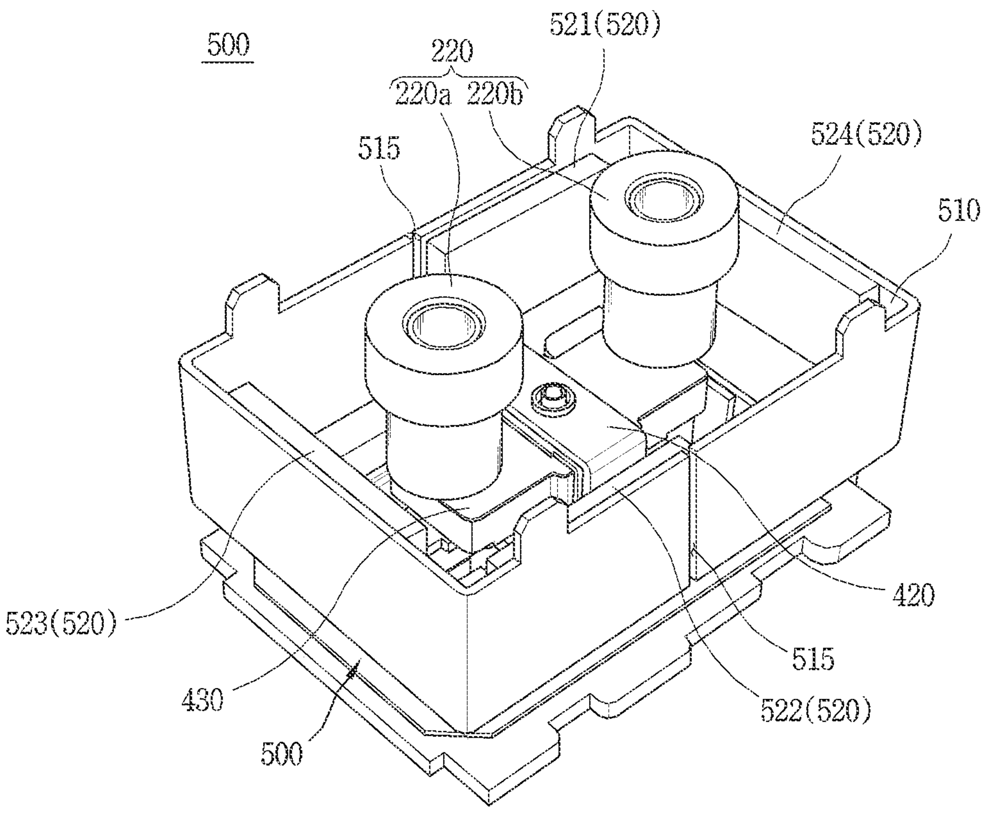
FIG. 5 is a perspective view illustrating the partially-open DC relay of FIG. 2.

In the illustrated implementation, the housing 410 may be formed such that one side and another side opposite to the one side are open (see FIG. 5). The movable contactor 430 may be inserted through the openings.

The unopened side of the housing 410 may surround the accommodated movable contactor 430.

The cover 420 may be provided on a top of the housing 410. The cover 420 may cover an upper surface of the movable contactor 430 accommodated in the housing 410.

The housing 410 and the cover 420 may preferably be formed of an insulating material to prevent unexpected electrical connection. In one implementation, the housing 410 and the cover 420 may be formed of a synthetic resin or the like.

A lower side of the housing 410 may be connected to the shaft 440. When the movable core 320 connected to the shaft 440 is moved upward or downward, the housing 410 and the movable contactor 430 accommodated in the housing 410 may also be moved upward or downward.

The housing 410 and the cover 420 may be coupled by arbitrary members. In one implementation, the housing 410 and the cover 420 may be coupled by coupling members (not illustrated) such as a bolt and a nut.

The movable contactor 430 may come in contact with the fixed contactor 220 when control power is applied, so that the DC relay 10 can be electrically connected to an external power supply and a load. When control power is not applied, the movable contactor 430 may be separated from the fixed contactor 220 such that the DC relay 10 can be electrically disconnected from the external power supply and the load.

The movable contactor 430 may be located adjacent to the fixed contactor 220.

An upper side of the movable contactor 430 may be covered by the cover 420. In one implementation, a portion of the upper surface of the movable contactor 430 may be in contact with a lower surface of the cover 420.

A lower side of the movable contactor 430 may be elastically supported by the elastic portion 450. In order to prevent the movable contactor 430 from being arbitrarily moved downward, the elastic portion 450 may elastically support the movable contactor 430 in a compressed state by a predetermined distance.

The movable contactor 430 may extend in the longitudinal direction, namely, in left and right directions in the illustrated implementation. That is, a length of the movable contactor 430 may be longer than its width. Accordingly, both end portions of the movable contactor 430 in the longitudinal direction, accommodated in the housing 410, may be exposed to the outside of the housing 410.

Contact protrusions may protrude upward from the both end portions by predetermined distances. The fixed contactor 220 may be brought into contact with the contact protrusions.

The contact protrusions may be formed at positions corresponding to the fixed contactors 220*a* and 220*b*, respectively. Accordingly, the moving distance of the movable contactor 430 can be reduced and contact reliability between the fixed contactor 220 and the movable contactor 430 can be improved.

The width of the movable contactor 430 may be the same as a spaced distance between the side surfaces of the housing 410. That is, when the movable contactor 430 is accommodated in the housing 410, both side surfaces of the movable contactor 430 in a widthwise direction may be brought into contact with inner sides of the side surfaces of the housing 410.

Accordingly, the state where the movable contactor 430 is accommodated in the housing 410 can be stably maintained.

The shaft 440 may transmit driving force, which is generated in response to the operation of the core part 300, to the movable contactor part 400. Specifically, the shaft 440 may be connected to the movable core 320 and the movable contactor 430. When the movable is moved upward or downward, the movable contactor 430 may also be moved upward or downward by the shaft 440.

The shaft 440 may extend in the longitudinal direction, namely, in the up and down (vertical) direction in the illustrated implementation.

The lower end portion of the shaft 440 may be inserted into the movable core 320. When the movable core 320 is moved up and down, the shaft 440 may also be moved up and down together with the movable core 320.

A body portion of the shaft 440 may be coupled through the fixed core 310 to be movable up and down. The return spring 360 may be coupled through the body portion of the shaft 440.

Specifically, an upper end portion of the shaft 440 may be coupled to the housing 410. When the movable core 320 is moved, the shaft 440 and the housing 410 may also be moved.

The upper and lower end portions of the shaft 440 may have a larger diameter than the body portion of the shaft. Accordingly, the coupled state of the shaft 440 to the housing 410 and the movable core 320 can be stably maintained.

The elastic portion 450 may elastically support the movable contactor 430. When the movable contactor 430 is brought into contact with the fixed contactor 220, the movable contactor 430 may tend to be separated from the fixed contactor 220 due to electromagnetic repulsive force.

At this time, the elastic portion 450 can elastically support the movable contactor 430 to prevent the movable contactor 430 from being arbitrarily separated from the fixed contactor 220.

The elastic portion 450 may be arbitrarily configured to be capable of storing restoring force by being deformed and applying the stored restoring force to another member. In one implementation, the elastic portion 450 may be configured as a coil spring.

One end portion of the elastic portion 450 facing the movable contactor 430 may come in contact with the lower side of the movable contactor 430. In addition, another end portion opposite to the one end portion may come in contact with the upper side of the housing 410.

The elastic portion 450 may elastically support the movable contactor 430 in a state of storing the restoring force by being compressed by a predetermined length. Accordingly, even if electromagnetic repulsive force is generated between the movable contactor 430 and the fixed contactor 220, the movable contactor 430 cannot be arbitrarily moved.

A protrusion (not illustrated) inserted into the elastic portion 450 may protrude from the lower side of the movable contactor 430 to enable stable coupling of the elastic portion 450. Similarly, a protrusion (not illustrated) inserted into the elastic portion 450 may also protrude from the upper side of the housing 410.

3. Description of Arc Path Forming Unit 500, 600, 700, 800 According to Implementations The DC relay 10 according to the implementation may include an arc path forming unit 500, 600, 700, 800. The arc path forming unit 500, 600, 700, 800 may be configured to form a path for discharging an arc generated when the fixed contactor 220 and the movable contactor 430 are separated from each other in the arc chamber 210.

Hereinafter, an arc path A.P generated by the arc path forming unit 500, 600, 700, 800 according to each implementation will be described in detail, with reference to FIGS. 4 to 13.

Figure 4:
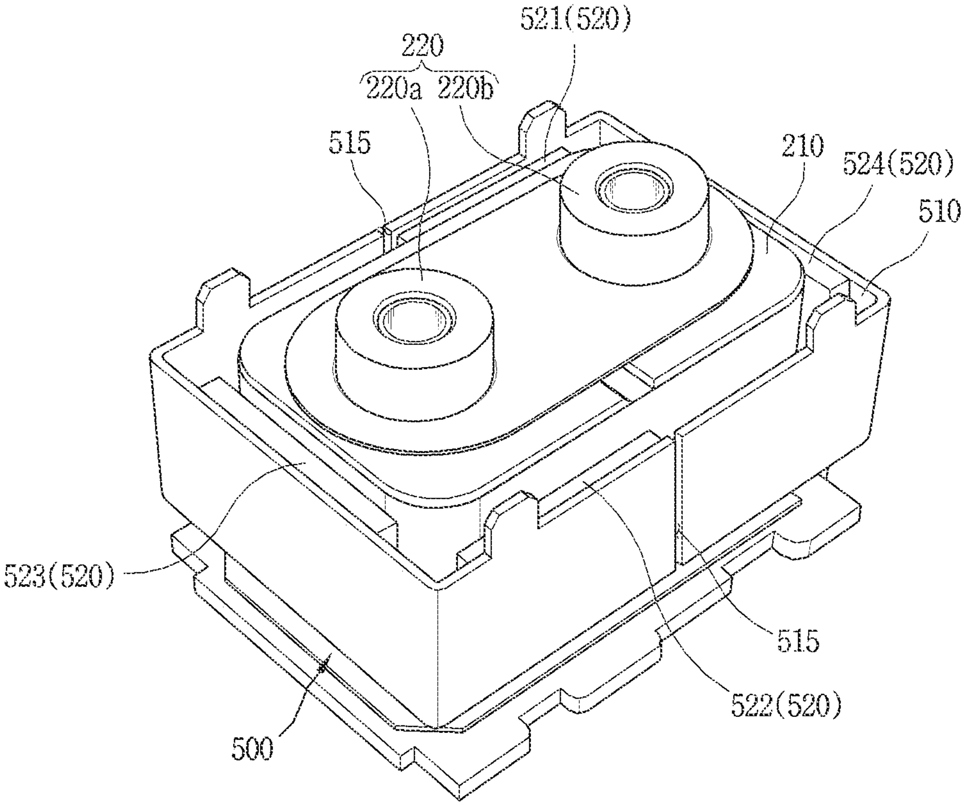
FIG. 4 is a perspective view illustrating the partially-open DC relay of FIG. 2.

In the implementation illustrated in FIGS. 4 and 5, the arc path forming unit 500, 600, 700, 800 may be located outside the arc chamber 210. The arc path forming unit 500, 600, 700, 800 may surround the arc chamber 210.

It will be understood that the illustration of the arc chamber 210 is omitted in the implementation illustrated in FIGS. 6 to 13.

The arc path forming unit 500, 600, 700, 800 may form a magnetic path inside the arc chamber 210. The magnetic path may define an arc path A.P.

(1) Description of Arc Path Forming Unit 500 According to One Implementation Hereinafter, the arc path forming unit 500 according to one implementation will be described in detail, with reference to FIGS. 6 and 7.

In the illustrated implementation, the arc path forming unit 500 may include a main frame 510 and magnets 520.

The magnet frame 510 may define a frame of the arc path forming unit 500. The magnet 520 may be disposed in the magnet frame 510. In one implementation, the magnet 520 may be coupled to the magnet frame 510.

The magnet frame 510 may have a rectangular cross-section extending in a longitudinal direction, for example, to left and right sides in the illustrated implementation. The shape of the magnet frame 510 may vary depending on shapes of the upper frame 110 and the arc chamber 210.

The magnet frame 510 may include a first surface 511, a second surface 512, a third surface 513, a fourth surface 514, an arc discharge opening 515, and a space portion 516.

The first surface 511, the second surface 512, the third surface 513, and the fourth surface 514 may define an outer circumferential surface of the magnet frame 510. That is, the first surface 511, the second surface 512, the third surface 513, and the fourth surface 514 may serve as walls of the magnet frame 510.

Outer sides of the first surface 511, the second surface 512, the third surface 513, and the fourth surface 514 may be in contact with or fixedly coupled to an inner surface of the upper frame 110. In addition, the magnet 520 may be disposed at inner sides of the first surface 511, the second surface 512, the third surface 513, and the fourth surface 514.

In the illustrated implementation, the first surface 511 may define a rear surface. The second surface 512 may define a front surface and face the first surface 511.

Also, the third surface 513 may define a left surface. The fourth surface 514 may define a right surface and face the third surface 513.

The first surface 511 may continuously be formed with the third surface 513 and the fourth surface 514. The first surface 511 may be coupled to the third surface 513 and the fourth surface 514 at predetermined angles. In one implementation, the predetermined angle may be a right angle.

The second surface 512 may continuously be formed with the third surface 513 and the fourth surface 514. The second surface 512 may be coupled to the third surface 513 and the fourth surface 514 at predetermined angles. In one implementation, the predetermined angle may be a right angle.

Each corner at which the first surface 511 to the fourth surface 514 are connected to one another may be chamfered.

A first magnet 521 may be coupled to the inner side of the first surface 511, namely, one side of the first surface 511 facing the second surface 512. Also, a second magnet 522 may be coupled to the inner side of the second surface 512, namely, one side of the second surface 512 facing the first surface 511.

A third magnet 523 may be coupled to an inner side of the third surface 513, namely, one side of the third surface 513 facing the fourth surface 514. Also, a fourth magnet 524 may be coupled to an inner side of the fourth surface 514, namely, one side of the fourth surface 514 facing the third surface 513.

Coupling members (not illustrated) may be disposed for coupling the respective surfaces 511, 512, 513, and 514 with the magnet 520.

An arc discharge opening 515 may be formed through at least one of the first surface 511 and the second surface 512.

The arc discharge opening 515 may be a passage through which an arc extinguished and discharged from the arc chamber 210 flows into the inner space of the upper frame 110. The arc discharge opening 515 may allow the space portion 516 of the magnet frame 510 to communicate with the space of the upper frame 110.

In the illustrated implementation, the arc discharge opening 515 may be formed through each of the first surface 511 and the second surface 512. The arc discharge opening 515 may be formed at a middle portion of each of the first surface 511 and the second surface 512 in a longitudinal direction.

A space surrounded by the first surface 511 to the fourth surface 514 may be defined as the space portion 516.

The fixed contactor 220 and the movable contactor 430 may be accommodated in the space portion 516. In addition, as illustrated in FIG. 4, the arc chamber 210 may be accommodated in the space portion 516.

In the space portion 516, the movable contactor 430 may move toward the fixed contactor 220 or away from the fixed contactor 220.

In addition, a path A.P of an arc generated in the arc chamber 210 may be formed in the space portion 516. This may be achieved by the magnetic field formed by the magnet 520.

A central portion of the space portion 516 may be defined as a center region (or central portion) C. A same straight line distance may be set from each corner where the first to fourth surfaces 511, 512, 513, and 514 are connected to the center region C.

The center region C may be located between the first fixed contactor 220*a* and the second fixed contactor 220*b*. In addition, a center of the movable contactor part 400 may be located perpendicularly below the center region C. That is, centers of the housing 410, the cover 420, the movable contactor 430, the shaft 440, and the elastic portion 450 may be located perpendicularly below the center region C.

Accordingly, when a generated arc is moved toward the center region C, those components may be damaged. To prevent this, the arc path forming unit 500 according to this implementation may include the magnet 520.

The magnet 520 may produce a magnetic field inside the space portion 516. The magnetic field produced by the magnet 520 may generate electromagnetic force together with current that flows through the fixed contactor 220 and the movable contactor 430. Therefore, the arc path A.P can be formed in a direction of an electromagnetic force.

The magnetic field may be generated between the neighboring magnets 521 or by each magnet 520.

The magnet 520 may be configured to have magnetism by itself or to obtain magnetism by an application of current or the like. In one implementation, the magnet 520 may be implemented as a permanent magnet or an electromagnet.

The magnet 520 may be coupled to the magnet frame 510. Coupling members (not illustrated) may be disposed for the coupling between the magnet 520 and the magnet frame 510.

In the illustrated implementation, the magnet 520 may extend in the longitudinal direction and have a rectangular parallelepiped shape having a rectangular cross-section. The magnet 520 may be provided in any shape capable of producing the magnetic field.

The magnet 520 may be provided in plurality. In the illustrated implementation, four magnets 520 may be provided, but the number may vary.

In one implementation, the magnet 520 may be disposed to cover the arc discharge opening 515. A communication hole (not illustrated) may be formed at the magnet 520 to communicate with the arc discharge opening 515. Accordingly, a generated arc can be extinguished and discharged to the outside of the arc chamber 210.

The magnets 520 may include a first magnet 521, a second magnet 522, a third magnet 523, and a fourth magnet 524.

The first magnet 521 may produce a magnetic field together with the third magnet 523 or the fourth magnet 524. In addition, the first magnet 521 may generate a magnetic field by itself.

Figure 6:
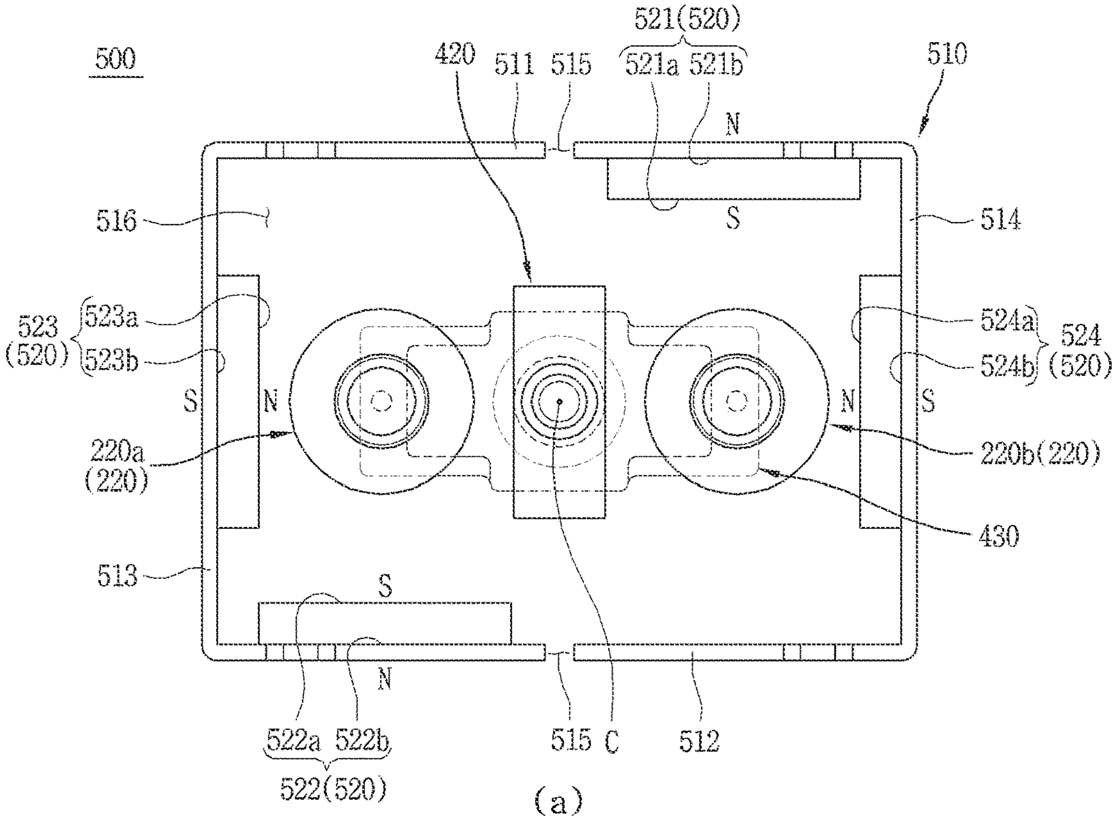
FIG. 6 is a conceptual view illustrating an arc path forming unit in accordance with one implementation.
Figure 6:
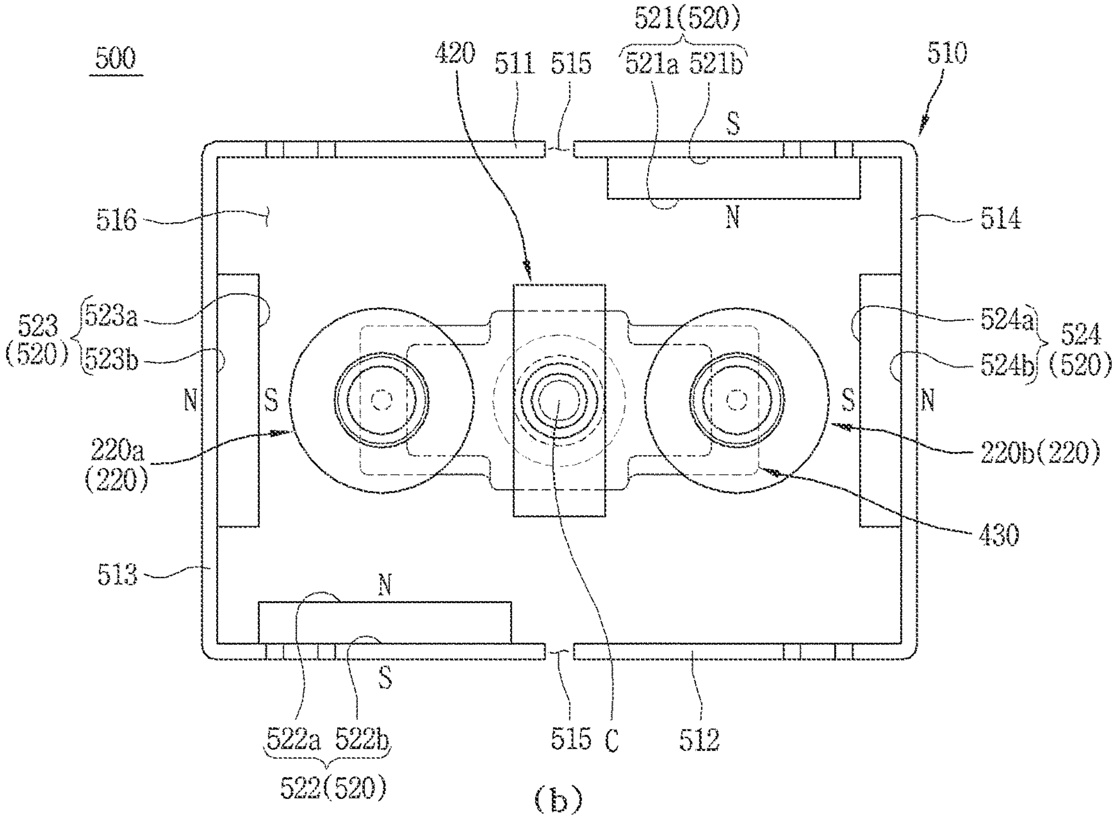

In the implementation illustrated in FIG. 6, the first magnet 521 may be located to be biased to a right side on the inner side of the first surface 511. That is, the first magnet 521 may be located on the right side based on the arc discharge opening 515. In the implementation, the first magnet 521 may produce a magnetic field together with the fourth magnet 524.

Figure 7:
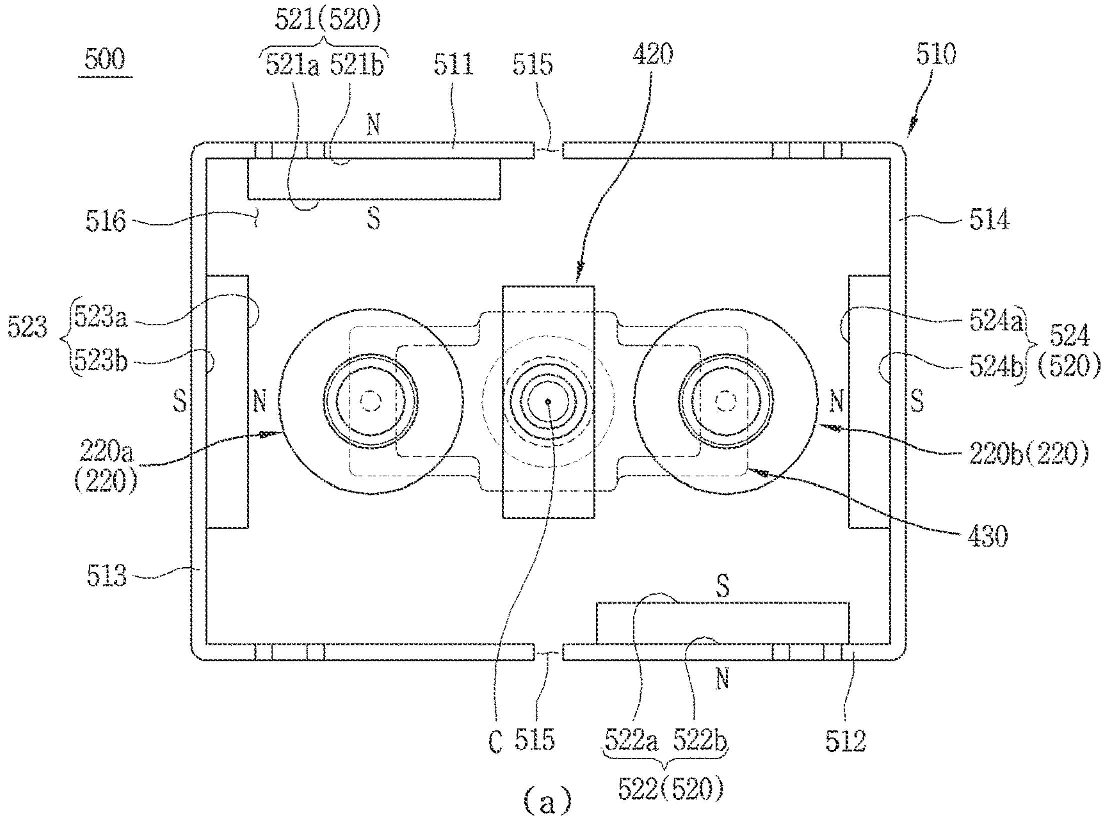
FIG. 7 is a conceptual view illustrating an arc path forming unit in accordance with a modified example of the implementation of FIG. 6.
Figure 7:
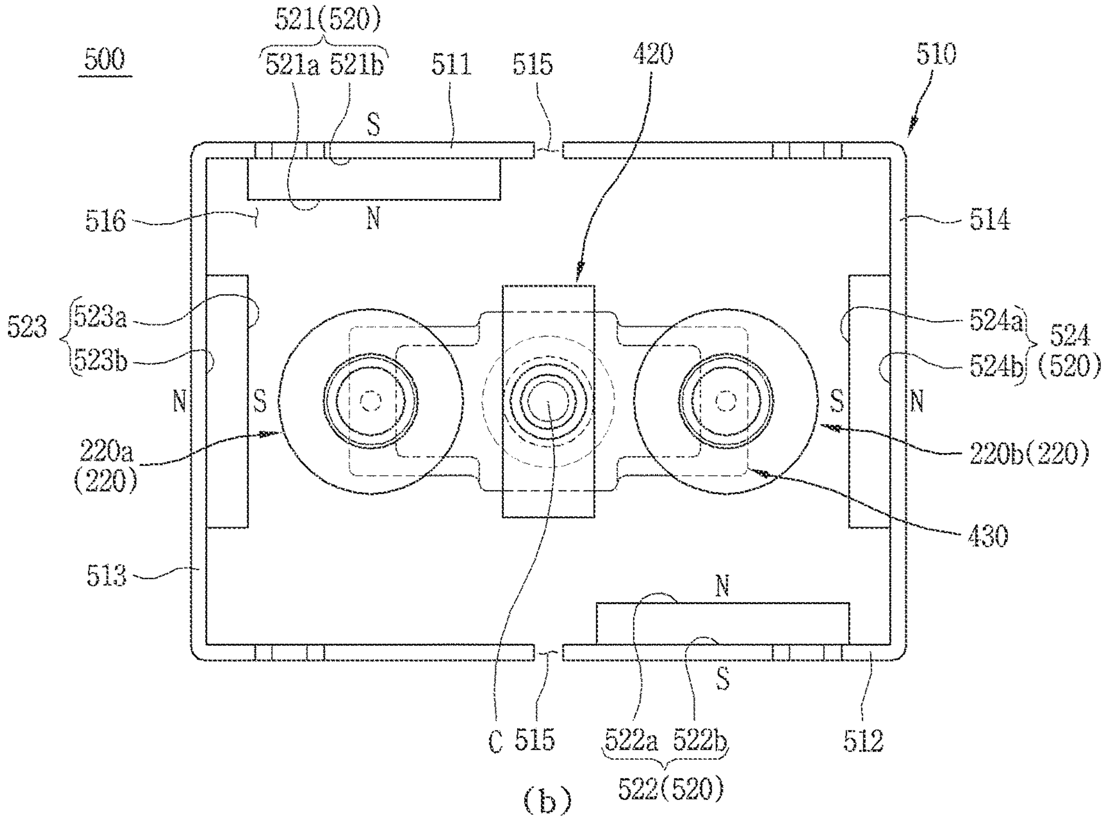

In the implementation illustrated in FIG. 7, the first magnet 521 may be located to be biased to a left side on the inner side of the first surface 511. That is, the first magnet 521 may be located on the left side based on the arc discharge opening 515. In the implementation, the first magnet 521 may produce a magnetic field together with the third magnet 523.

The first magnet 521 may be disposed to face the second magnet 522. Specifically, the first magnet 521 may be disposed to face the second magnet 522 in a diagonal direction with the space portion 516 therebetween.

In one implementation, an imaginary straight line connecting a longitudinal center of the first magnet 521 and a longitudinal center of the second magnet 522 may pass through a center region C of the space portion 516.

The first magnet 521 may include a first facing surface 521*a* and a first opposing surface 521*b*.

The first facing surface 521*a* may be defined as one side surface of the first magnet 521 that faces the space portion 516. In other words, the first facing surface 521*a* may be defined as one side surface of the first magnet 521 that faces the second magnet 522.

The first opposing surface 521*b* may be defined as another side surface of the first magnet 521 that faces the first surface 511. In other words, the first opposing surface 521*b* may be defined as a side surface of the first magnet 521 opposite to the first facing surface 521*a*.

The first facing surface 521*a* and the first opposing surface 521*b* may have different polarities. That is, the first facing surface 521*a* may be magnetized to one of an N pole and an S pole, and the first opposing surface 521*b* may be magnetized to another one of the N pole and the S pole.

Accordingly, a magnetic field moving from one of the first facing surface 521*a* and the first opposing surface 521*b* to the other may be produced by the first magnet 521 itself.

In the illustrated implementation, the polarity of the first facing surface 521*a* may be the same as the polarity of a second facing surface 522*a* of the second magnet 522. Accordingly, a magnetic field may be produced between the first magnet 521 and the second magnet 522 in a repelling direction.

In the implementation illustrated in FIG. 6, the polarity of the first facing surface 521*a* may be different from the polarity of a fourth facing surface 524*a* of the fourth magnet 524. Also, in the implementation illustrated in FIG. 7, the polarity of the first facing surface 521*a* may be different from the polarity of a third facing surface 523*a* of the third magnet 523.

Accordingly, a magnetic field may be generated in a direction from one magnet to another magnet between the first magnet 521 and the fourth magnet 524 or between the first magnet 521 and the third magnet 523.

The second magnet 522 may produce a magnetic field together with the third magnet 523 or the fourth magnet 524. In addition, the second magnet 522 may generate a magnetic field by itself.

In the implementation illustrated in FIG. 6, the second magnet 522 may be located to be biased to a left side on the inner side of the second surface 512. That is, the second magnet 522 may be located on the left side based on the arc discharge opening 515. In the implementation, the second magnet 522 may produce a magnetic field together with the third magnet 523.

In the implementation illustrated in FIG. 7, the second magnet 522 may be located to be biased to a right side on the inner side of the second surface 512. That is, the second magnet 522 may be located on the right side based on the arc discharge opening 515. In the implementation, the second magnet 522 may produce a magnetic field together with the fourth magnet 524.

The second magnet 522 may be disposed to face the first magnet 521. Specifically, the second magnet 522 may be disposed to face the first magnet 521 in a diagonal direction with the space portion 516 therebetween.

In one implementation, an imaginary straight line connecting a longitudinal center of the second magnet 522 and a longitudinal center of the first magnet 521 may pass through a center region C of the space portion 516.

The second magnet 522 may include a second facing surface 522*a* and a second opposing surface 522*b*.

The second facing surface 522*a* may be defined as one side surface of the second magnet 522 that faces the space portion 516. In other words, the second facing surface 522*a* may be defined as one side surface of the second magnet 522 that faces the first magnet 521.

The second opposing surface 522*b* may be defined as another side surface of the second magnet 522 that faces the second surface 512. In other words, the second opposing surface 522*b* may be defined as a side surface of the second magnet 522 opposite to the second facing surface 522*a*.

The second facing surface 522*a* and the second opposing surface 522*b* may have different polarities. That is, the second facing surface 522*a* may be magnetized to one of the N pole and the S pole, and the second opposing surface 522*b* may be magnetized to another one of the N pole and the S pole.

Accordingly, a magnetic field moving from one of the second facing surface 522*a* and the second opposing surface 522*b* to the other may be produced by the second magnet 522 itself.

In the illustrated implementation, the polarity of the second facing surface 522*a* may be the same as the polarity of the first facing surface 521*a* of the first magnet 521. Accordingly, a magnetic field may be produced between the first magnet 521 and the second magnet 522 in a repelling direction.

In the implementation illustrated in FIG. 6, the polarity of the second facing surface 522*a* may be different from the polarity of a third facing surface 523*a* of the third magnet 523. Also, in the implementation illustrated in FIG. 7, the polarity of the second facing surface 522*a* may be different from the polarity of a fourth facing surface 524*a* of the fourth magnet 524.

Accordingly, a magnetic field may be generated in a direction from one magnet to another magnet between the second magnet 522 and the third magnet 523 or between the second magnet 522 and the fourth magnet 524.

In one implementation, a positional relationship between the first magnet 521 and the second magnet 522 will be described using a positional relationship with the fixed contactor 220.

That is, the movable contactor 220 may extend in the longitudinal direction, namely, in left and right directions in the illustrated implementation. The fixed contactor 220 may include a first fixed contactor 220*a* on a left side and a second fixed contactor 220*b* on a right side. An imaginary line connecting the first fixed contactor 220*a* and the second fixed contactor 220*b* may be understood as a horizontal line in the left and right directions.

In this case, an imaginary line connecting the first magnet 521 and the second magnet 522 may intersect with the horizontal line. In one implementation, a distance between the first magnet 521 and the intersecting point may be the same as a distance between the second magnet 522 and the intersecting point.

That is, the first magnet 521 and the second magnet 522 may be arranged to be point-symmetrical with respect to the center region C.

The third magnet 523 may produce a magnetic field together with the first magnet 521 or the second magnet 522. In addition, the third magnet 523 may generate a magnetic field by itself.

In the illustrated implementation, the third magnet 523 may be located on the inner side of the third surface 513. In addition, the third magnet 523 may be located at a middle portion in front and rear directions in which the third surface 513 extends.

In the implementation illustrated in FIG. 6, the third magnet 523 may produce a magnetic field together with the second magnet 522. In the implementation illustrated in FIG. 7, the third magnet 523 may produce a magnetic field together with the first magnet 521.

The third magnet 523 may be disposed to face the fourth magnet 524. Specifically, the third magnet 523 may be disposed to face the fourth magnet 524 in a horizontal direction, for example, in the left and right directions in the illustrated implementation, with the space portion 516 therebetween.

In one implementation, an imaginary straight line connecting a longitudinal center of the third magnet 523 and a longitudinal center of the fourth magnet 524 may pass through the center region C of the space portion 516.

The third magnet 523 may include a third facing surface 523*a* and a third opposing surface 523*b*.

The third facing surface 523*a* may be defined as one side surface of the third magnet 523 that faces the space portion 516. In other words, the third facing surface 523*a* may be defined as one side surface of the third magnet 523 that faces the fourth magnet 524.

The third opposing surface 523*b* may be defined as another side surface of the third magnet 523 that faces the third surface 513. In other words, the third opposing surface 523*b* may be defined as a side surface of the third magnet 523 opposite to the third facing surface 523*a*.

The third facing surface 523*a* and the third opposing surface 523*b* may have different polarities. That is, the third facing surface 523*a* may be magnetized to one of the N pole and the S pole, and the third opposing surface 523*b* may be magnetized to another one of the N pole and the S pole.

Accordingly, a magnetic field moving from one of the third facing surface 523*a* and the third opposing surface 523*b* to the other may be produced by the third magnet 523 itself.

In the illustrated implementation, the polarity of the third facing surface 523*a* may be the same as the polarity of the fourth facing surface 524*a* of the fourth magnet 524. Accordingly, a magnetic field may be produced between the third magnet 523 and the fourth magnet 524 in a repelling direction.

In the implementation illustrated in FIG. 6, the polarity of the third facing surface 523*a* may be different from the polarity of a second facing surface 522*a* of the second magnet 522. Also, in the implementation illustrated in FIG. 7, the polarity of the third facing surface 523*a* may be different from the polarity of the first facing surface 521*a* of the first magnet 521.

Accordingly, a magnetic field may be generated in a direction from one magnet to another magnet between the third magnet 523 and the first magnet 521 or between the third magnet 523 and the second magnet 522.

The fourth magnet 524 may produce a magnetic field together with the first magnet 521 or the second magnet 522. In addition, the fourth magnet 524 may generate a magnetic field by itself.

In the illustrated implementation, the fourth magnet 524 may be located on the inner side of the fourth surface 514. In addition, the fourth magnet 524 may be located at a middle portion in front and rear directions in which the fourth surface 514 extends.

In the implementation illustrated in FIG. 6, the fourth magnet 524 may produce a magnetic field together with the first magnet 521. In the implementation illustrated in FIG. 7, the fourth magnet 524 may produce a magnetic field together with the second magnet 522.

The fourth magnet 524 may be disposed to face the third magnet 523. Specifically, the fourth magnet 524 may be disposed to face the third magnet 523 in a horizontal direction, for example, in the left and right directions in the illustrated implementation, with the space portion 516 therebetween.

In one implementation, an imaginary straight line connecting a longitudinal center of the fourth magnet 524 and a longitudinal center of the third magnet 523 may pass through the center region C of the space portion 516.

The fourth magnet 524 may include a fourth facing surface 524*a* and a fourth opposing surface 524*b*.

The fourth facing surface 524*a* may be defined as one side surface of the fourth magnet 524 that faces the space portion 516. In other words, the fourth facing surface 524*a* may be defined as one side surface of the fourth magnet 524 that faces the third magnet 523.

The fourth opposing surface 524*b* may be defined as another side surface of the fourth magnet 524 that faces the fourth surface 514. In other words, the fourth opposing surface 524*b* may be defined as a side surface of the fourth magnet 524 opposite to the fourth facing surface 524*a*.

The fourth facing surface 524*a* and the fourth opposing surface 524*b* may have different polarities. That is, the fourth facing surface 524*a* may be magnetized to one of the N pole and the S pole, and the fourth opposing surface 524*b* may be magnetized to another one of the N pole and the S pole.

Accordingly, a magnetic field moving from one of the fourth facing surface 524*a* and the fourth opposing surface 524*b* to the other may be produced by the fourth magnet 524 itself.

In the illustrated implementation, the polarity of the fourth facing surface 524*a* may be the same as the polarity of the third facing surface 523*a* of the third magnet 523. Accordingly, a magnetic field may be produced between the fourth magnet 524 and the third magnet 523 in a repelling direction.

In the illustrated implementation in FIG. 6, the polarity of the fourth facing surface 524*a* may be different from the polarity of the first facing surface 521*a* of the first magnet 521. Also, in the implementation illustrated in FIG. 7, the polarity of the fourth facing surface 524*a* may be different from the polarity of the second facing surface 522*a* of the second magnet 522.

Accordingly, a magnetic field may be generated in a direction from one magnet to another magnet between the fourth magnet 524 and the first magnet 521 or between the fourth magnet 524 and the second magnet 522.

In this implementation, the first magnet 521 and the second magnet 522 may be disposed to face each other. Also, the third magnet 523 and the fourth magnet 524 may be disposed to face each other.

In this instance, the first facing surface 521*a* and the second facing surface 522*a* may have the same polarity. Similarly, the third facing surface 523*a* and the fourth facing surface 524*a* may have the same polarity.

The first magnet 521 may be disposed to partially surround the fixed contactor 220 together with the third magnet 523 or the fourth magnet 524. The second magnet 522 may be disposed to partially surround the fixed contactor 220 together with the third magnet 523 or the fourth magnet 524.

In this instance, the first facing surface 521*a* and the third facing surface 523*a* or the fourth facing surface 524*a* may have different polarities. Similarly, the second facing surface 522*a* and the third facing surface 523*a* or the fourth facing surface 524*a* may have different polarities.

Accordingly, a magnetic field may be generated between the magnets 521, 522, 523, and 524 facing each other in a repelling direction. In addition, a magnetic field may be generated between the magnets 521, 522, 523, and 524 disposed adjacent to each other in a direction from one of the adjacent magnets to the other.

Accordingly, the magnetic field for forming an arc path A.P can be produced at each of the fixed contactors 220*a* and 220*b*.

(2) Description of Arc Path Forming Unit 600 According to Another Implementation Hereinafter, the arc path forming unit 600 according to another implementation will be described in detail, with reference to FIGS. 8 and 9.

In the illustrated implementation, the arc path forming unit 600 may include a main frame 610 and magnets 620.

The magnet frame 610 according to this implementation has the same structure and function as the magnet frame 510 of the previous implementation. Therefore, a description of the magnet frame 610 will be replaced with the description of the magnet frame 510.

In addition, the magnets 620 according to this implementation have the same structure and function as the magnets 520 of the previous implementation. However, there is a difference in an arrangement method of each magnet 621, 622, 623, 624.

Therefore, the following description will be given based on the difference between the magnet 620 according to this implementation and the magnet 520 according to the previous implementation.

In this implementation, the magnets 620 may include a first magnet 621, a second magnet 622, a third magnet 623, and a fourth magnet 624.

The first magnet 621 may have the same structure as the first magnet 521 of the previous implementation. However, the first magnet 621 may be different from the first magnet 521 of the previous implementation in the arrangement method.

Figure 8:
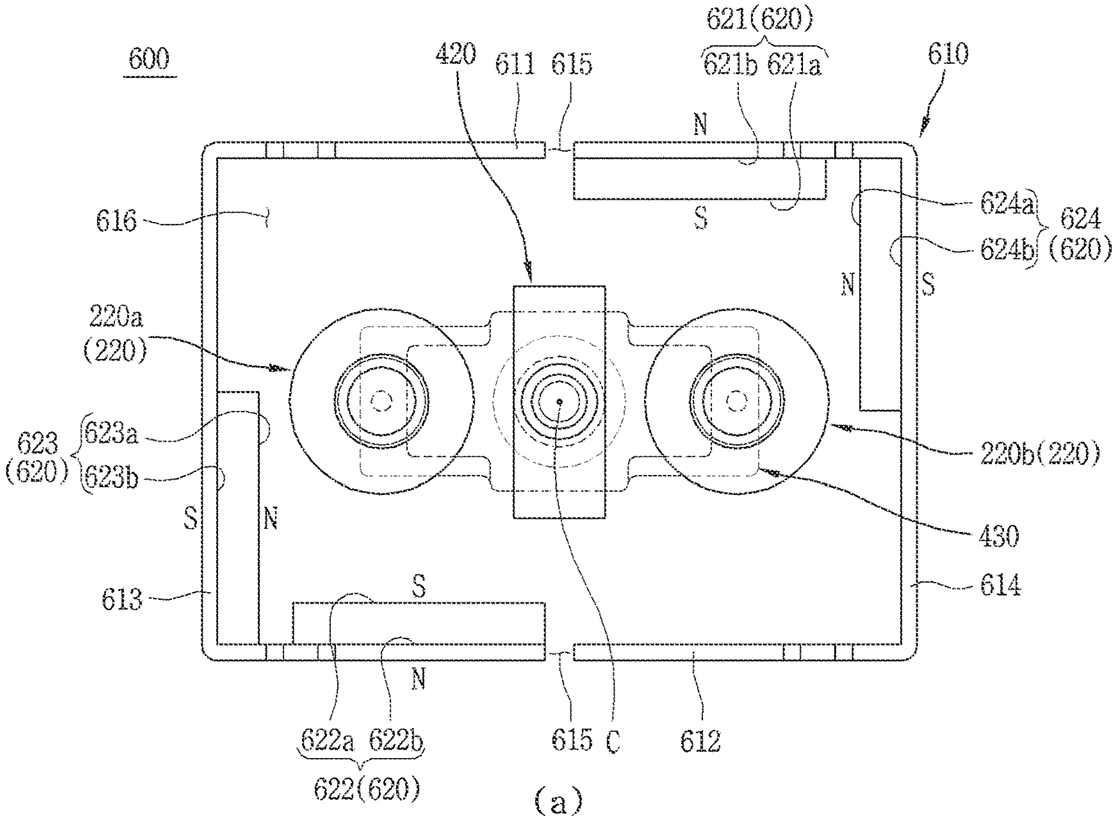
FIG. 8 is a conceptual view illustrating an arc path forming unit in accordance with another implementation.
Figure 8:
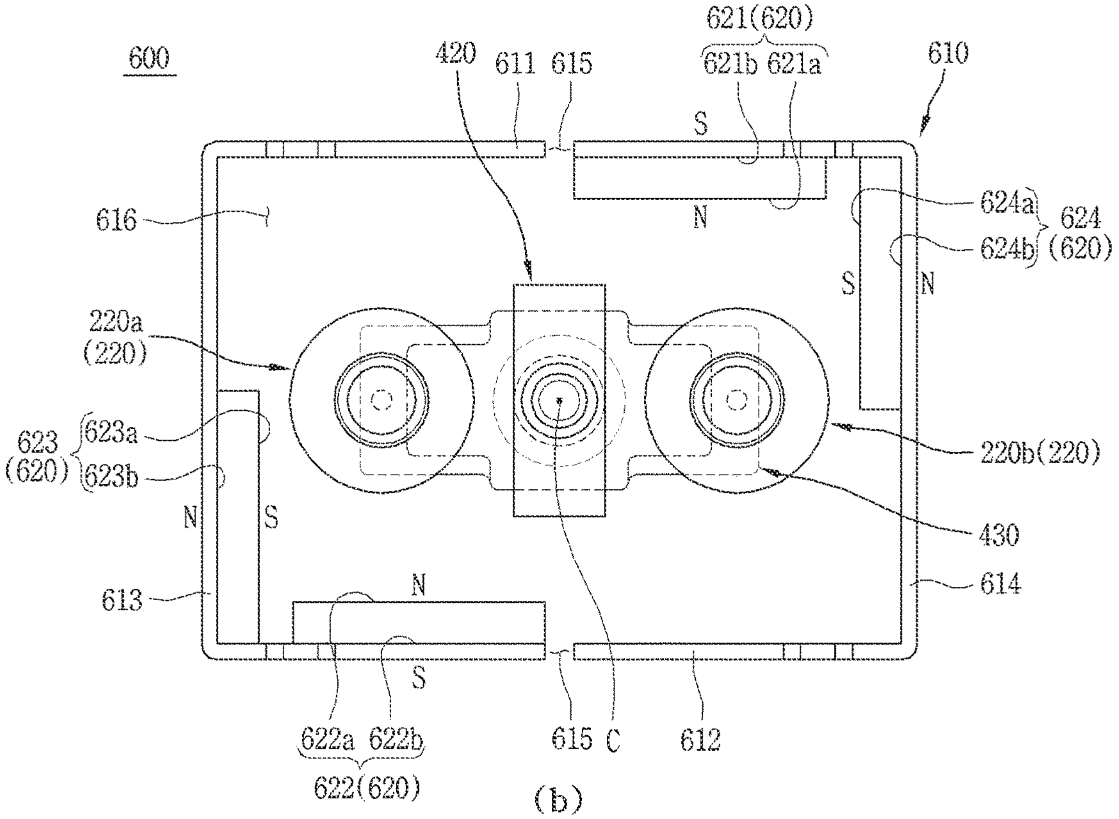

In the implementation illustrated in FIG. 8, the first magnet 621 may be located to be biased to a right side on the inner side of the first surface 611. At this time, one end portion, namely, a left end portion in the implementation, of the first magnet 621 facing the arc discharge opening 615 may be disposed to be adjacent to one end portion of the first surface 611 surrounding the arc discharge opening 615.

Figure 9:
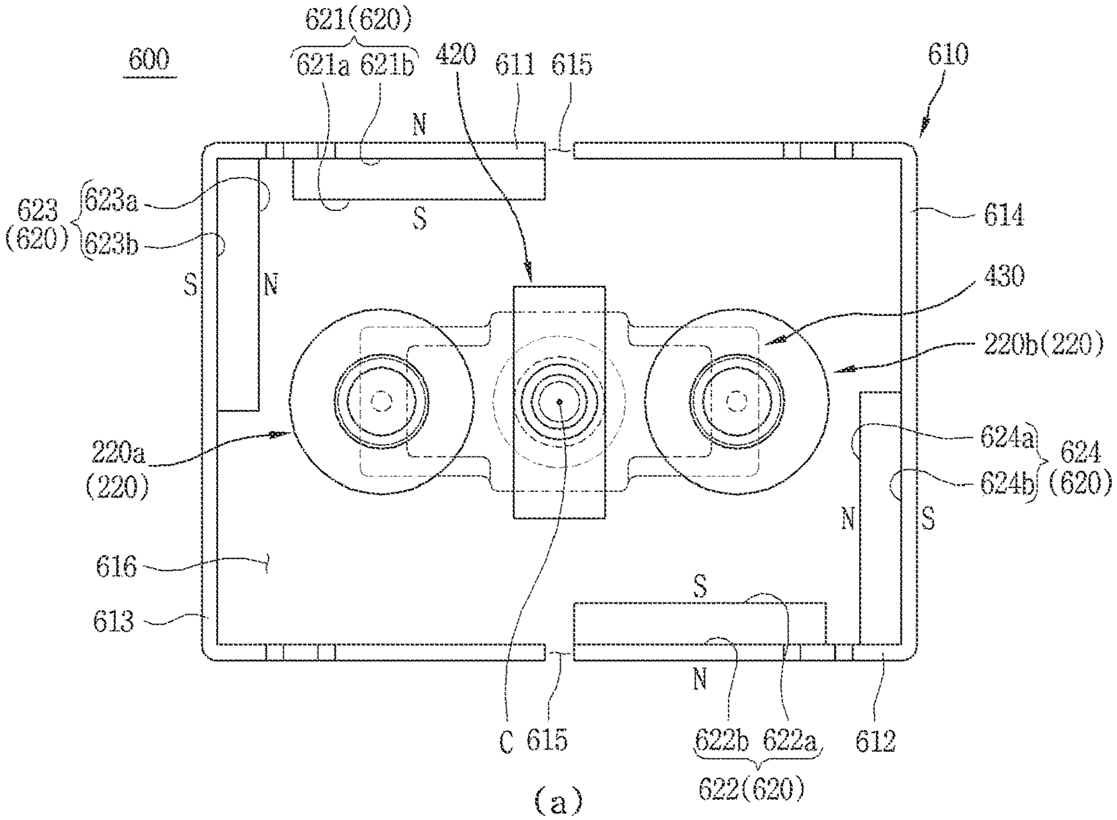
FIG. 9 is a conceptual view illustrating an arc path forming unit in accordance with a modified example of the implementation of FIG. 8.
Figure 9:
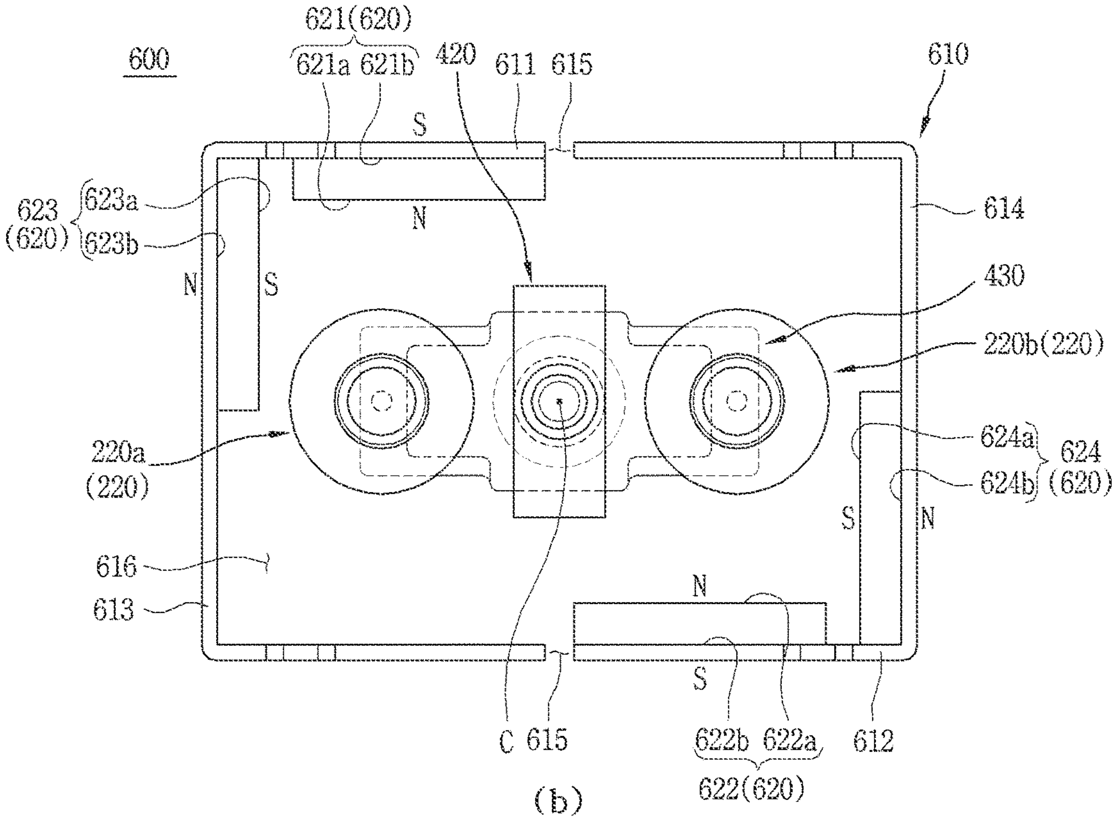

In the implementation illustrated in FIG. 9, the first magnet 621 may be located to be biased to a left side on the inner side of the first surface 611. At this time, another end portion, namely, a right end portion in the implementation, of the first magnet 621 facing the arc discharge opening 615 may be disposed to be adjacent to another end portion of the first surface 611 surrounding the arc discharge opening 615.

The second magnet 622 may have the same structure as the second magnet 522 of the previous implementation. However, the second magnet 622 may be different from the second magnet 522 of the previous implementation in the arrangement method.

In the implementation illustrated in FIG. 8, the second magnet 622 may be located to be biased to a left side on the inner side of the second surface 612. At this time, one end portion, namely, a right end portion in the implementation, of the second magnet 622 facing the arc discharge opening 615 may be disposed to be adjacent to one end portion of the second surface 612 surrounding the arc discharge opening 615.

In the implementation illustrated in FIG. 9, the second magnet 622 may be located to be biased to a right side on the inner side of the second surface 612. At this time, another end portion, namely, a left end portion in the implementation, of the second magnet 622 facing the arc discharge opening 615 may be disposed to be adjacent to another end portion of the second surface 612 surrounding the arc discharge opening 615.

The third magnet 623 may have the same structure as the third magnet 523 of the previous implementation. However, the third magnet 623 may be different from the third magnet 523 of the previous implementation in the arrangement method.

In the implementation illustrated in FIG. 8, the third magnet 623 may be located on the inner side of the third surface 613. In addition, one end portion, namely, a front end portion in the implementation, of the third magnet 623 in the longitudinal direction may be disposed to be adjacent to the second surface 612. In one implementation, the one end portion of the third magnet 623 may be in contact with the second surface 612.

It will be understood that a space in which the third magnet 623 is disposed adjacent to the second surface 612 is a space defined as the second magnet 622 is disposed adjacent to the arc discharge opening 615.

In the implementation illustrated in FIG. 9, the third magnet 623 may be located on the inner side of the third surface 613. In addition, another end portion, namely, a rear end portion in the implementation, of the third magnet 623 in the longitudinal direction may be disposed to be adjacent to the first surface 611. In one implementation, the another end portion of the third magnet 623 may be in contact with the first surface 611.

It will be understood that a space in which the third magnet 623 is disposed adjacent to the first surface 611 is a space defined as the first magnet 621 is disposed adjacent to the arc discharge opening 615.

The fourth magnet 624 may have the same structure as the fourth magnet 524 of the previous implementation. However, the fourth magnet 624 may be different from the fourth magnet 524 of the previous implementation in the arrangement method.

In the implementation illustrated in FIG. 8, the fourth magnet 624 may be located on the inner side of the fourth surface 614. In addition, one end portion, namely, a rear end portion in the implementation, of the fourth magnet 624 in the longitudinal direction may be disposed to be adjacent to the first surface 611.

It will be understood that a space in which the fourth magnet 624 is disposed adjacent to the first surface 611 is a space defined as the first magnet 621 is disposed adjacent to the arc discharge opening 615.

In the implementation illustrated in FIG. 9, the fourth magnet 624 may be located on the inner side of the fourth surface 614. In addition, another end portion, namely, a front end portion in the implementation, of the fourth magnet 624 in the longitudinal direction may be disposed to be adjacent to the second surface 612.

It will be understood that a space in which the fourth magnet 624 is disposed adjacent to the second surface 612 is a space defined as the second magnet 622 is disposed adjacent to the arc discharge opening 615.

In this implementation, the third magnet 623 may be disposed adjacent to the first surface 611 or the second surface 612 where the first magnet 621 or the second magnet 622 is disposed. The fourth magnet 624 may also be disposed adjacent to the first surface 611 or the second surface 612 where the first magnet 621 or the second magnet 622 is disposed.

This can reduce a distance between the third magnet 623 and the first magnet 621 or the second magnet 622. Similarly, this can reduce a distance between the fourth magnet 624 and the first magnet 621 or the second magnet 622.

Accordingly, strength of the magnetic field formed between the adjacent magnets 621, 622, 623, 624 can be further increased.

In addition, it will be understood that the effect of the arc path forming unit 500 of the previous implementation can also be achieved even in this implementation.

(3) Description of Arc Path Forming Unit 700 According to Still Another Implementation Hereinafter, the arc path forming unit 700 according to still another implementation will be described in detail, with reference to FIGS. 10 and 11.

In the illustrated implementation, the arc path forming unit 700 may include a main frame 710 and magnets 720.

The magnet frame 710 according to this implementation has the same structure and function as the magnet frame 510 of the previous implementation. Therefore, a description of the magnet frame 710 will be replaced with the description of the magnet frame 510.

In addition, the magnets 720 according to this implementation have the same structure and function as the magnets 520 of the previous implementation. However, there is a difference in an arrangement method of each magnet 721, 722, 723, 724.

Therefore, the following description will be given based on the difference between the magnet 720 according to this implementation and the magnet 520 according to the previous implementations.

In this implementation, the magnets 720 may include a first magnet 721, a second magnet 722, a third magnet 723, and a fourth magnet 724.

The first magnet 721 may have the same structure as the first magnet 521 of the previous implementation. However, the first magnet 721 may be different from the first magnet 521 of the previous implementation in the arrangement method.

Figure 10:
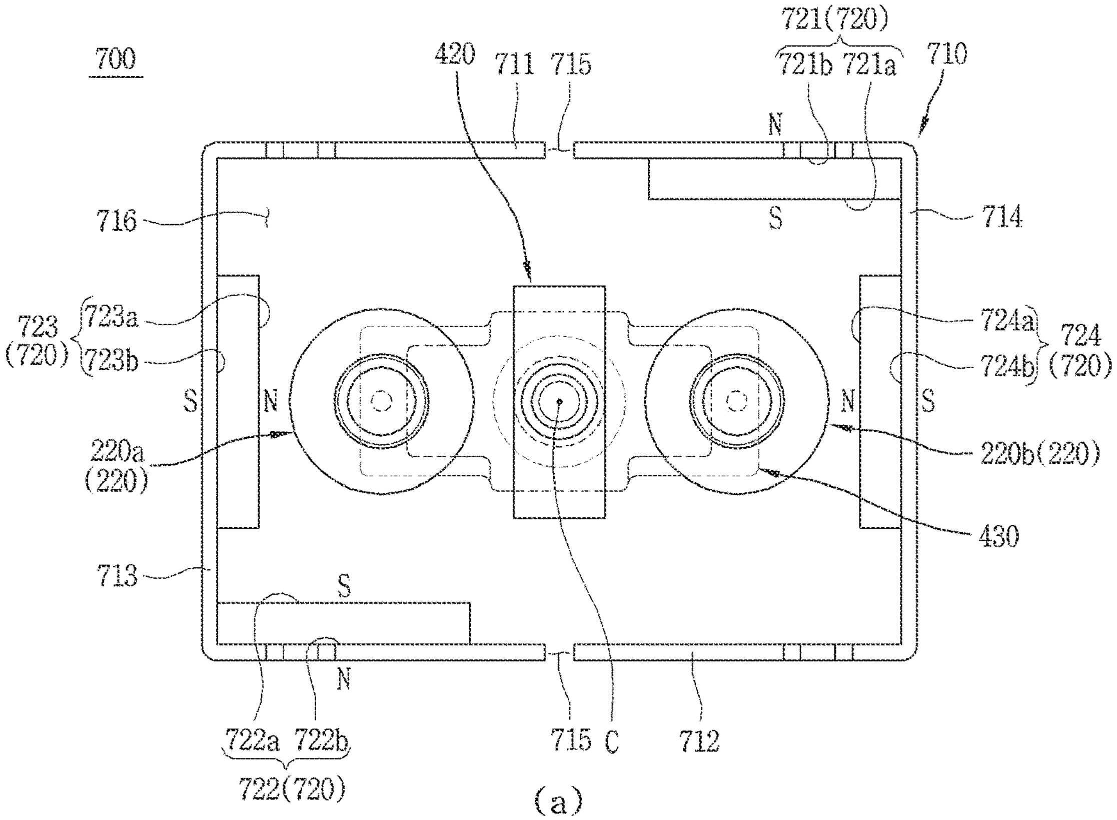
FIG. 10 is a conceptual view illustrating an arc path forming unit in accordance with still another implementation.
Figure 10:
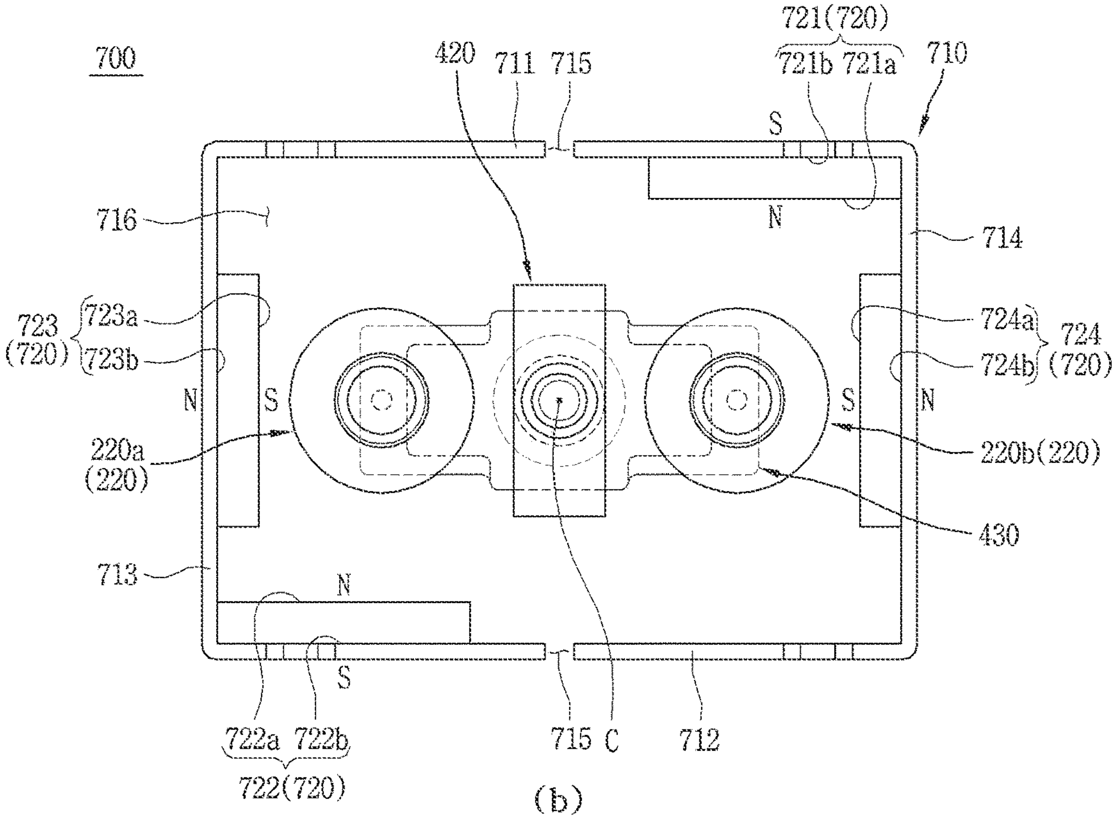

In the implementation illustrated in FIG. 10, the first magnet 721 may be located to be biased to a right side on the inner side of the first surface 711. At this time, one end portion, namely, a right end portion in the implementation, of the first magnet 721 facing the fourth surface 714 may be disposed adjacent to the fourth surface 714. In one implementation, the one end portion of the first magnet 721 may be in contact with the fourth surface 714.

Figure 11:
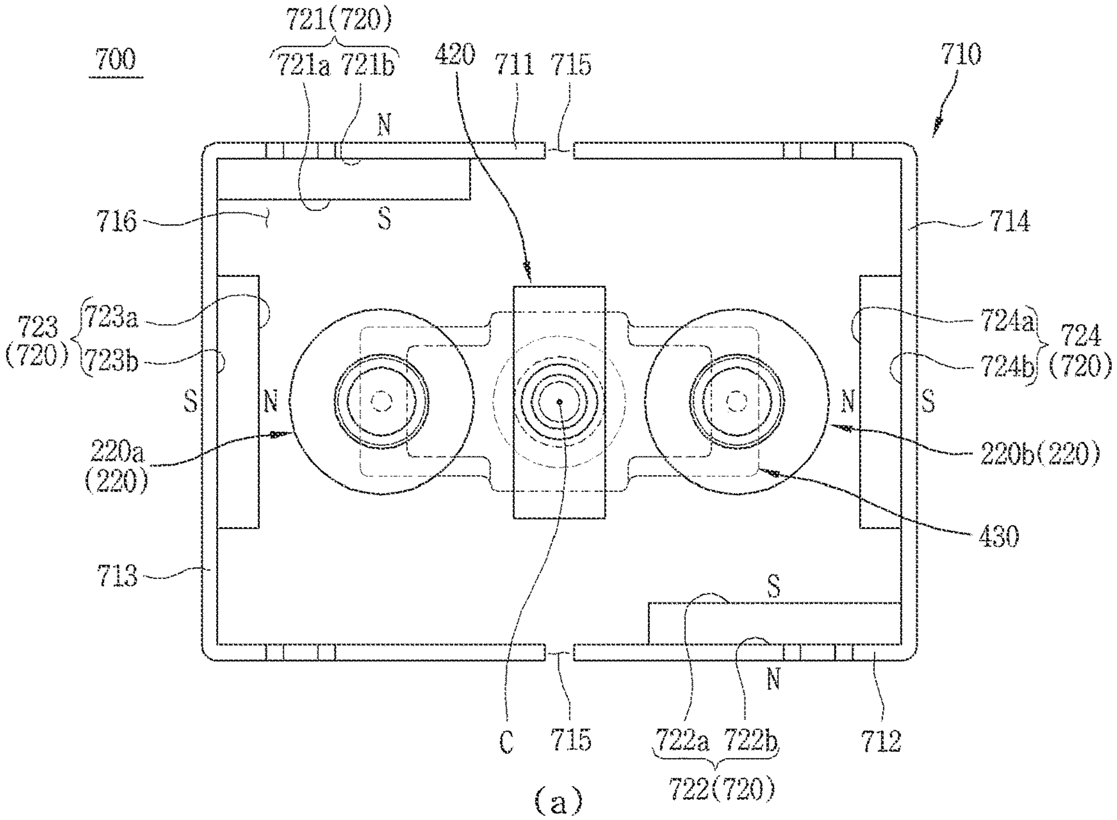
FIG. 11 is a conceptual view illustrating an arc path forming unit in accordance with a modified example of the implementation of FIG. 10.
Figure 11:
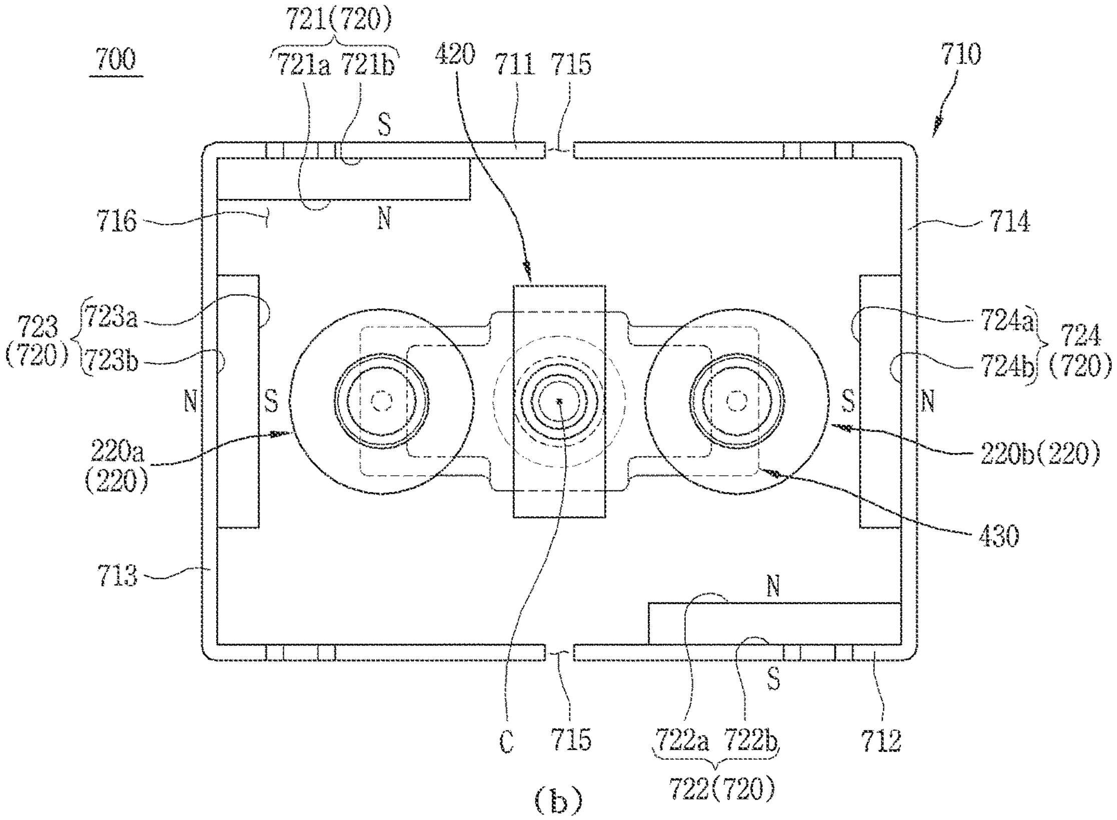

In the implementation illustrated in FIG. 11, the first magnet 721 may be located to be biased to a left side on the inner side of the first surface 711. At this time, another end portion, namely, a left end portion in the implementation, of the first magnet 721 facing the third surface 713 may be disposed adjacent to the third surface 713. In one implementation, the another end portion of the first magnet 721 may be in contact with the third surface 713.

The second magnet 722 may have the same structure as the second magnet 522 of the previous implementation. However, the second magnet 722 may be different from the second magnet 522 of the previous implementation in the arrangement method.

In the implementation illustrated in FIG. 10, the second magnet 722 may be located to be biased to a left side on the inner side of the second surface 712. At this time, one end portion, namely, a left end portion in the implementation, of the second magnet 722 facing the third surface 713 may be disposed adjacent to the third surface 713. In one implementation, the one end portion of the second magnet 722 may be in contact with the third surface 713.

In the implementation illustrated in FIG. 11, the second magnet 722 may be located to be biased to a right side on the inner side of the second surface 712. At this time, another end portion, namely, a right end portion in the implementation, of the second magnet 722 facing the fourth surface 714 may be disposed adjacent to the fourth surface 714. In one implementation, the another end portion of the second magnet 722 may be in contact with the fourth surface 714.

The third magnet 723 may have the same structure, function, and arrangement as the third magnet 523 of the previous implementation. The fourth magnet 724 may have the same structure, function, and arrangement as the fourth magnet 524 of the previous implementation.

Accordingly, a description of the third magnet 723 and the fourth magnet 724 will be replaced with the description of the third magnet 523 and the fourth magnet 524 of the previous implementation.

In this implementation, the first magnet 721 may be disposed adjacent to the third surface 713 or the fourth surface 714 where the third magnet 723 or the fourth magnet 724 is disposed. The second magnet 722 may also be disposed adjacent to the third surface 713 or the fourth surface 714 where the third magnet 723 or the fourth magnet 724 is disposed.

This can reduce a distance between the first magnet 721 and the third magnet 723 or the fourth magnet 724. Similarly, this can reduce a distance between the second magnet 722 and the third magnet 723 or the fourth magnet 724.

Accordingly, strength of the magnetic field formed between the adjacent magnets 721, 722, 723, 724 can be further increased.

In addition, it will be understood that the effect of the arc path forming unit 500 of the previous implementation can also be achieved even in this implementation.

(4) Description of Arc Path Forming Unit 800 According to Still Another Implementation Hereinafter, the arc path forming unit 800 according to still another implementation will be described in detail, with reference to FIGS. 12 and 13.

In the illustrated implementation, the arc path forming unit 800 may include a main frame 810 and magnets 820.

The magnet frame 810 according to this implementation has the same structure and function as the magnet frame 510 of the previous implementation. Therefore, a description of the magnet frame 810 will be replaced with the description of the magnet frame 510.

In addition, the magnets 820 according to this implementation have the same structure and function as the magnets 520 of the previous implementation. However, there is a difference in an arrangement method of each magnet 821, 722, 723, 724.

Therefore, the following description will be given based on the difference between the magnet 820 according to this implementation and the magnet 520 according to the previous implementation.

In this implementation, the magnets 820 may include a first magnet 821, a second magnet 822, a third magnet 823, and a fourth magnet 824.

The first magnet 821 may have the same structure as the first magnet 521 of the previous implementation. However, the first magnet 821 may be different from the first magnet 521 of the previous implementation in the arrangement method.

Figure 12:
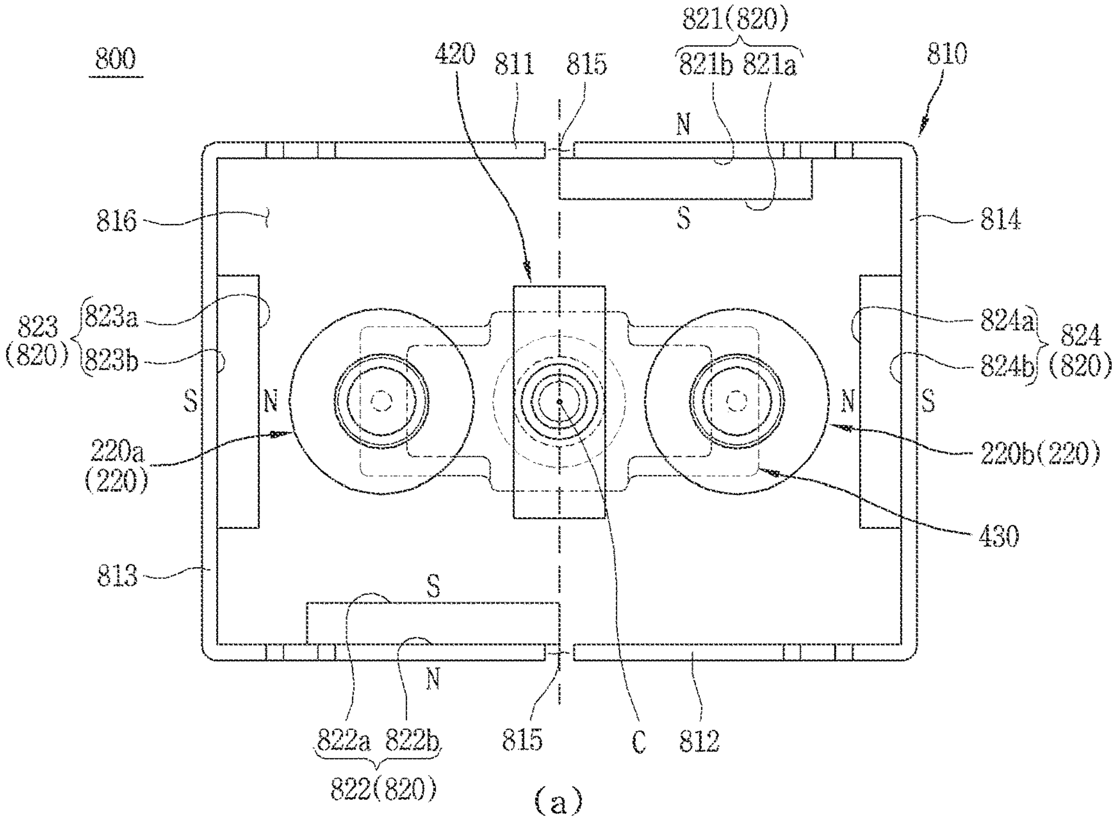
FIG. 12 is a conceptual view illustrating an arc path forming unit in accordance with still another implementation.
Figure 12:
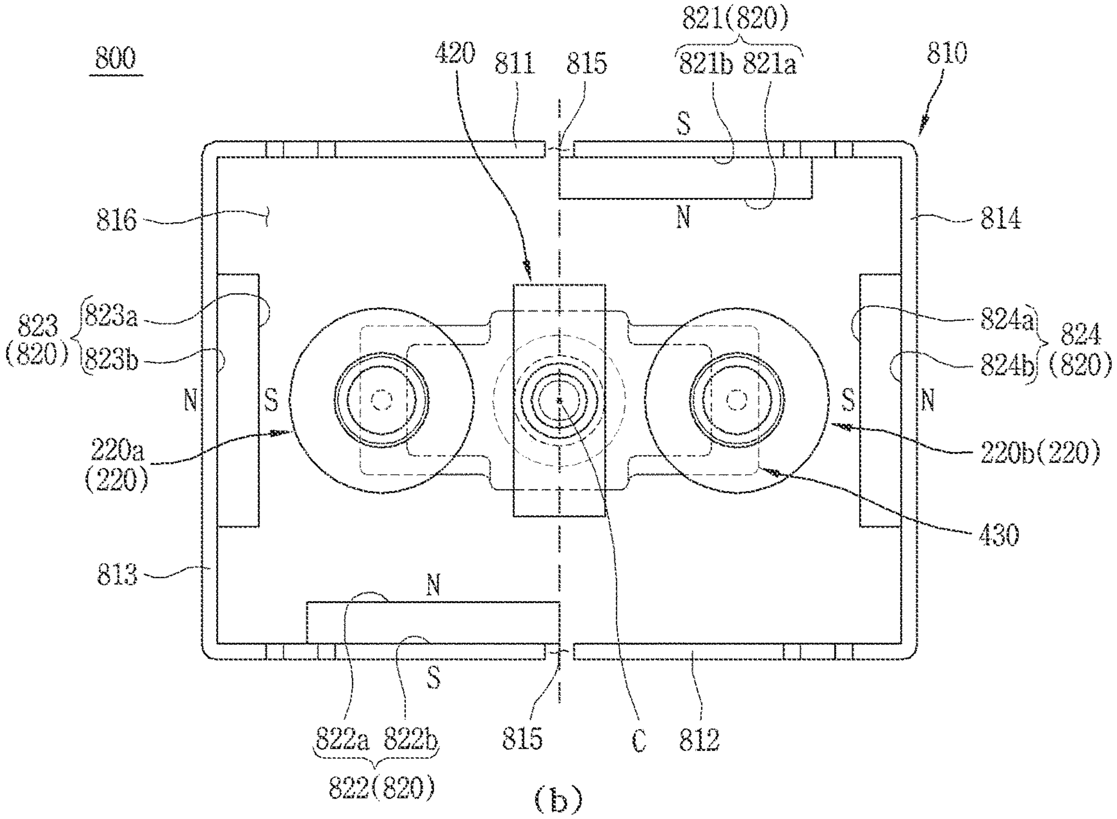

In the implementation illustrated in FIG. 12, the first magnet 821 may be located to be biased to a right side on the inner side of the first surface 811. At this time, one end portion, namely, a left end portion in the implementation, of the first magnet 821 facing the arc discharge opening 815 may partially cover the arc discharge opening 815.

Figure 13:
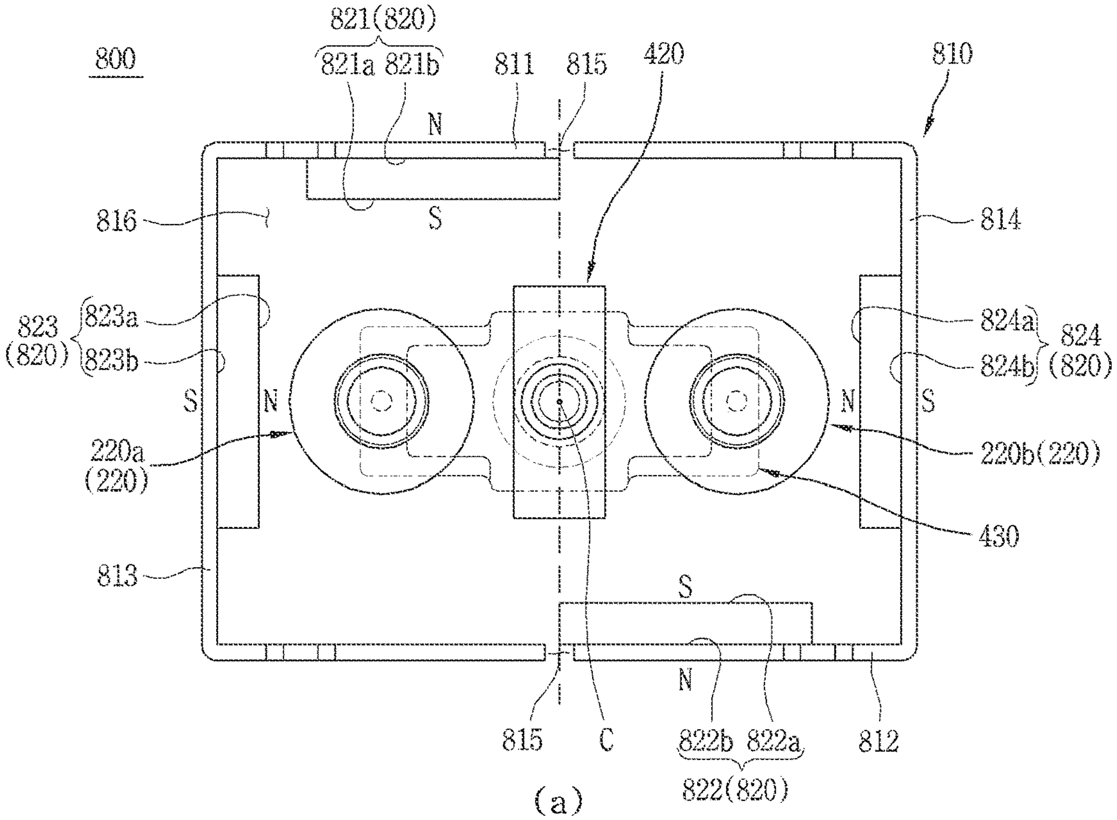
FIG. 13 is a conceptual view illustrating an arc path forming unit in accordance with a modified example of the implementation of FIG. 12.
Figure 13:
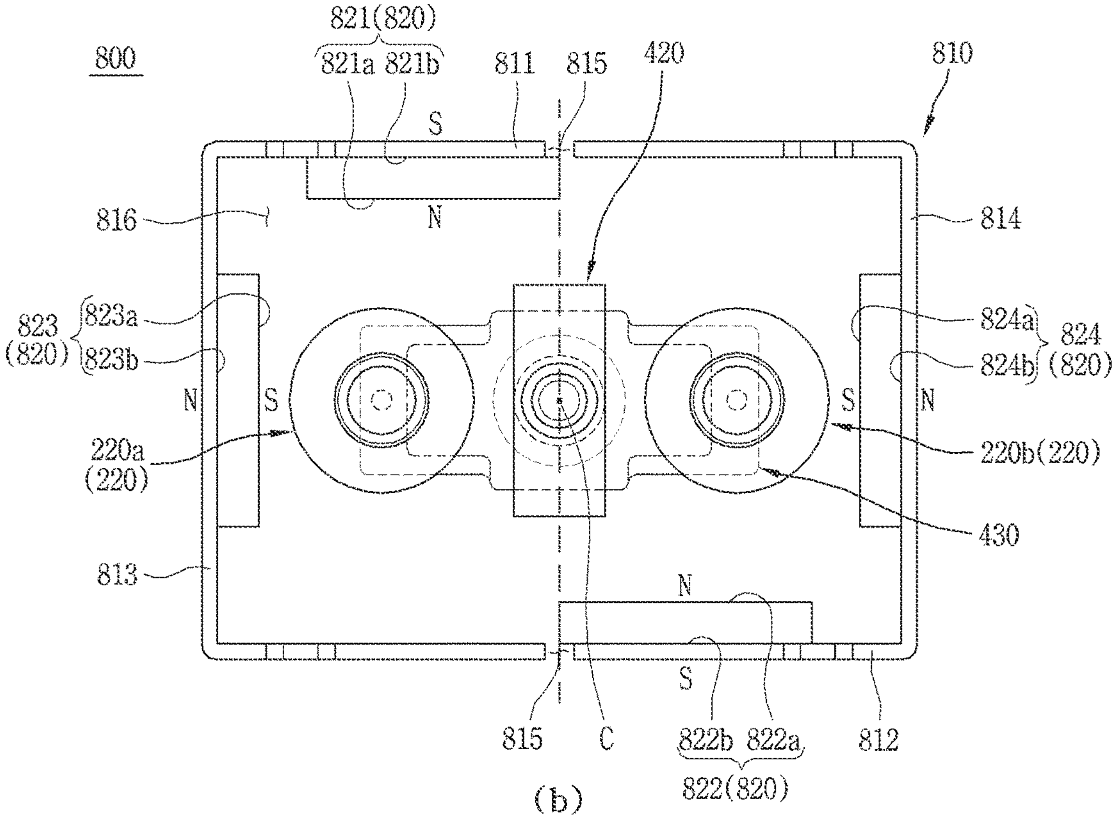

In the implementation illustrated in FIG. 13, the first magnet 821 may be located to be biased to a left side on the inner side of the first surface 811. At this time, another end portion, namely, a right end portion in the implementation, of the first magnet 821 facing the arc discharge opening 815 may partially cover the arc discharge opening 815.

That is, the one end portion or the another end portion of the first magnet 821 may be located on the center of the first surface 811 in the longitudinal direction. Accordingly, the one end portion or the another end portion of the first magnet 821 may be located on an imaginary straight line connecting the center of the arc discharge opening 815 and the center region C.

The second magnet 822 may have the same structure as the second magnet 522 of the previous implementation. However, the second magnet 822 may be different from the second magnet 522 of the previous implementation in the arrangement method.

In the implementation illustrated in FIG. 12, the second magnet 822 may be located to be biased to a left side on the inner side of the second surface 812. At this time, one end portion, namely, a right end portion in the implementation, of the second magnet 822 facing the arc discharge opening 815 may partially cover the arc discharge opening 815.

In the implementation illustrated in FIG. 13, the second magnet 822 may be located to be biased to a right side on the inner side of the second surface 812. At this time, another end portion, namely, a left end portion in the implementation, of the second magnet 822 facing the arc discharge opening 815 may partially cover the arc discharge opening 815.

That is, the one end portion or the another end portion of the second magnet 822 may be located on the center of the second surface 812 in the longitudinal direction. Accordingly, the one end portion or the another end portion of the second magnet 822 may be located on the imaginary straight line connecting the center of the arc discharge opening 815 and the center region C.

The third magnet 823 may have the same structure, function, and arrangement as the third magnet 523 of the previous implementation. The fourth magnet 824 may have the same structure, function, and arrangement as the fourth magnet 524 of the previous implementation.

Accordingly, a description of the third magnet 823 and the fourth magnet 824 will be replaced with the description of the third magnet 523 and the fourth magnet 524 of the previous implementation.

In this implementation, the first magnet 821 may be arranged such that the one end portion in the longitudinal direction facing the arc discharge opening 815 is located on the center of the first surface 811 in the longitudinal direction. The second magnet 822 may also be arranged such that the one end portion in the longitudinal direction facing the arc discharge opening 815 is located on the center of the second surface 812 in the longitudinal direction.

Accordingly, extension lengths of the first magnet 821 and the second magnet 822 may not overlap each other in the left and right directions. This can prevent the magnetic fields generated at the respective fixed contactors 220*a* and 220*b* from interfering with each other.

Accordingly, strength of the magnetic field formed between the magnets 821, 722, 723, 724 disposed adjacent to each other may be further increased.

In addition, it will be understood that the effect of the arc path forming unit 500 of the previous implementation can also be achieved even in this implementation.

4. Description of Arc Path A.P Formed by Arc Path Forming Unit 500, 600, 700, 800 According to Implementations The DC relay 10 according to the implementation may include an arc path forming unit 500, 600, 700, 800. The arc path forming unit 500, 600, 700, 800 may produce a magnetic field inside the arc chamber 210.

When the fixed contactor 220 and the movable contactor 430 come into contact with each other such that current flows after the magnetic field is generated, electromagnetic force may be generated according to the Fleming's left hand rule.

The electromagnetic force may allow the formation of the arc path A.P along which an arc generated when the fixed contactor 220 and the movable contactor 430 are separated from each other moves.

Hereinafter, a process of forming an arc path A.P in the DC relay 10 according to the implementation will be described in detail with reference to FIGS. 14 to 29.

In the following description, it will be assumed that an arc is generated at a contact portion between the fixed contactor 220 and the movable contactor 430 right after the fixed contactor 220 and the movable contactor 430 are separated from each other.

In addition, in the following description, magnetic fields that are produced between the different magnets 520, 620, 720, and 820 are referred to as "Main Magnetic Fields (M.M.F)", and a magnet field produced by each of the magnets 520, 620, 720, and 820 is referred to as a "sub magnetic field (S.M.F)".

(1) Description of Arc Path A.P Formed by Arc Path Forming Unit 500 According to One Implementation Hereinafter, an arc path A.P generated by the arc path forming unit 500 according to one implementation will be described in detail, with reference to FIGS. 14 to 17.

Figure 14:
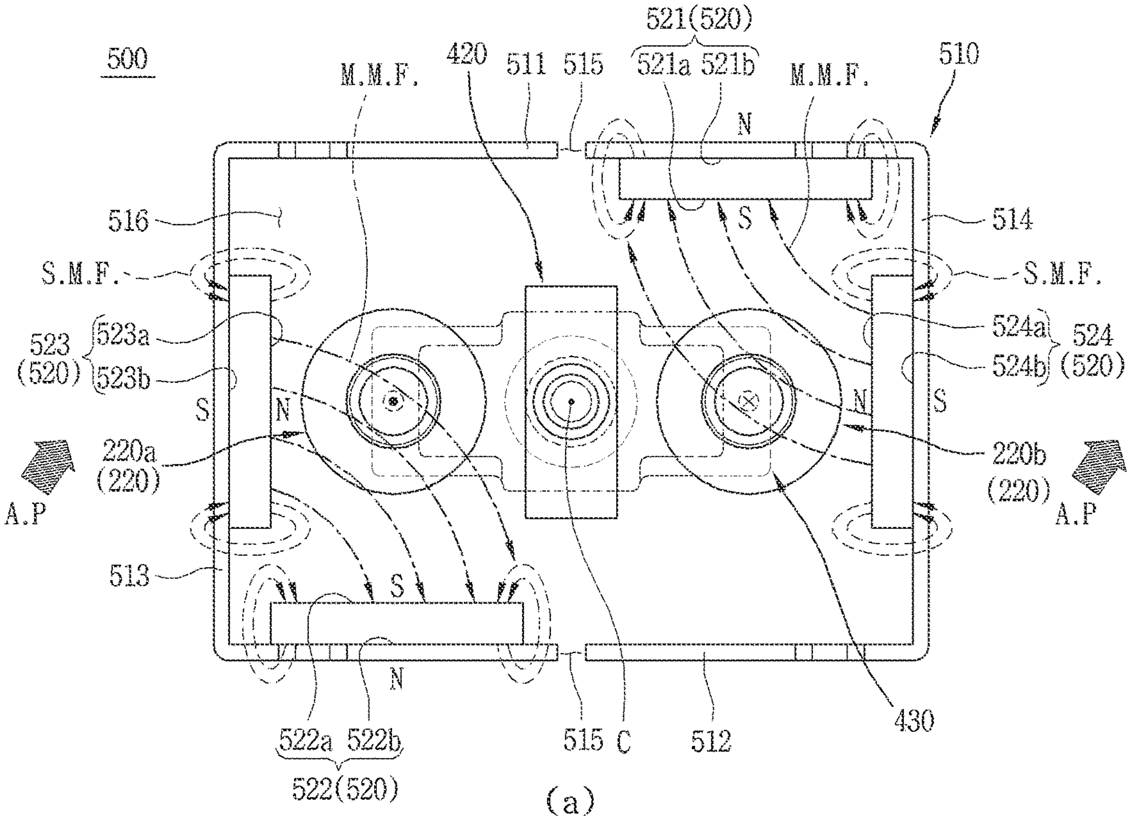
FIGS. 14 and 15 are conceptual views illustrating a state in which an arc path is formed by the arc path forming unit according to the implementation of FIG. 6.
Figure 14:
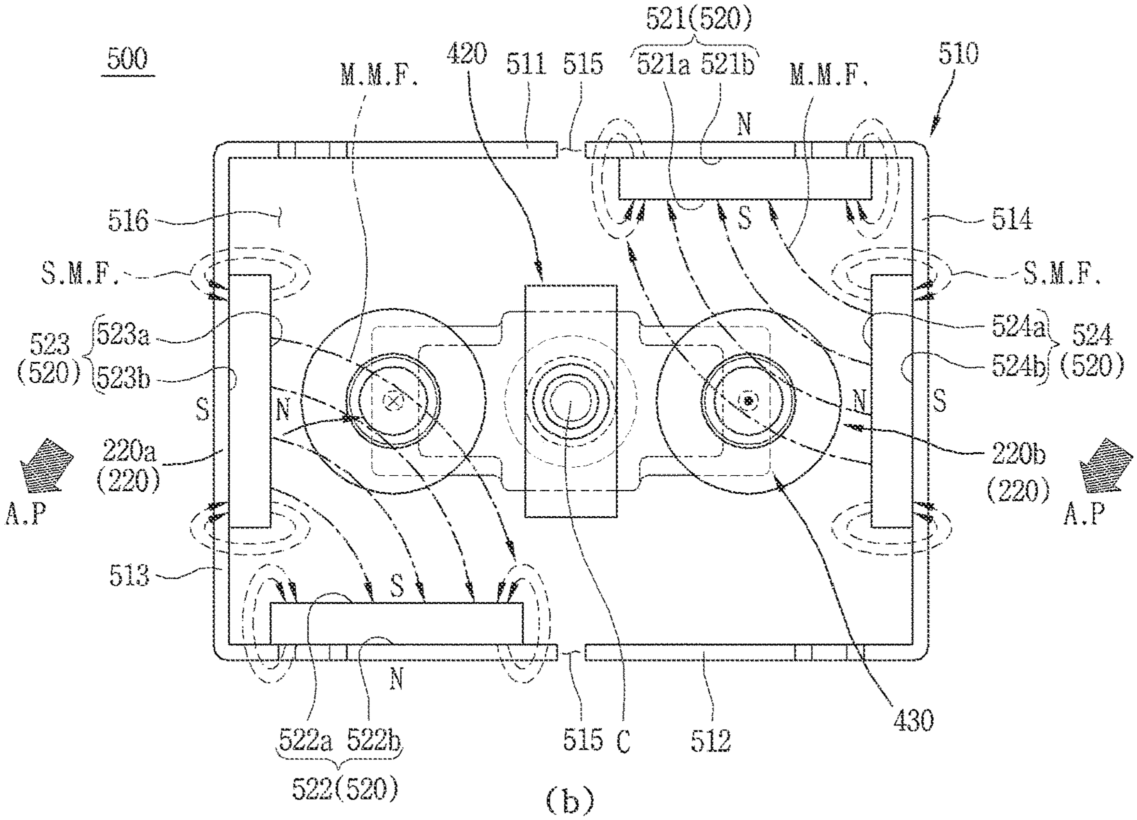
Figure 15:
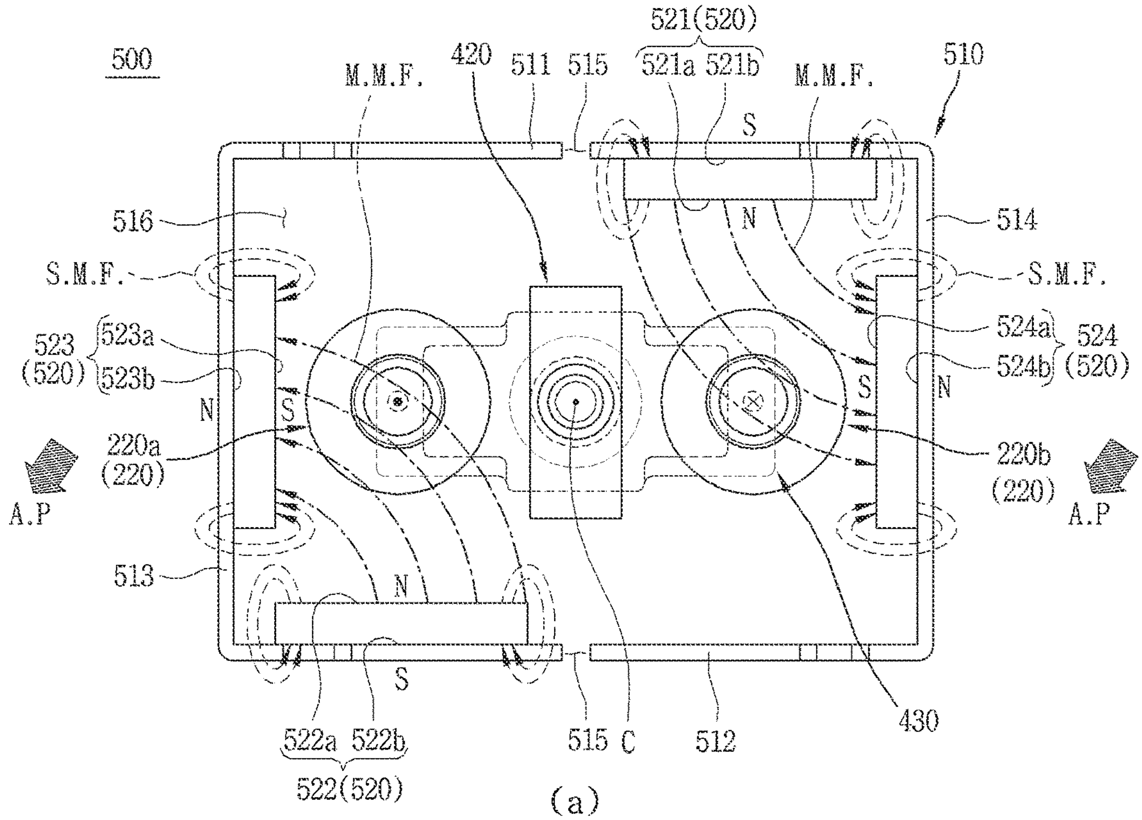
Figure 15:
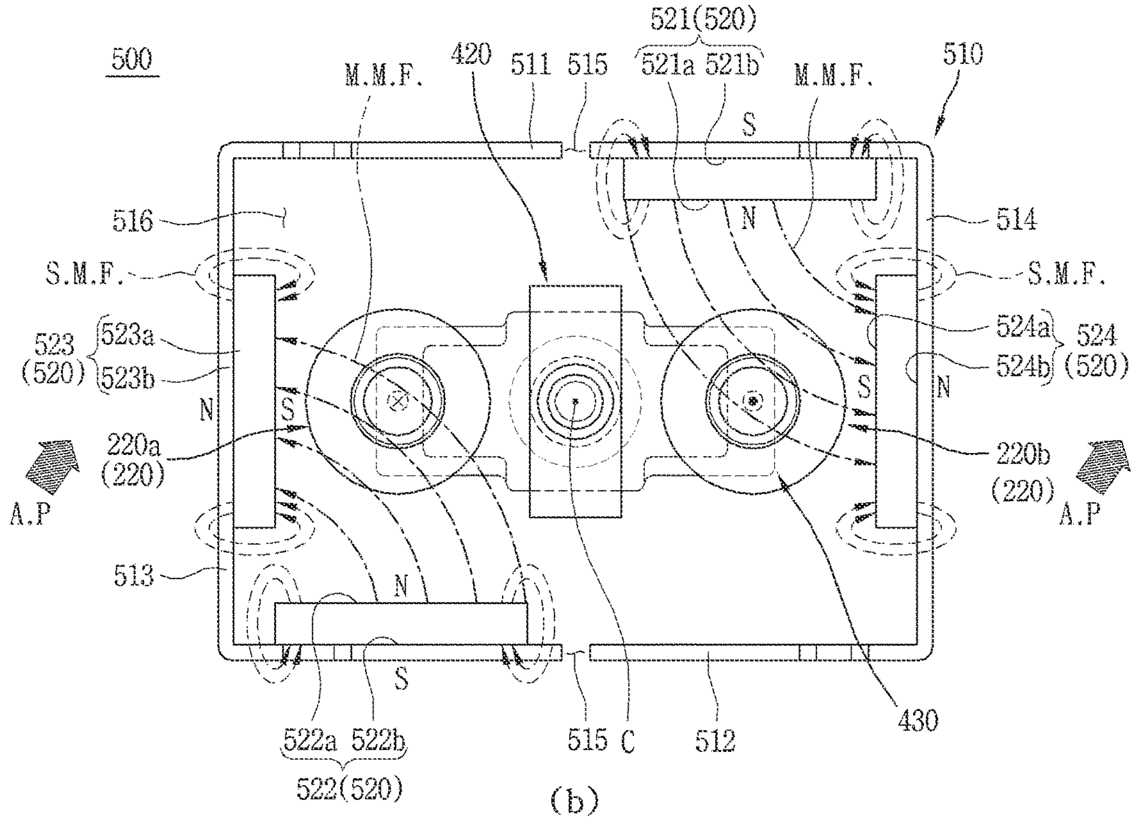
Figure 16:
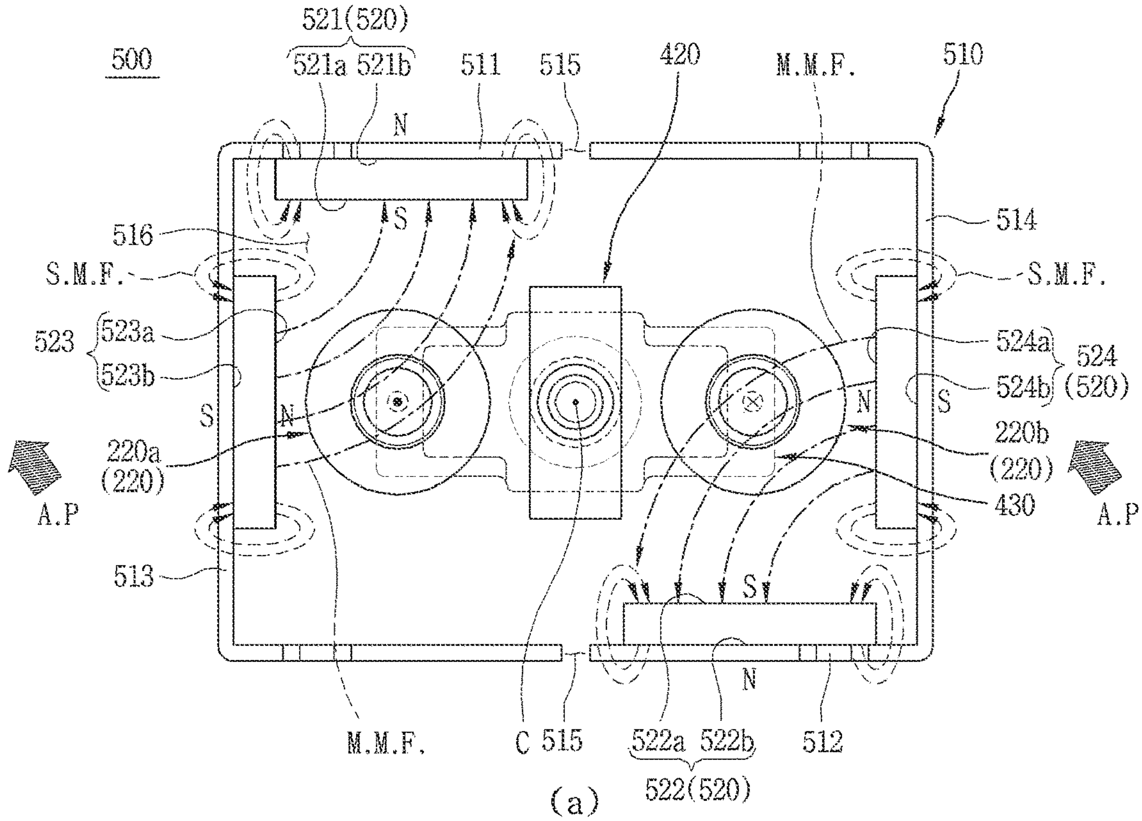
FIGS. 16 and 17 are conceptual views illustrating a state in which an arc path is formed by the arc path forming unit according to the implementation of FIG. 7.
Figure 16:
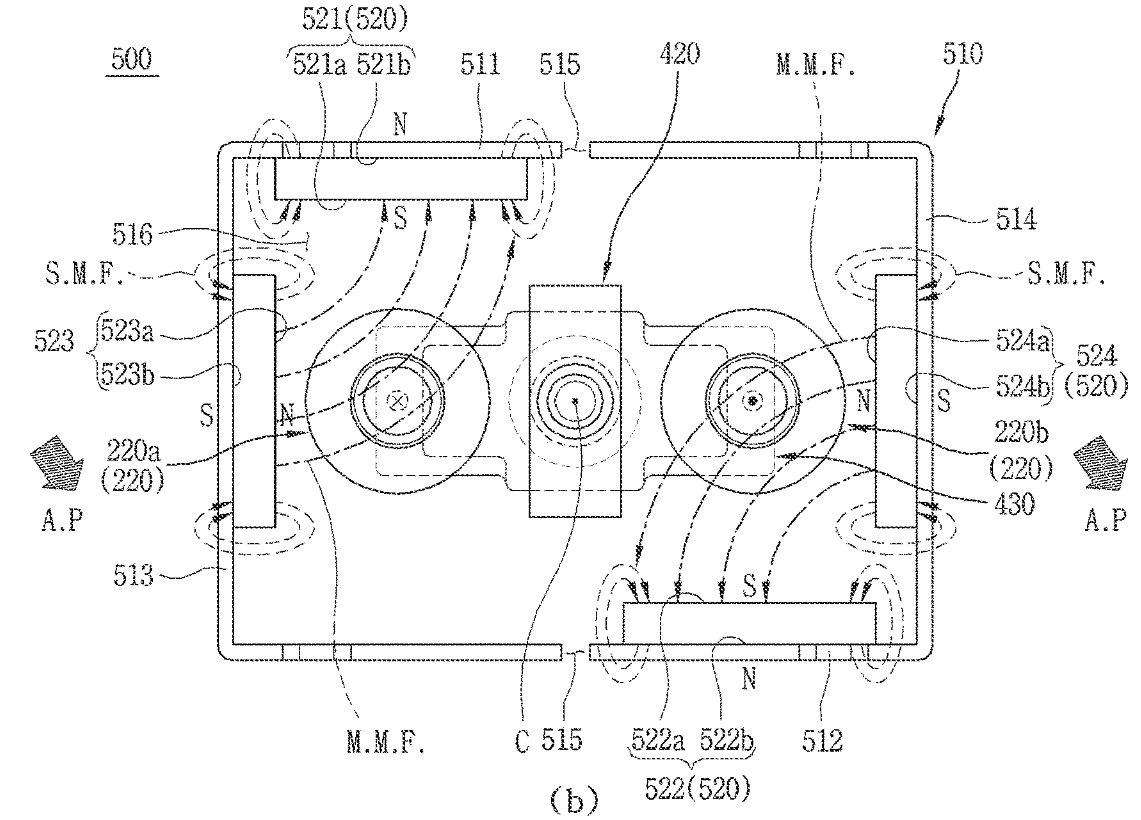
Figure 17:
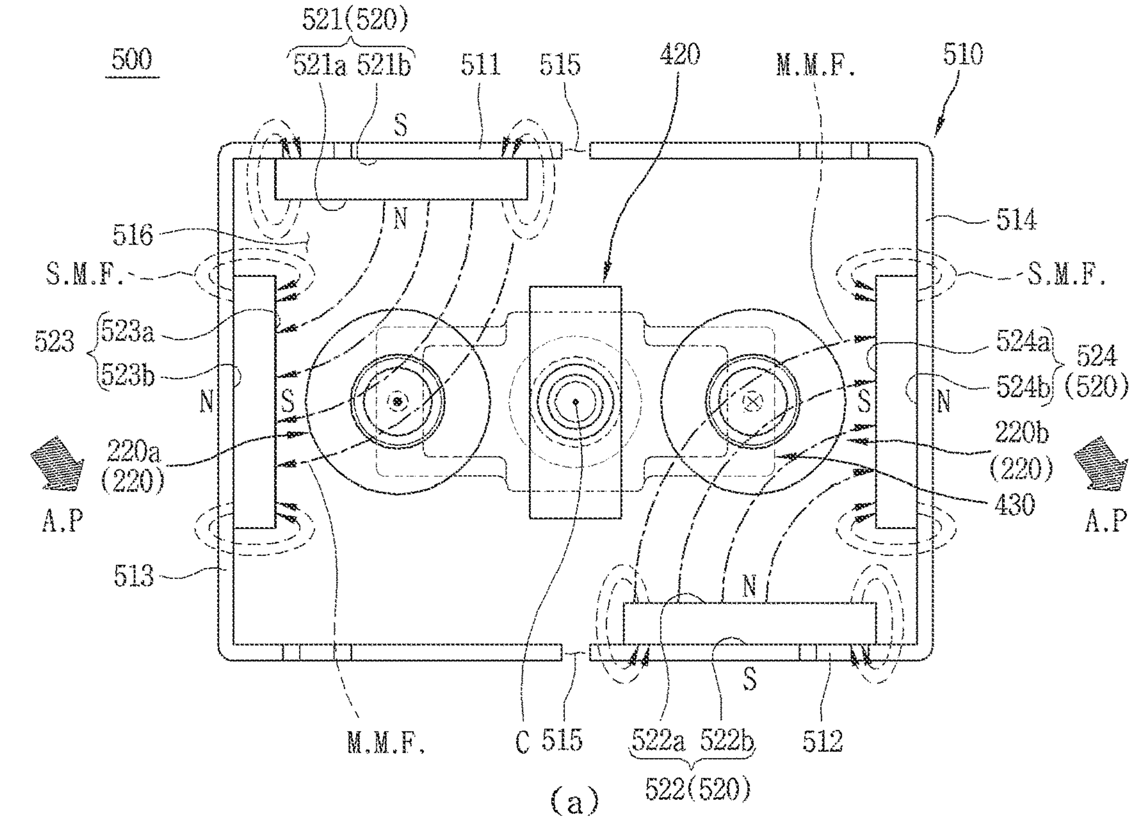
Figure 17:
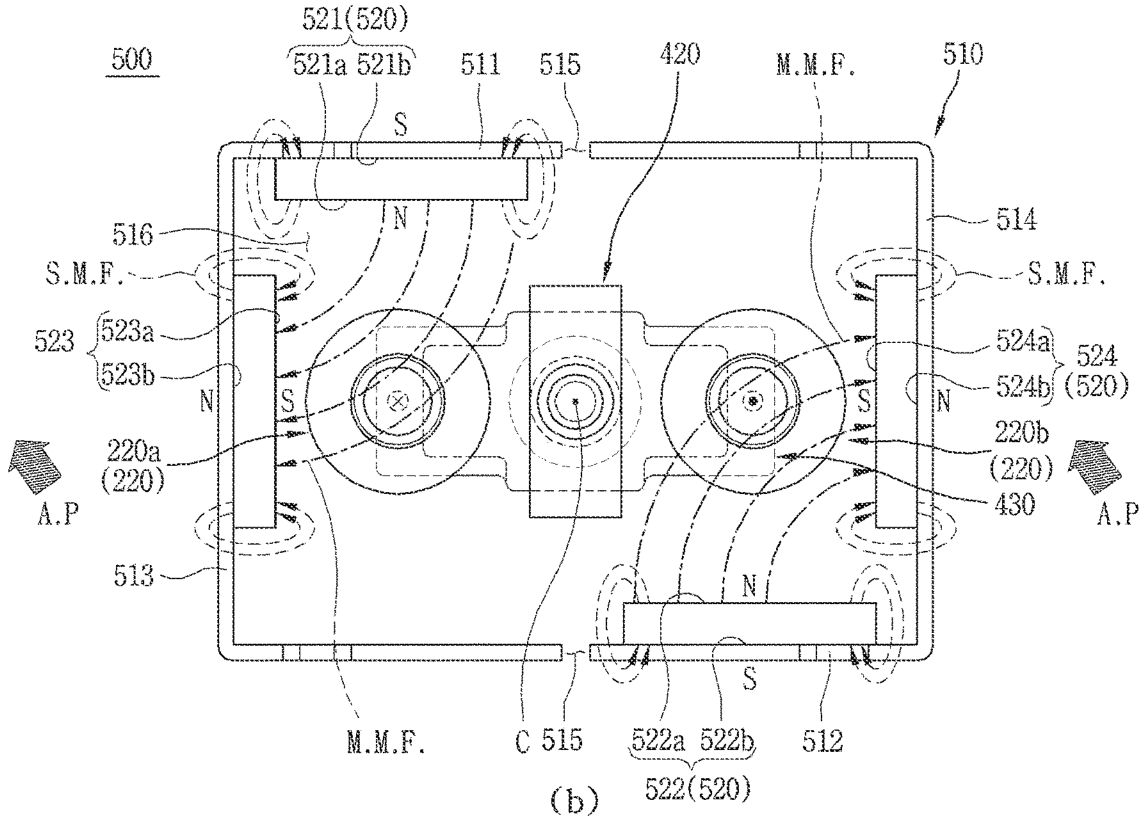

With regard to a flowing direction of current in (a) of FIG. 14, (a) of FIG. 15, (a) of FIG. 16, and (a) of FIG. 17, the current may flow into the second fixed contactor 220*b* and flow out through the first fixed contactor 220*a* via the movable contactor 430.

With regard to a flowing direction of current in (b) of FIG. 14, (b) of FIG. 15, (b) of FIG. 16, and (b) of FIG. 17, the current may flow into the first fixed contactor 220*a* and flow out through the second fixed contactor 220*b* via the movable contactor 430.

Referring to FIG. 14, the first facing surface 521*a* and the second facing surface 522*a* may be magnetized to an S pole. In addition, the third facing surface 523*a* and the fourth facing surface 524*a* may be magnetized to an N pole.

As is well known, a magnetic field diverges from an N pole and converges to an S pole.

Therefore, the main magnetic field M.M.F may be generated between the first magnet 521 and the fourth magnet 524 in a direction from the fourth facing surface 524*a* toward the first facing surface 521*a*.

At this time, the first magnet 521 may produce the sub magnetic field S.M.F in a direction from the first opposing surface 521*b* toward the first facing surface 521*a*. Also, the fourth magnet 524 may produce the sub magnetic field S.M.F in a direction from the fourth facing surface 524*a* toward the fourth opposing surface 524*b*.

The sub magnetic field S.M.F may be produced in the same direction as the main magnetic field M.M.F produced between the first magnet 521 and the fourth magnet 524. This can increase strength of the main magnetic field M.M.F produced between the first magnet 521 and the fourth magnet 524.

Accordingly, in the implementation illustrated in (a) of FIG. 14, electromagnetic force may be generated near the second fixed contactor 220*b* in a direction toward the rear right. The arc path A.P may be formed toward the rear right in the direction of the electromagnetic force.

Likewise, in the implementation illustrated in (b) of FIG. 14, electromagnetic force may be generated near the second fixed contactor 220*b* in a direction toward the front left. The arc path A.P may be formed toward the front left in the direction of the electromagnetic force.

On the other hand, the main magnetic field M.M.F may be produced between the second magnet 522 and the third magnet 523 in a direction from the third facing surface 523*a* toward the second facing surface 522*a*.

At this time, the second magnet 522 may produce the sub magnetic field S.M.F in a direction from the second opposing surface 522*b* toward the second facing surface 522*a*. Also, the third magnet 523 may produce the sub magnetic field S.M.F in a direction from the third facing surface 523*a* toward the third opposing surface 523*b*.

The sub magnetic field S.M.F may be produced in the same direction as the main magnetic field M.M.F produced between the second magnet 522 and the third magnet 523. This can increase strength of the main magnetic field M.M.F produced between the second magnet 522 and the third magnet 523.

Accordingly, in the implementation illustrated in (a) of FIG. 14, electromagnetic force may be generated near the first fixed contactor 220*a* in a direction toward the rear right. The arc path A.P may be formed toward the rear right in the direction of the electromagnetic force.

Likewise, in the implementation illustrated in (b) of FIG. 14, electromagnetic force may be generated near the first fixed contactor 220*a* in a direction toward the front left. The arc path A.P may be formed toward the front left in the direction of the electromagnetic force.

Accordingly, the arc path A.P of the generated arc cannot be formed toward the center region C. This can prevent components disposed at the center region C from being damaged.

Referring to FIG. 15, the first facing surface 521*a* and the second facing surface 522*a* may be magnetized to the N pole. In addition, the third facing surface 523*a* and the fourth facing surface 524*a* may be magnetized to the S pole.

Therefore, the main magnetic field M.M.F can be produced between the first magnet 521 and the fourth magnet 524 in a direction from the first facing surface 521*a* toward the fourth facing surface 524*a*.

In this instance, the first magnet 521 may produce the sub magnetic field S.M.F in a direction from the first facing surface 521*a* toward the first opposing surface 521*b*. At this time, the fourth magnet 524 may produce the sub magnetic field S.M.F in a direction from the fourth opposing surface 524*b* toward the fourth facing surface 524*a*.

The sub magnetic field S.M.F may be produced in the same direction as the main magnetic field M.M.F produced between the first magnet 521 and the fourth magnet 524. This can increase strength of the main magnetic field M.M.F produced between the first magnet 521 and the fourth magnet 524.

Accordingly, in the implementation illustrated in (a) of FIG. 15, electromagnetic force may be generated near the second fixed contactor 220*b* in a direction toward the front left. The arc path A.P may be formed toward the front left in the direction of the electromagnetic force.

Likewise, in the implementation illustrated in (b) of FIG. 15, electromagnetic force may be generated near the second fixed contactor 220*b* in a direction toward the rear right. The arc path A.P may be formed toward the rear right in the direction of the electromagnetic force.

Likewise, the main magnetic field M.M.F may be produced between the second magnet 522 and the third magnet 523 in a direction from the second facing surface 522*a* toward the third facing surface 523*a*.

In this instance, the second magnet 522 may produce the sub magnetic field S.M.F in a direction from the second facing surface 522*a* toward the second opposing surface 522*b*. At this time, the third magnet 523 may produce the sub magnetic field S.M.F in a direction from the third opposing surface 523*b* toward the third facing surface 523*a*.

The sub magnetic field S.M.F may be produced in the same direction as the main magnetic field M.M.F produced between the second magnet 522 and the third magnet 523. This can increase strength of the main magnetic field M.M.F produced between the second magnet 522 and the third magnet 523.

Accordingly, in the implementation illustrated in (a) of FIG. 15, electromagnetic force may be generated near the first fixed contactor 220*a* in a direction toward the front left. The arc path A.P may be formed toward the front left in the direction of the electromagnetic force.

Likewise, in the implementation illustrated in (b) of FIG. 15, electromagnetic force may be generated near the first fixed contactor 220*a* in a direction toward the rear right. The arc path A.P may be formed toward the rear right in the direction of the electromagnetic force.

Accordingly, the arc path A.P of the generated arc cannot be formed toward the center region C. This can prevent components disposed at the center region C from being damaged.

Referring to FIG. 16, the first facing surface 521*a* and the second facing surface 522*a* may be magnetized to the S pole. In addition, the third facing surface 523*a* and the fourth facing surface 524*a* may be magnetized to the N pole.

Therefore, the main magnetic field M.M.F can be produced between the first magnet 521 and the third magnet 523 in a direction from the third facing surface 523*a* toward the first facing surface 521*a*.

At this time, the first magnet 521 may produce the sub magnetic field S.M.F in a direction from the first opposing surface 521*b* toward the first facing surface 521*a*. Also, the third magnet 523 may produce the sub magnetic field S.M.F in a direction from the third facing surface 523*a* toward the third opposing surface 523*b*.

The sub magnetic field S.M.F may be produced in the same direction as the main magnetic field M.M.F produced between the first magnet 521 and the third magnet 523. This can increase strength of the main magnetic field M.M.F produced between the first magnet 521 and the third magnet 523.

Accordingly, in the implementation illustrated in (a) of FIG. 16, electromagnetic force may be generated near the first fixed contactor 220*a* in a direction toward the rear left. The arc path A.P may be formed toward the rear left in the direction of the electromagnetic force.

Similarly, in the implementation illustrated in (b) of FIG. 16, electromagnetic force may be generated near the first fixed contactor 220*a* in a direction toward the front right. The arc path A.P may be formed toward the front right in the direction of the electromagnetic force.

Likewise, the main magnetic field M.M.F can be produced between the second magnet 522 and the fourth magnet 524 in a direction from the fourth facing surface 524*a* toward the second facing surface 522*a*.

At this time, the second magnet 522 may produce the sub magnetic field S.M.F in a direction from the second opposing surface 522*b* toward the second facing surface 522*a*. Also, the fourth magnet 524 may produce the sub magnetic field S.M.F in a direction from the fourth facing surface 524*a* toward the third opposing surface 524*b*.

The sub magnetic field S.M.F may be produced in the same direction as the main magnetic field M.M.F produced between the second magnet 522 and the fourth magnet 524. This can increase strength of the main magnetic field M.M.F produced between the second magnet 522 and the fourth magnet 524.

Accordingly, in the implementation illustrated in (a) of FIG. 16, electromagnetic force may be generated near the second fixed contactor 220*b* in a direction toward the rear left. The arc path A.P may be formed toward the rear left in the direction of the electromagnetic force.

Similarly, in the implementation illustrated in (b) of FIG. 16, electromagnetic force may be generated near the second fixed contactor 220*b* in a direction toward the front right. The arc path A.P may be formed toward the front right in the direction of the electromagnetic force.

Accordingly, the arc path A.P of the generated arc cannot be formed toward the center region C. This can prevent components disposed at the center region C from being damaged.

Referring to FIG. 17, the first facing surface 521*a* and the second facing surface 522*a* may be magnetized to the N pole. In addition, the third facing surface 523*a* and the fourth facing surface 524*a* may be magnetized to the S pole.

Therefore, the main magnetic field M.M.F can be produced between the first magnet 521 and the third magnet 523 in a direction from the first facing surface 521*a* toward the third facing surface 523*a*.

In this instance, the first magnet 521 may produce the sub magnetic field S.M.F in a direction from the first facing surface 521*a* toward the first opposing surface 521*b*. At this time, the third magnet 523 may produce the sub magnetic field S.M.F in a direction from the third opposing surface 523*b* toward the third facing surface 523*a*.

The sub magnetic field S.M.F may be produced in the same direction as the main magnetic field M.M.F produced between the first magnet 521 and the third magnet 523. This can increase strength of the main magnetic field M.M.F produced between the first magnet 521 and the third magnet 523.

Accordingly, in the implementation illustrated in (a) of FIG. 17, electromagnetic force may be generated near the first fixed contactor 220*a* in a direction toward the front right. The arc path A.P may be formed toward the front right in the direction of the electromagnetic force.

Similarly, in the implementation illustrated in (b) of FIG. 17, electromagnetic force may be generated near the first fixed contactor 220*a* in a direction toward the rear left. The arc path A.P may be formed toward the rear left in the direction of the electromagnetic force.

Likewise, the main magnetic field M.M.F may be produced between the second magnet 522 and the fourth magnet 524 in a direction from the second facing surface 522*a* toward the fourth facing surface 524*a*.

In this instance, the second magnet 522 may produce the sub magnetic field S.M.F in a direction from the second facing surface 522*a* toward the second opposing surface 522*b*. At this time, the fourth magnet 524 may produce the sub magnetic field S.M.F in a direction from the fourth opposing surface 524*b* toward the fourth facing surface 524*a*.

The sub magnetic field S.M.F may be produced in the same direction as the main magnetic field M.M.F produced between the second magnet 522 and the fourth magnet 524. This can increase strength of the main magnetic field M.M.F produced between the second magnet 522 and the fourth magnet 524.

Accordingly, in the implementation illustrated in (a) of FIG. 17, electromagnetic force may be generated near the second fixed contactor 220*b* in a direction toward the front right. The arc path A.P may be formed toward the front right in the direction of the electromagnetic force.

Similarly, in the implementation illustrated in (b) of FIG. 17, electromagnetic force may be generated near the second fixed contactor 220*b* in a direction toward the rear left. The arc path A.P may be formed toward the rear left in the direction of the electromagnetic force.

Accordingly, the arc path A.P of the generated arc cannot be formed toward the center region C. This can prevent components disposed at the center region C from being damaged.

(2) Description of Arc Path A.P Formed by Arc Path Forming Unit 600 According to Another Implementation Hereinafter, an arc path A.P generated by the arc path forming unit 600 according to another implementation will be described in detail, with reference to FIGS. 18 to 21.

Figure 18:
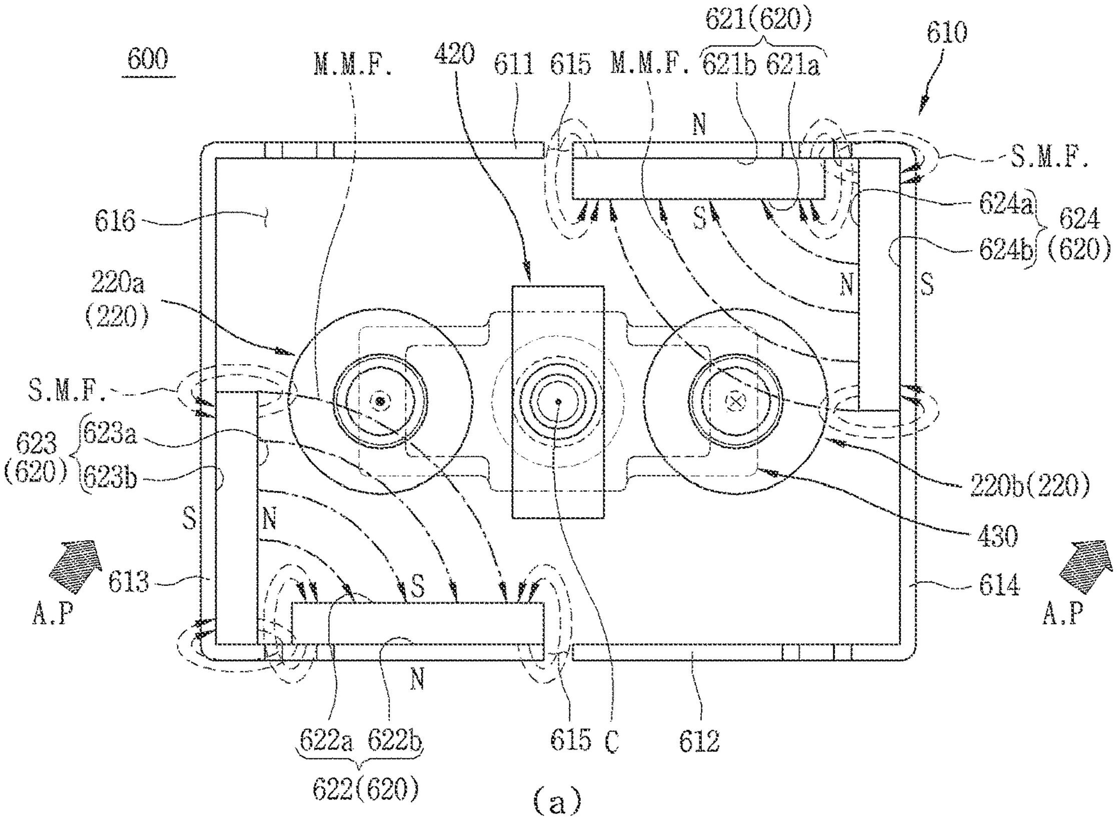
FIGS. 18 and 19 are conceptual views illustrating a state in which an arc path is formed by the arc path forming unit according to the implementation of FIG. 8.
Figure 18:
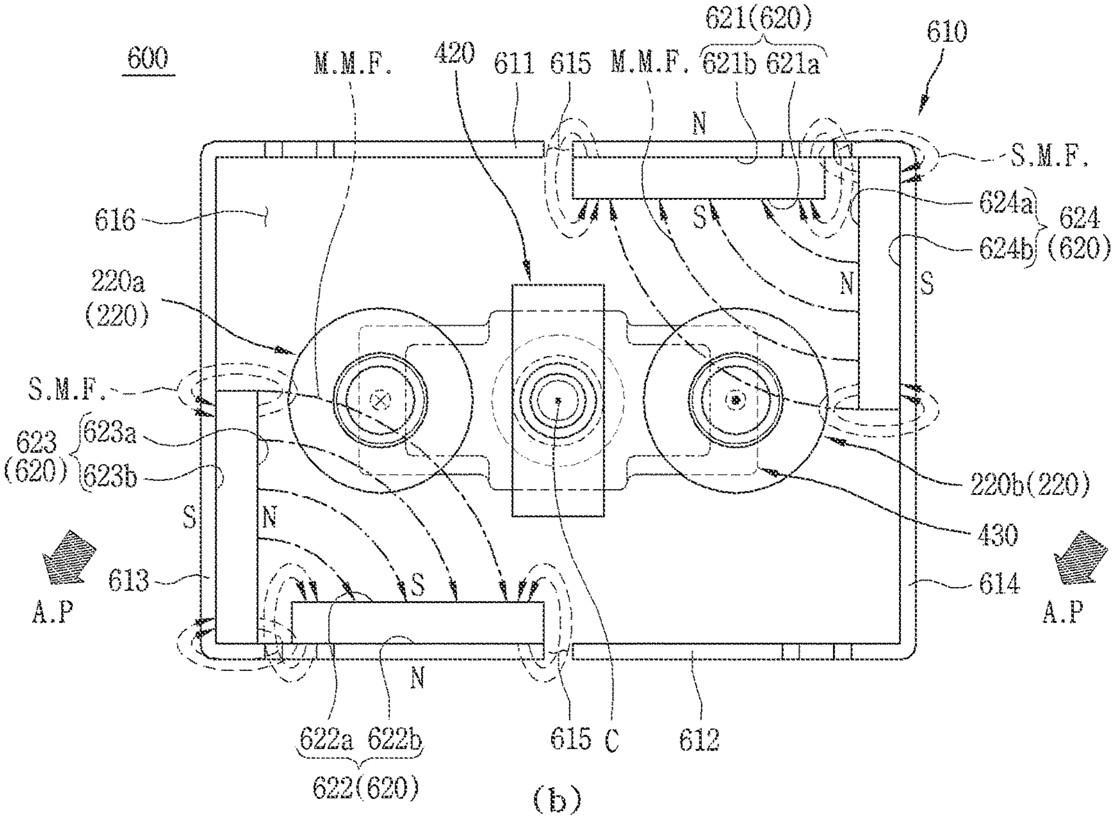
Figure 19:
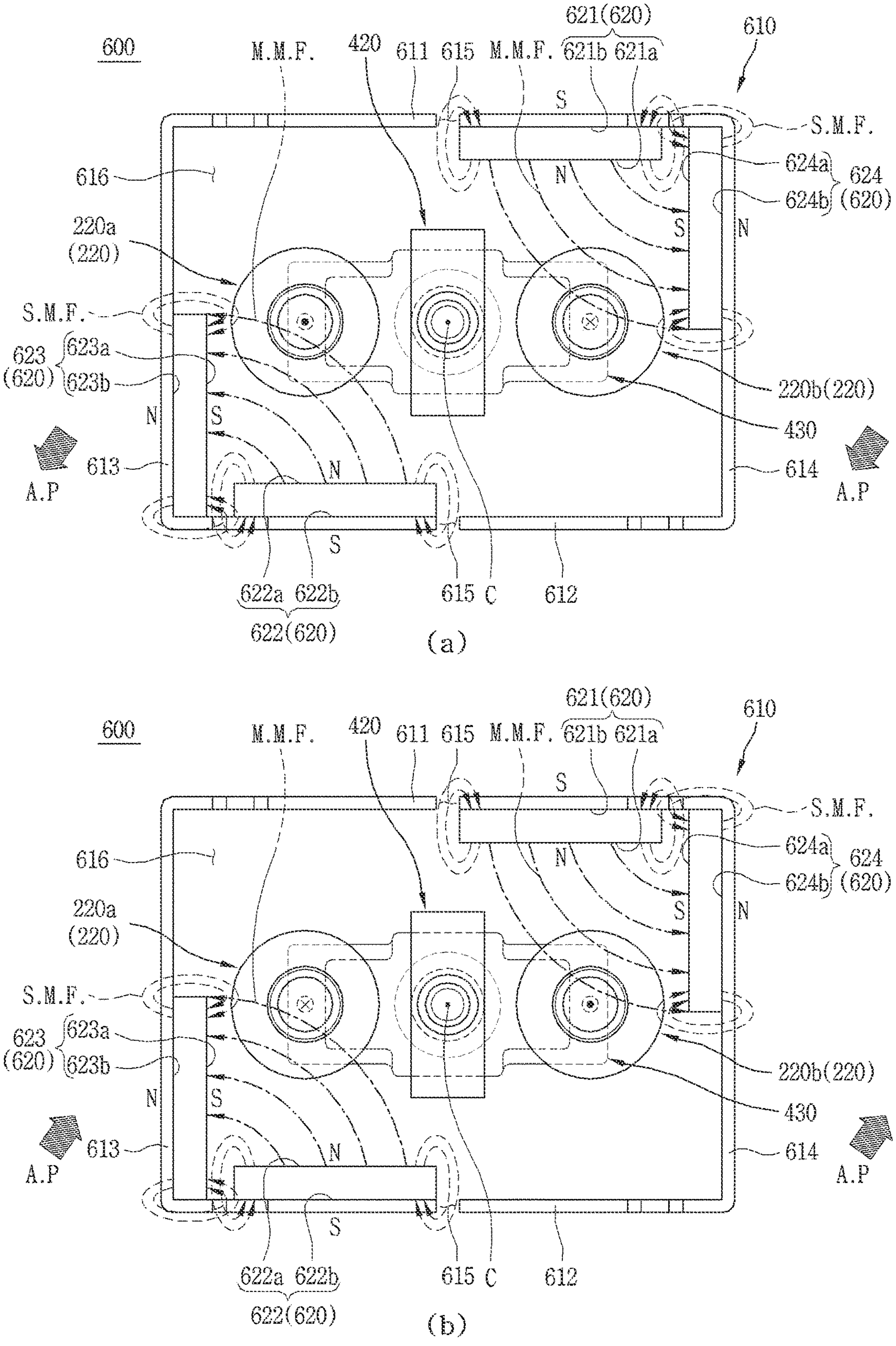
Figure 20:
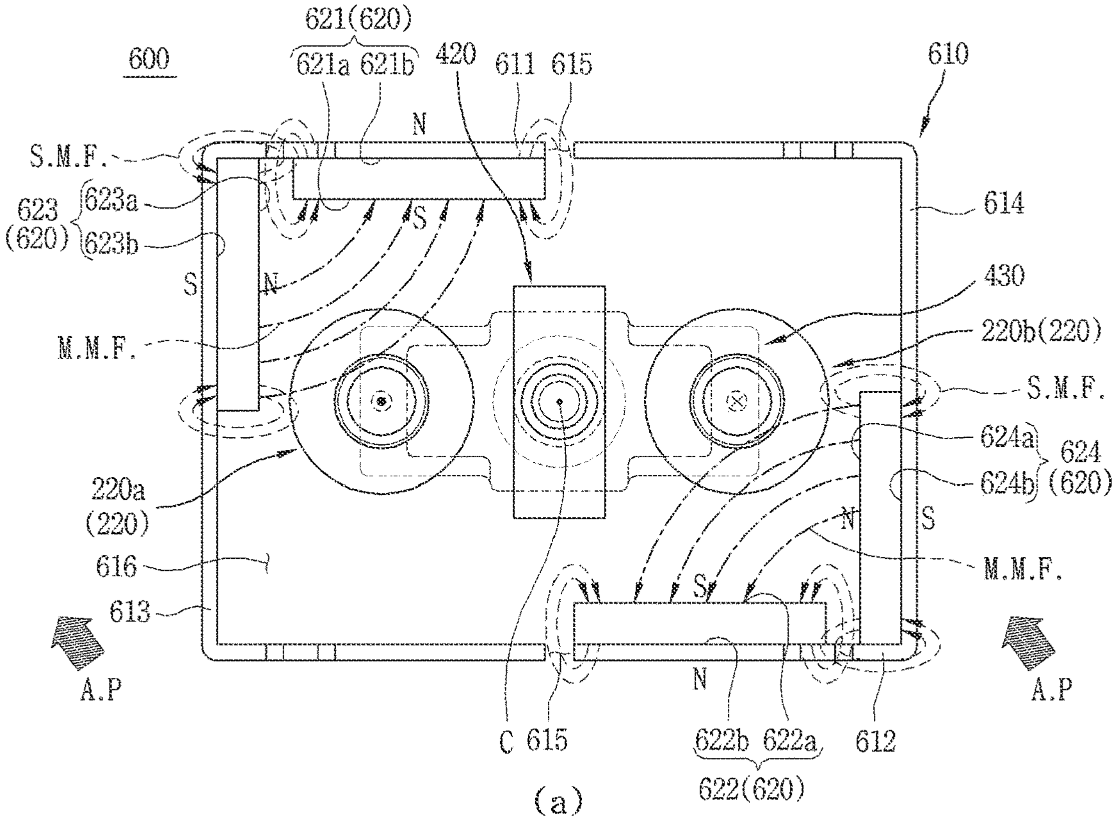
FIGS. 20 and 21 are conceptual views illustrating a state in which an arc path is formed by the arc path forming unit according to the implementation of FIG. 9.
Figure 20:
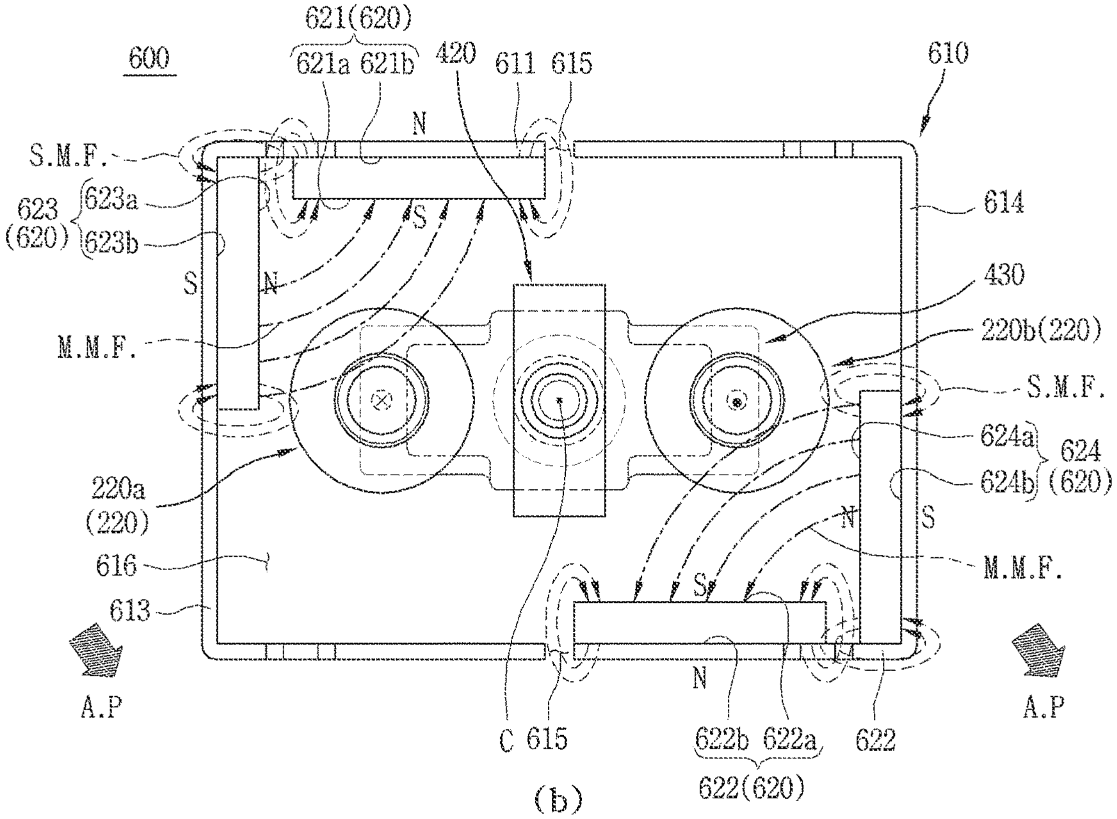
Figure 21:
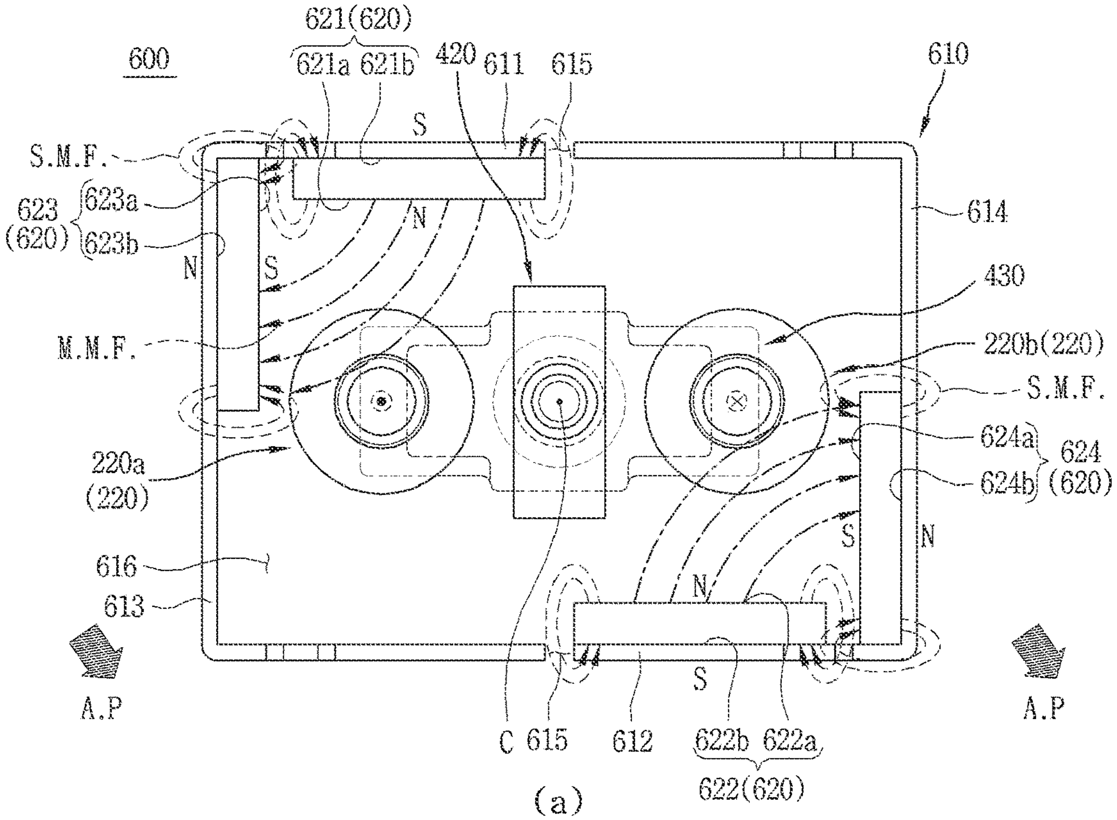
Figure 21:
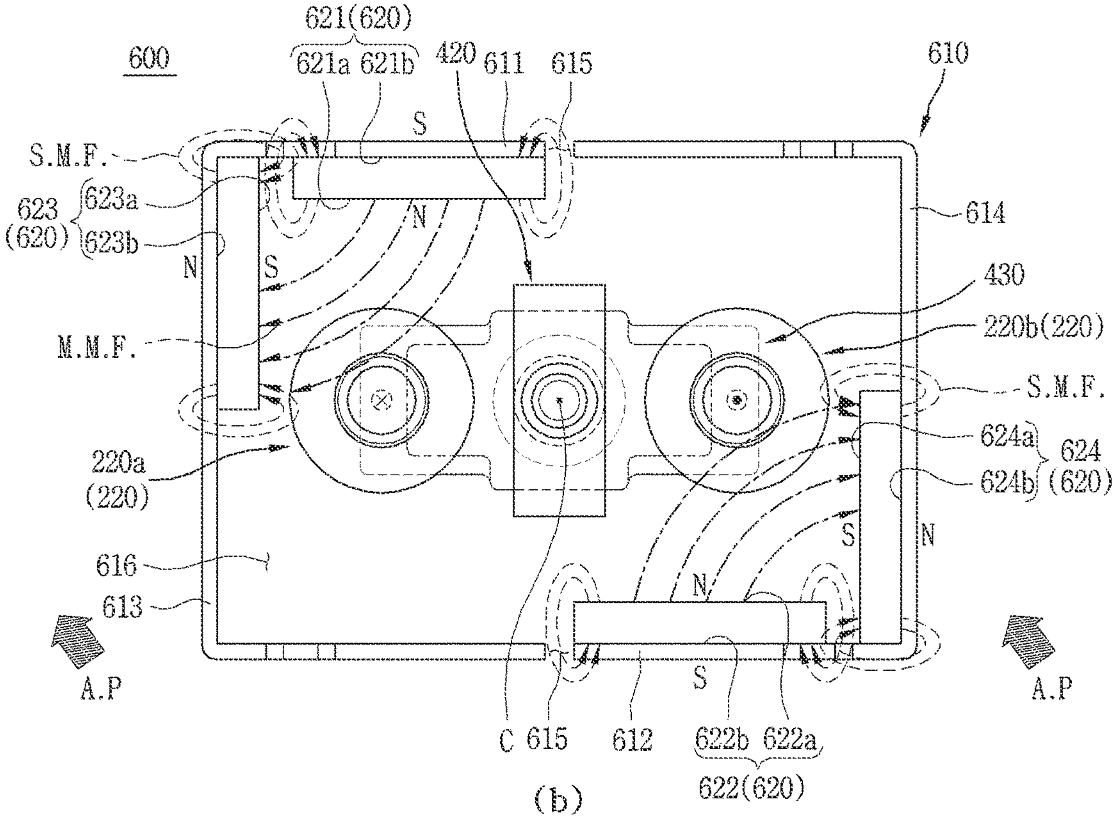

With regard to a flowing direction of current in (a) of FIG. 18, (a) of FIG. 19, (a) of FIG. 20, and (a) of FIG. 21, the current may flow into the second fixed contactor 220*b* and flow out through the first fixed contactor 220*a* via the movable contactor 430.

With regard to a flowing direction of current in (b) of FIG. 18, (b) of FIG. 19, (b) of FIG. 20, and (b) of FIG. 21, the current may flow into the first fixed contactor 220*a* and flow out through the second fixed contactor 220*b* via the movable contactor 430.

Referring to FIG. 18, the first facing surface 621*a* and the second facing surface 622*a* may be magnetized to the S pole. In addition, the third facing surface 623*a* and the fourth facing surface 624*a* may be magnetized to an N pole.

The process and direction in which the main magnetic field M.M.F and the sub magnetic field S.M.F are produced by the first magnet 621 and the fourth magnet 624 are the same as those in the previous implementation of FIG. 14.

Accordingly, in the implementation illustrated in (a) of FIG. 18, electromagnetic force may be generated near the second fixed contactor 220*b* in a direction toward the rear right. The arc path A.P may be formed toward the rear right in the direction of the electromagnetic force.

Similarly, in the implementation illustrated in (b) of FIG. 18, electromagnetic force may be generated near the second fixed contactor 220*b* in a direction toward the front left. The arc path A.P may be formed toward the front left in the direction of the electromagnetic force.

The process and direction in which the main magnetic field M.M.F and the sub magnetic field S.M.F are produced by the second magnet 622 and the third magnet 623 are the same as those in the previous implementation of FIG. 14.

Accordingly, in the implementation illustrated in (a) of FIG. 18, electromagnetic force may be generated near the first fixed contactor 220*a* in a direction toward the rear right. The arc path A.P may be formed toward the rear right in the direction of the electromagnetic force.

Similarly, in the implementation illustrated in (b) of FIG. 18, electromagnetic force may be generated near the first fixed contactor 220*a* in a direction toward the front left. The arc path A.P may be formed toward the front left in the direction of the electromagnetic force.

Accordingly, the arc path A.P of the generated arc cannot be formed toward the center region C. This can prevent components disposed at the center region C from being damaged.

Referring to FIG. 19, the first facing surface 621*a* and the second facing surface 622*a* may be magnetized to the N pole. In addition, the third facing surface 623*a* and the fourth facing surface 624*a* may be magnetized to the S pole.

The process and direction in which the main magnetic field M.M.F and the sub magnetic field S.M.F are produced by the first magnet 621 and the fourth magnet 624 are the same as those in the previous implementation of FIG. 15.

Accordingly, in the implementation illustrated in (a) of FIG. 19, electromagnetic force may be generated near the second fixed contactor 220*b* in a direction toward the front left. The arc path A.P may be formed toward the front left in the direction of the electromagnetic force.

Similarly, in the implementation illustrated in (b) of FIG. 19, electromagnetic force may be generated near the second fixed contactor 220*b* in a direction toward the rear right. The arc path A.P may be formed toward the rear right in the direction of the electromagnetic force.

The process and direction in which the main magnetic field M.M.F and the sub magnetic field S.M.F are produced by the second magnet 622 and the third magnet 623 are the same as those in the previous implementation of FIG. 15.

Accordingly, in the implementation illustrated in (a) of FIG. 19, electromagnetic force may be generated near the first fixed contactor 220*a* in a direction toward the front left. The arc path A.P may be formed toward the front left in the direction of the electromagnetic force.

Similarly, in the implementation illustrated in (b) of FIG. 19, electromagnetic force may be generated near the first fixed contactor 220*a* in a direction toward the rear right. The arc path A.P may be formed toward the rear right in the direction of the electromagnetic force.

Accordingly, the arc path A.P of the generated arc cannot be formed toward the center region C. This can prevent components disposed at the center region C from being damaged.

Referring to FIG. 20, the first facing surface 621*a* and the second facing surface 622*a* may be magnetized to the S pole. In addition, the third facing surface 623*a* and the fourth facing surface 624*a* may be magnetized to the N pole.

The process and direction in which the main magnetic field M.M.F and the sub magnetic field S.M.F are produced by the first magnet 621 and the third magnet 623 are the same as those in the previous implementation of FIG. 16.

Accordingly, in the implementation illustrated in (a) of FIG. 20, electromagnetic force may be generated near the first fixed contactor 220*a* in a direction toward the rear left. The arc path A.P may be formed toward the rear left in the direction of the electromagnetic force.

Similarly, in the implementation illustrated in (b) of FIG. 20, electromagnetic force may be generated near the first fixed contactor 220*a* in a direction toward the front right. The arc path A.P may be formed toward the front right in the direction of the electromagnetic force.

The process and direction in which the main magnetic field M.M.F and the sub magnetic field S.M.F are produced by the second magnet 622 and the fourth magnet 624 are the same as those in the previous implementation of FIG. 16.

Accordingly, in the implementation illustrated in (a) of FIG. 20, electromagnetic force may be generated near the second fixed contactor 220*b* in a direction toward the rear left. The arc path A.P may be formed toward the rear left in the direction of the electromagnetic force.

Similarly, in the implementation illustrated in (b) of FIG. 20, electromagnetic force may be generated near the second fixed contactor 220*b* in a direction toward the front right. The arc path A.P may be formed toward the front right in the direction of the electromagnetic force.

Accordingly, the arc path A.P of the generated arc cannot be formed toward the center region C. This can prevent components disposed at the center region C from being damaged.

Referring to FIG. 21, the first facing surface 621*a* and the second facing surface 622*a* may be magnetized to the N pole. In addition, the third facing surface 623*a* and the fourth facing surface 624*a* may be magnetized to the S pole.

The process and direction in which the main magnetic field M.M.F and the sub magnetic field S.M.F are produced by the first magnet 621 and the third magnet 623 are the same as those in the previous implementation of FIG. 17.

Accordingly, in the implementation illustrated in (a) of FIG. 21, electromagnetic force may be generated near the first fixed contactor 220*a* in a direction toward the front right. The arc path A.P may be formed toward the front right in the direction of the electromagnetic force.

Similarly, in the implementation illustrated in (b) of FIG. 21, electromagnetic force may be generated near the first fixed contactor 220*a* in a direction toward the rear left. The arc path A.P may be formed toward the rear left in the direction of the electromagnetic force.

The process and direction in which the main magnetic field M.M.F and the sub magnetic field S.M.F are produced by the second magnet 622 and the fourth magnet 624 are the same as those in the previous implementation of FIG. 17.

Accordingly, in the implementation illustrated in (a) of FIG. 21, electromagnetic force may be generated near the second fixed contactor 220*b* in a direction toward the front right. The arc path A.P may be formed toward the front right in the direction of the electromagnetic force.

Similarly, in the implementation illustrated in (b) of FIG. 21, electromagnetic force may be generated near the second fixed contactor 220*b* in a direction toward the rear left. The arc path A.P may be formed toward the rear left in the direction of the electromagnetic force.

Accordingly, the arc path A.P of the generated arc cannot be formed toward the center region C. This can prevent components disposed at the center region C from being damaged.

In this implementation, the first magnet 621 may be disposed much closer to the third magnet 623 or the fourth magnet 624 compared to the previous implementation. The second magnet 622 may also be disposed much closer to the third magnet 623 or the fourth magnet 624.

This can further strengthen a magnetic field produced between the first magnet 621 and the third magnet 623 or the fourth magnet 624 and a magnetic field produced between the second magnet 622 and the third magnet 623 or the fourth magnet 624.

(3) Description of Arc Path A.P Formed by Arc Path Forming Unit 700 According to Still Another Implementation Hereinafter, an arc path A.P generated by the arc path forming unit 700 according to still another implementation will be described in detail, with reference to FIGS. 22 to 25.

Figure 22:
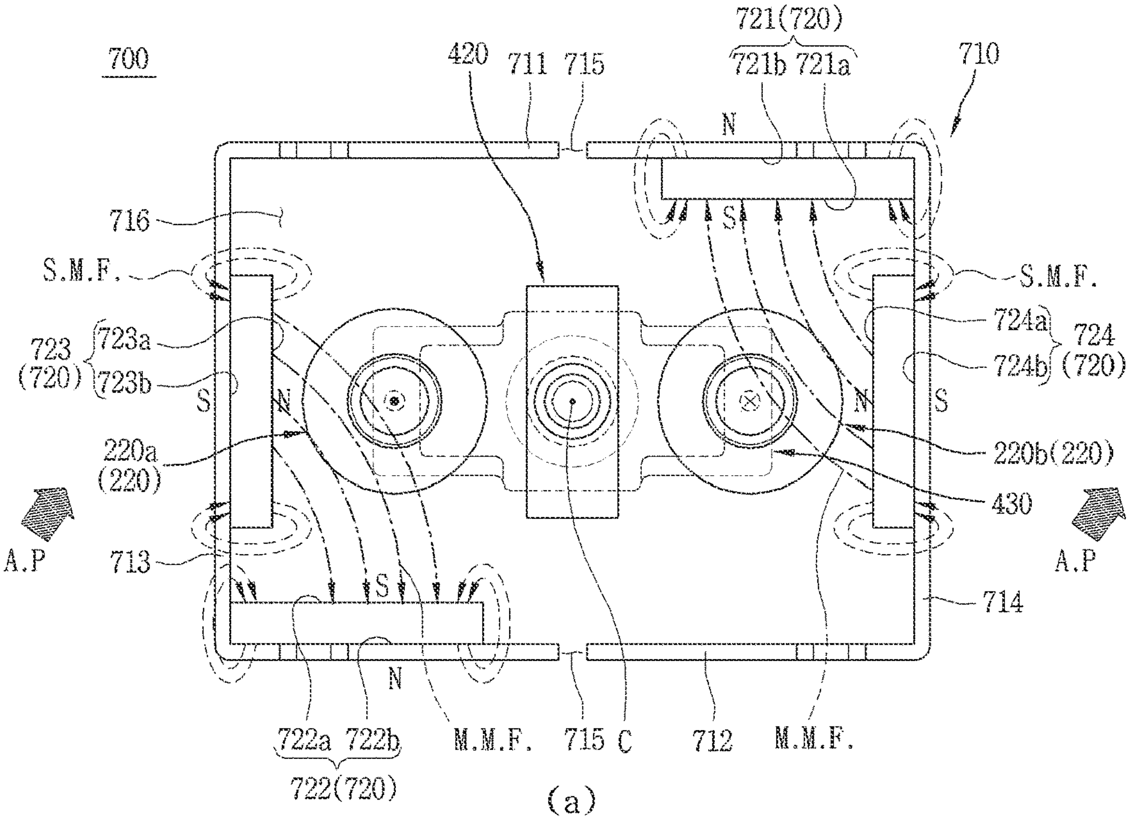
FIGS. 22 and 23 are conceptual views illustrating a state in which an arc path is formed by the arc path forming unit according to the implementation of FIG. 10.
Figure 22:
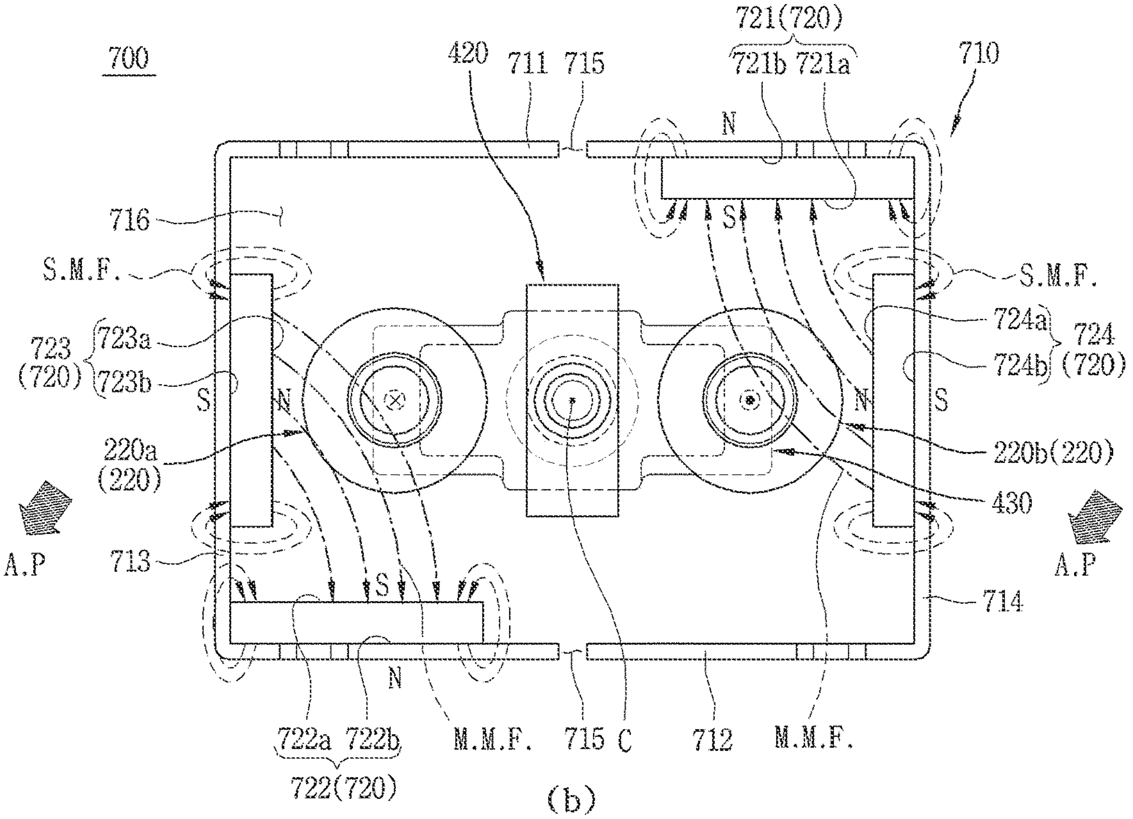
Figure 23:
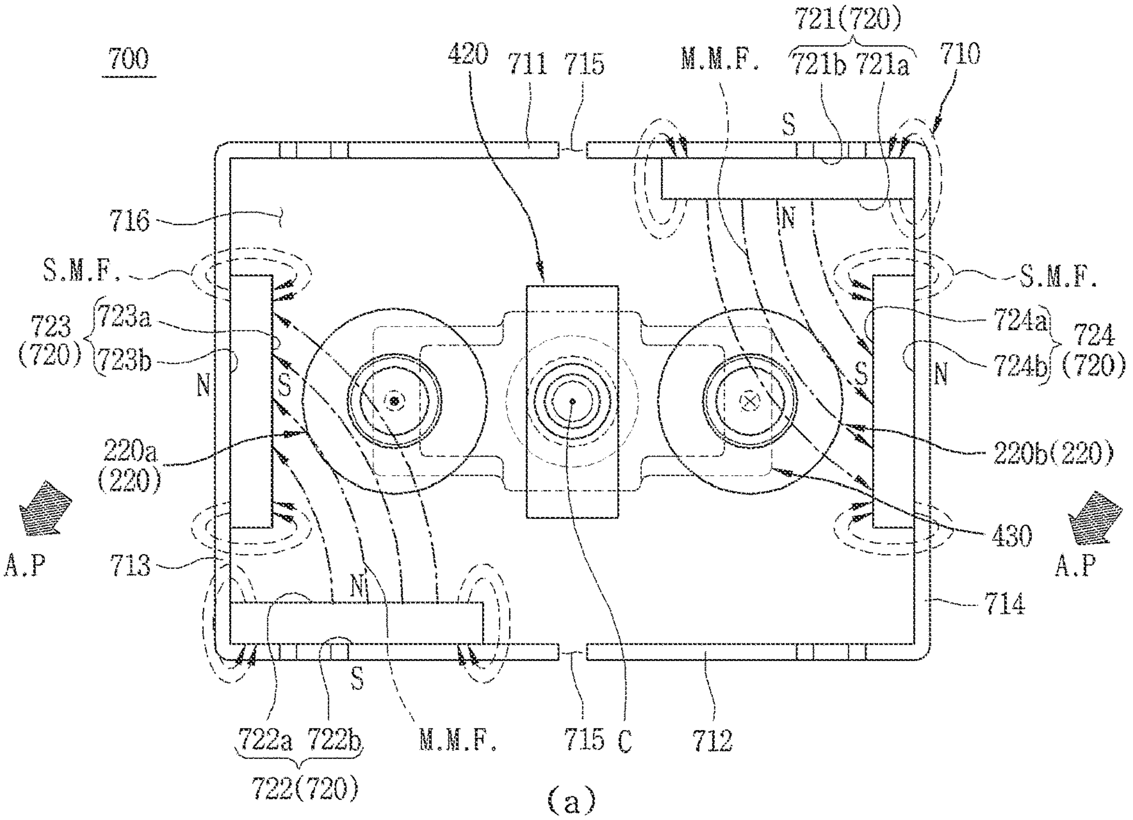
Figure 23:
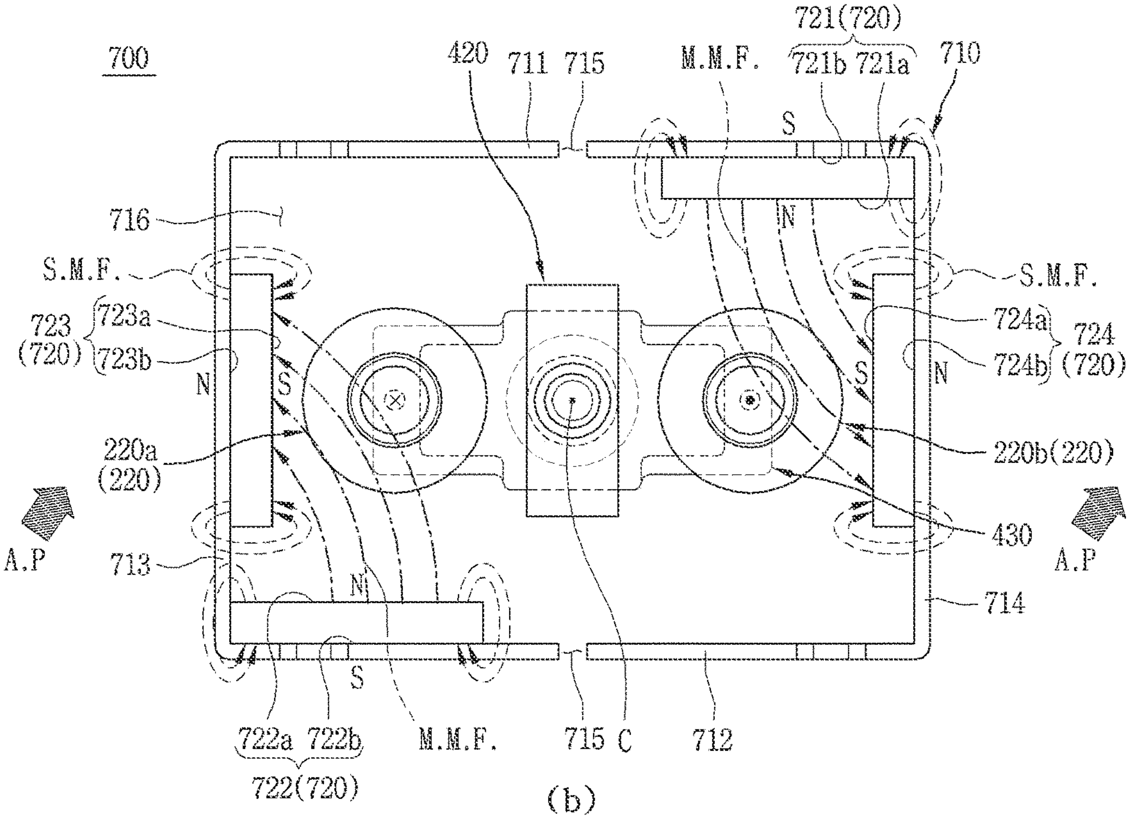
Figure 24:
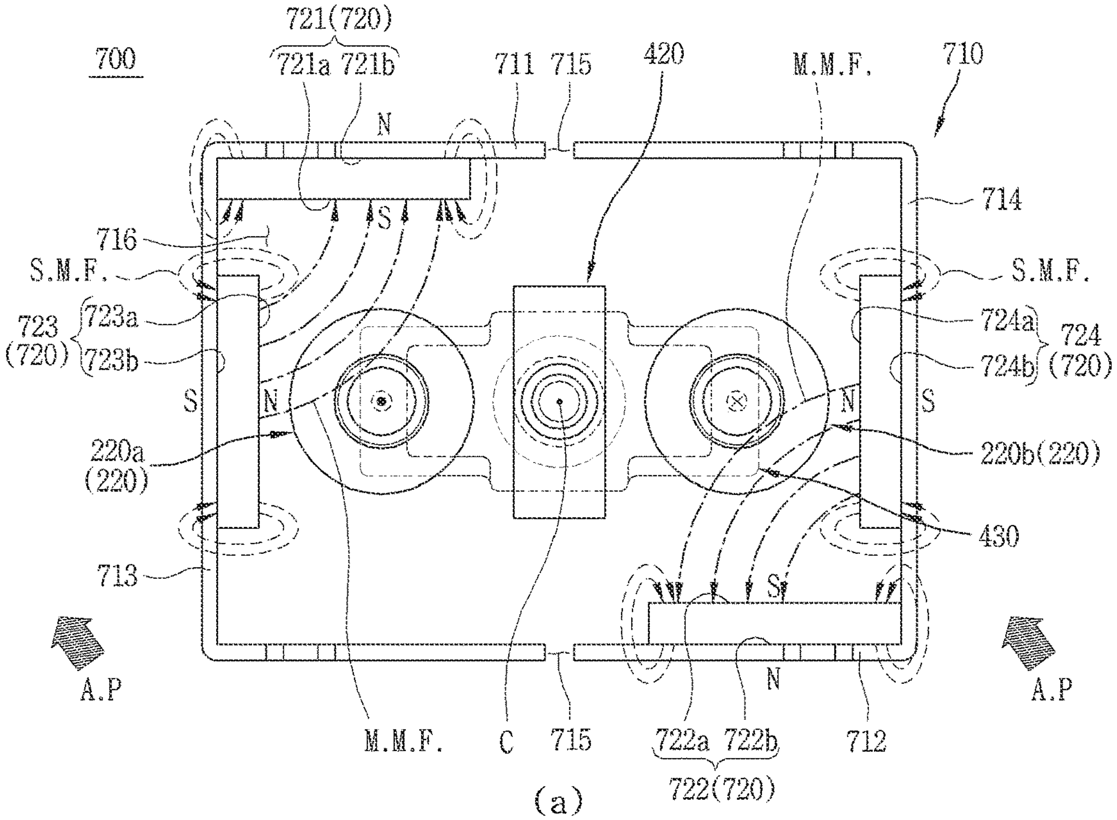
FIGS. 24 and 25 are conceptual views illustrating a state in which an arc path is formed by the arc path forming unit according to the implementation of FIG. 11.
Figure 24:
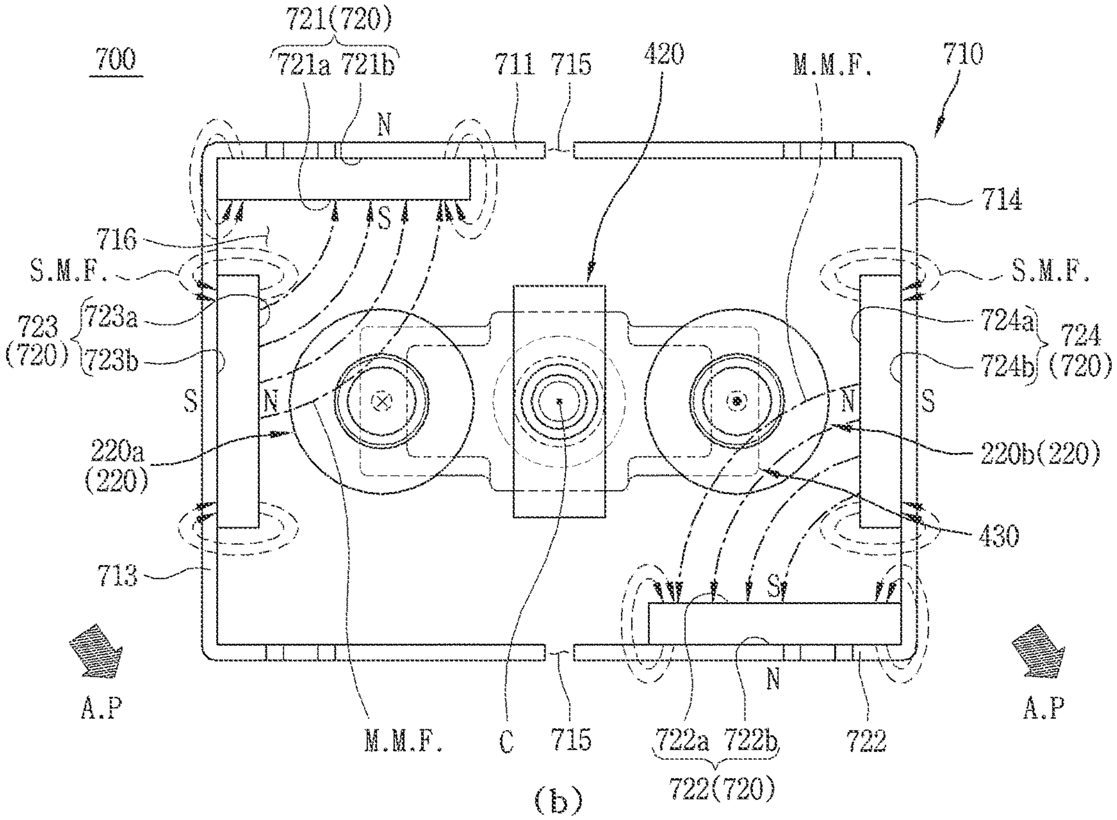
Figure 25:
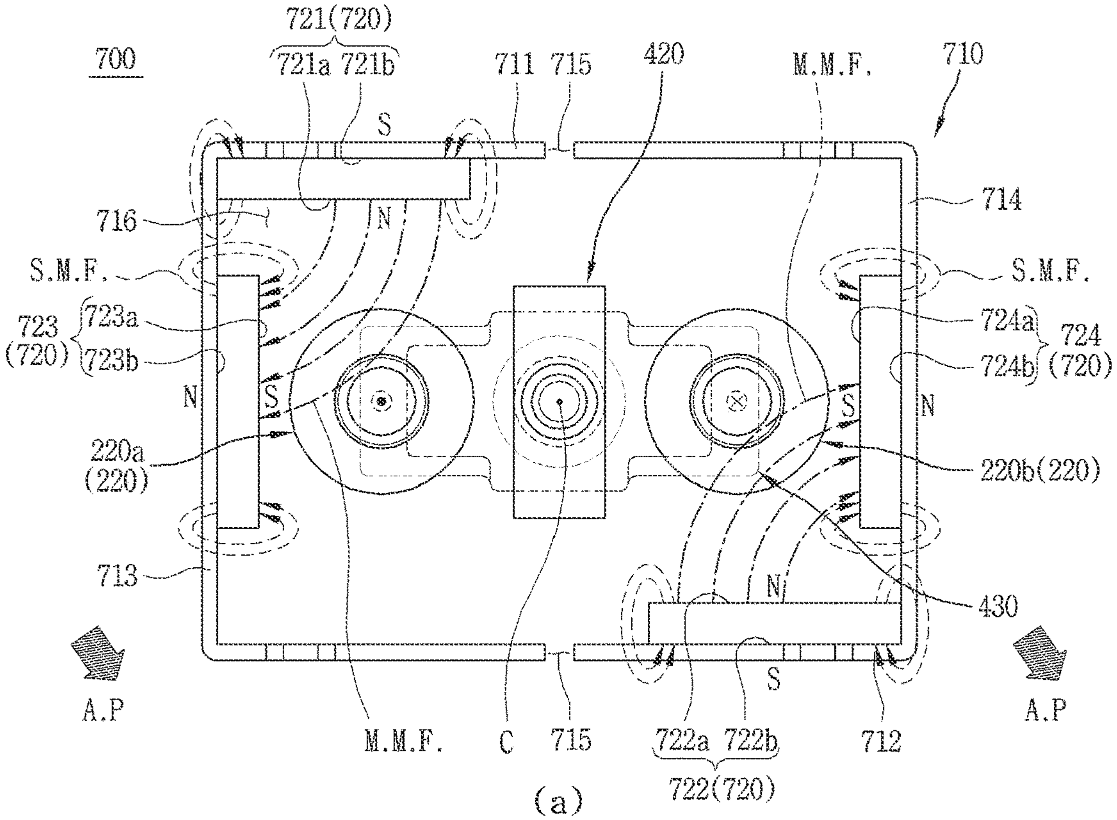
Figure 25:
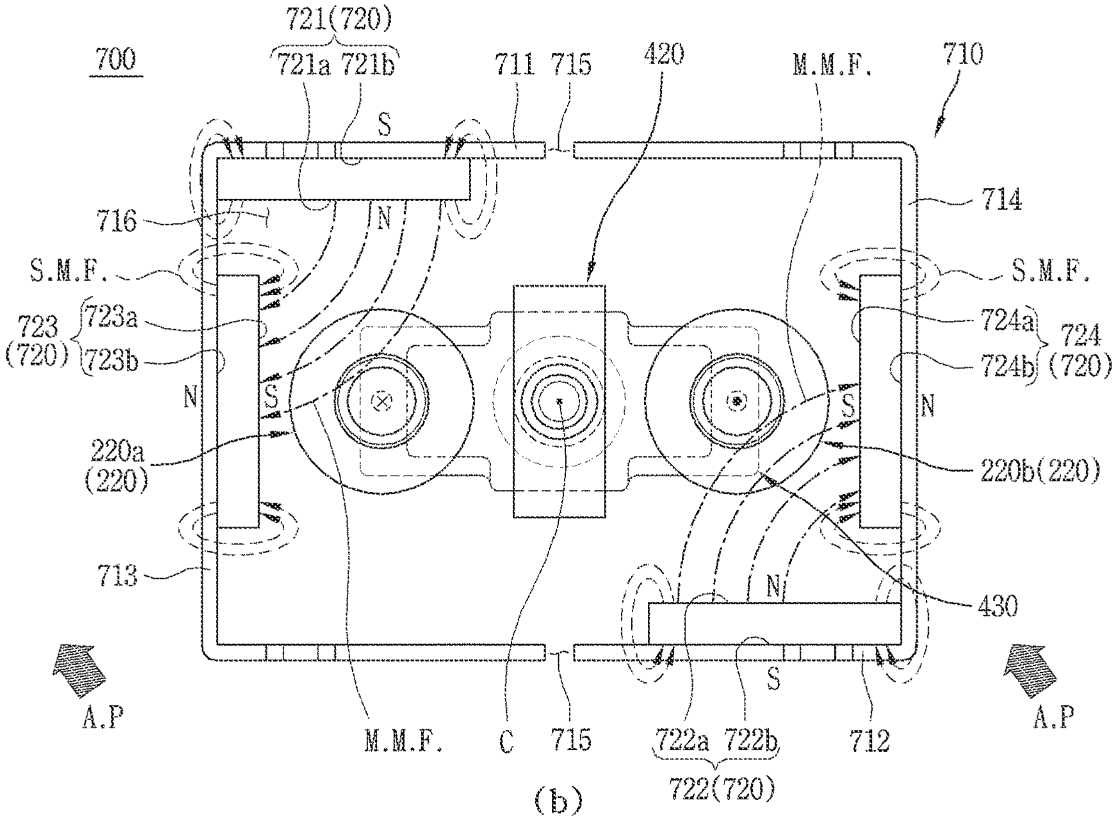

With regard to a flowing direction of current in (a) of FIG. 22, (a) of FIG. 23, (a) of FIG. 24, and (a) of FIG. 25, the current may flow into the second fixed contactor 220*b* and flow out through the first fixed contactor 220*a* via the movable contactor 430.

With regard to a flowing direction of current in (b) of FIG. 22, (b) of FIG. 23, (b) of FIG. 24, and (b) of FIG. 25, the current may flow into the first fixed contactor 220*a* and flow out through the second fixed contactor 220*b* via the movable contactor 430.

Referring to FIG. 22, the first facing surface 721*a* and the second facing surface 722*a* may be magnetized to the S pole. In addition, the third facing surface 723*a* and the fourth facing surface 724*a* may be magnetized to the N pole.

The process and direction in which the main magnetic field M.M.F and the sub magnetic field S.M.F are produced by the first magnet 721 and the fourth magnet 724 are the same as those in the previous implementation of FIG. 14.

Accordingly, in the implementation illustrated in (a) of FIG. 22, electromagnetic force may be generated near the second fixed contactor 220*b* in a direction toward the rear right. The arc path A.P may be formed toward the rear right in the direction of the electromagnetic force.

Similarly, in the implementation illustrated in (b) of FIG. 22, electromagnetic force may be generated near the second fixed contactor 220*b* in a direction toward the front left. The arc path A.P may be formed toward the front left in the direction of the electromagnetic force.

The process and direction in which the main magnetic field M.M.F and the sub magnetic field S.M.F are produced by the second magnet 722 and the third magnet 723 are the same as those in the previous implementation of FIG. 14.

Accordingly, in the implementation illustrated in (a) of FIG. 22, electromagnetic force may be generated near the first fixed contactor 220*a* in a direction toward the rear right. The arc path A.P may be formed toward the rear right in the direction of the electromagnetic force.

Similarly, in the implementation illustrated in (b) of FIG. 22, electromagnetic force may be generated near the first fixed contactor 220*a* in a direction toward the front left. The arc path A.P may be formed toward the front left in the direction of the electromagnetic force.

Accordingly, the arc path A.P of the generated arc cannot be formed toward the center region C. This can prevent components disposed at the center region C from being damaged.

Referring to FIG. 23, the first facing surface 721*a* and the second facing surface 722*a* may be magnetized to the N pole. In addition, the third facing surface 723*a* and the fourth facing surface 724*a* may be magnetized to the S pole.

The process and direction in which the main magnetic field M.M.F and the sub magnetic field S.M.F are produced by the first magnet 721 and the fourth magnet 724 are the same as those in the previous implementation of FIG. 15.

Accordingly, in the implementation illustrated in (a) of FIG. 23, electromagnetic force may be generated near the second fixed contactor 220*b* in a direction toward the front left. The arc path A.P may be formed toward the front left in the direction of the electromagnetic force.

Similarly, in the implementation illustrated in (b) of FIG. 23, electromagnetic force may be generated near the second fixed contactor 220*b* in a direction toward the rear right. The arc path A.P may be formed toward the rear right in the direction of the electromagnetic force.

The process and direction in which the main magnetic field M.M.F and the sub magnetic field S.M.F are produced by the second magnet 722 and the third magnet 723 are the same as those in the previous implementation of FIG. 15.

Accordingly, in the implementation illustrated in (a) of FIG. 23, electromagnetic force may be generated near the first fixed contactor 220*a* in a direction toward the front left. The arc path A.P may be formed toward the front left in the direction of the electromagnetic force.

Similarly, in the implementation illustrated in (b) of FIG. 23, electromagnetic force may be generated near the first fixed contactor 220*a* in a direction toward the rear right. The arc path A.P may be formed toward the rear right in the direction of the electromagnetic force.

Accordingly, the arc path A.P of the generated arc cannot be formed toward the center region C. This can prevent components disposed at the center region C from being damaged.

Referring to FIG. 24, the first facing surface 721*a* and the second facing surface 722*a* may be magnetized to the S pole. In addition, the third facing surface 723*a* and the fourth facing surface 724*a* may be magnetized to the N pole.

The process and direction in which the main magnetic field M.M.F and the sub magnetic field S.M.F are produced by the first magnet 721 and the third magnet 723 are the same as those in the previous implementation of FIG. 16.

Accordingly, in the implementation illustrated in (a) of FIG. 24, electromagnetic force may be generated near the first fixed contactor 220*a* in a direction toward the rear left. The arc path A.P may be formed toward the rear left in the direction of the electromagnetic force.

Similarly, in the implementation illustrated in (b) of FIG. 24, electromagnetic force may be generated near the first fixed contactor 220*a* in a direction toward the front right. The arc path A.P may be formed toward the front right in the direction of the electromagnetic force.

The process and direction in which the main magnetic field M.M.F and the sub magnetic field S.M.F are produced by the second magnet 722 and the fourth magnet 724 are the same as those in the previous implementation of FIG. 16.

Accordingly, in the implementation illustrated in (a) of FIG. 24, electromagnetic force may be generated near the second fixed contactor 220*b* in a direction toward the rear left. The arc path A.P may be formed toward the rear left in the direction of the electromagnetic force.

Similarly, in the implementation illustrated in (b) of FIG. 24, electromagnetic force may be generated near the second fixed contactor 220*b* in a direction toward the front right. The arc path A.P may be formed toward the front right in the direction of the electromagnetic force.

Accordingly, the arc path A.P of the generated arc cannot be formed toward the center region C. This can prevent components disposed at the center region C from being damaged.

Referring to FIG. 25, the first facing surface 721*a* and the second facing surface 722*a* may be magnetized to the N pole. In addition, the third facing surface 723*a* and the fourth facing surface 724*a* may be magnetized to the S pole.

The process and direction in which the main magnetic field M.M.F and the sub magnetic field S.M.F are produced by the first magnet 721 and the third magnet 723 are the same as those in the previous implementation of FIG. 17.

Accordingly, in the implementation illustrated in (a) of FIG. 25, electromagnetic force may be generated near the first fixed contactor 220*a* in a direction toward the front right. The arc path A.P may be formed toward the front right in the direction of the electromagnetic force.

Similarly, in the implementation illustrated in (b) of FIG. 25, electromagnetic force may be generated near the first fixed contactor 220*a* in a direction toward the rear left. The arc path A.P may be formed toward the rear left in the direction of the electromagnetic force.

The process and direction in which the main magnetic field M.M.F and the sub magnetic field S.M.F are produced by the second magnet 722 and the fourth magnet 724 are the same as those in the previous implementation of FIG. 17.

Accordingly, in the implementation illustrated in (a) of FIG. 25, electromagnetic force may be generated near the second fixed contactor 220*b* in a direction toward the front right. The arc path A.P may be formed toward the front right in the direction of the electromagnetic force.

Similarly, in the implementation illustrated in (b) of FIG. 25, electromagnetic force may be generated near the second fixed contactor 220*b* in a direction toward the rear left. The arc path A.P may be formed toward the rear left in the direction of the electromagnetic force.

Accordingly, the arc path A.P of the generated arc cannot be formed toward the center region C. This can prevent components disposed at the center region C from being damaged.

In this implementation, the first magnet 721 may be disposed much closer to the third magnet 723 or the fourth magnet 724 compared to the previous implementation. The second magnet 722 may also be disposed much closer to the third magnet 723 or the fourth magnet 724.

This can further strengthen a magnetic field produced between the first magnet 721 and the third magnet 723 or the fourth magnet 724 and a magnetic field produced between the second magnet 722 and the third magnet 723 or the fourth magnet 724.

(4) Description of Arc Path A.P Formed by Arc Path Forming Unit 800 According to Still Another Implementation Hereinafter, an arc path A.P generated by the arc path forming unit 800 according to still another implementation will be described in detail, with reference to FIGS. 26 to 29.

Figure 26:
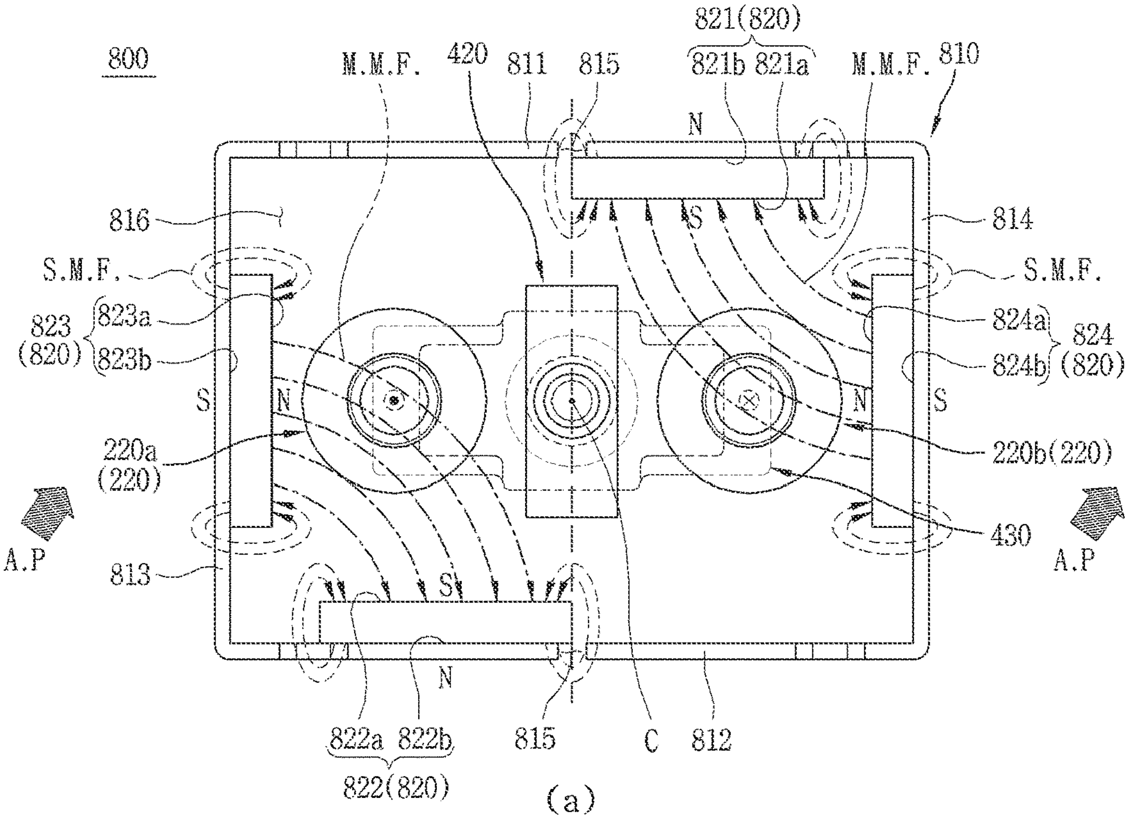
FIGS. 26 and 27 are conceptual views illustrating a state in which an arc path is formed by the arc path forming unit according to the implementation of FIG. 12.
Figure 26:
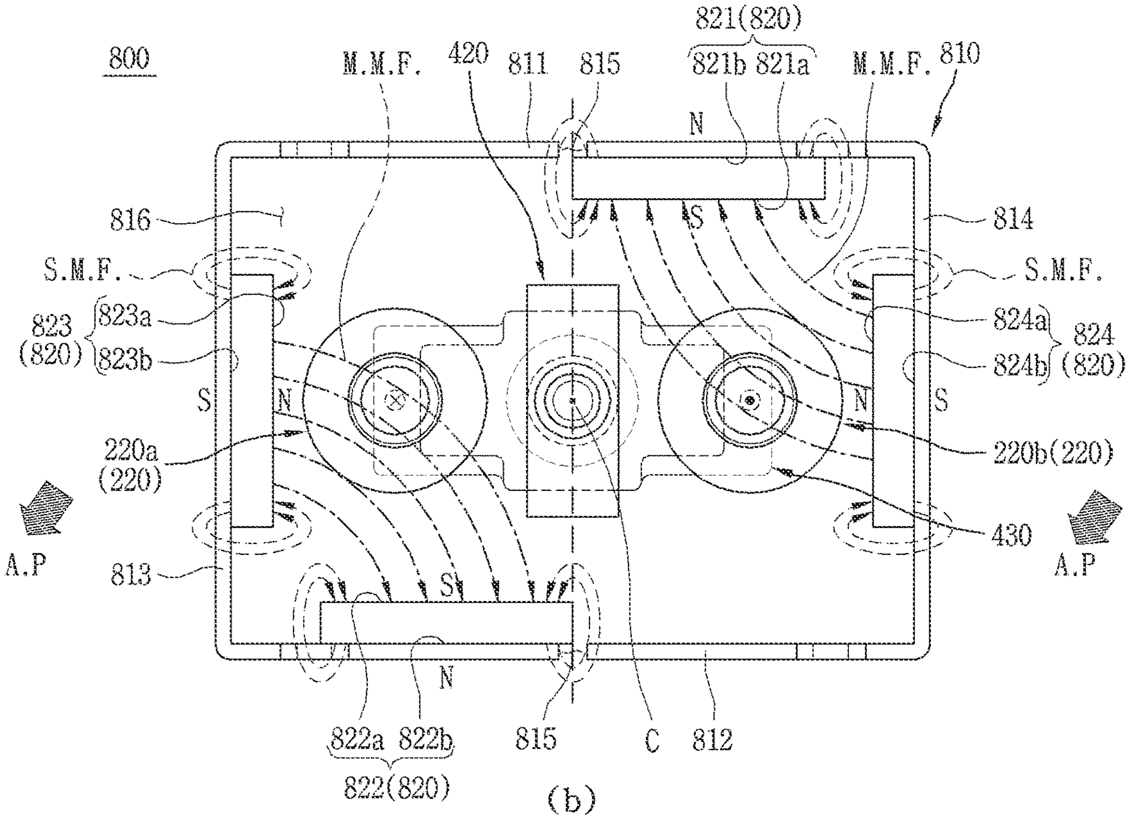
Figure 27:
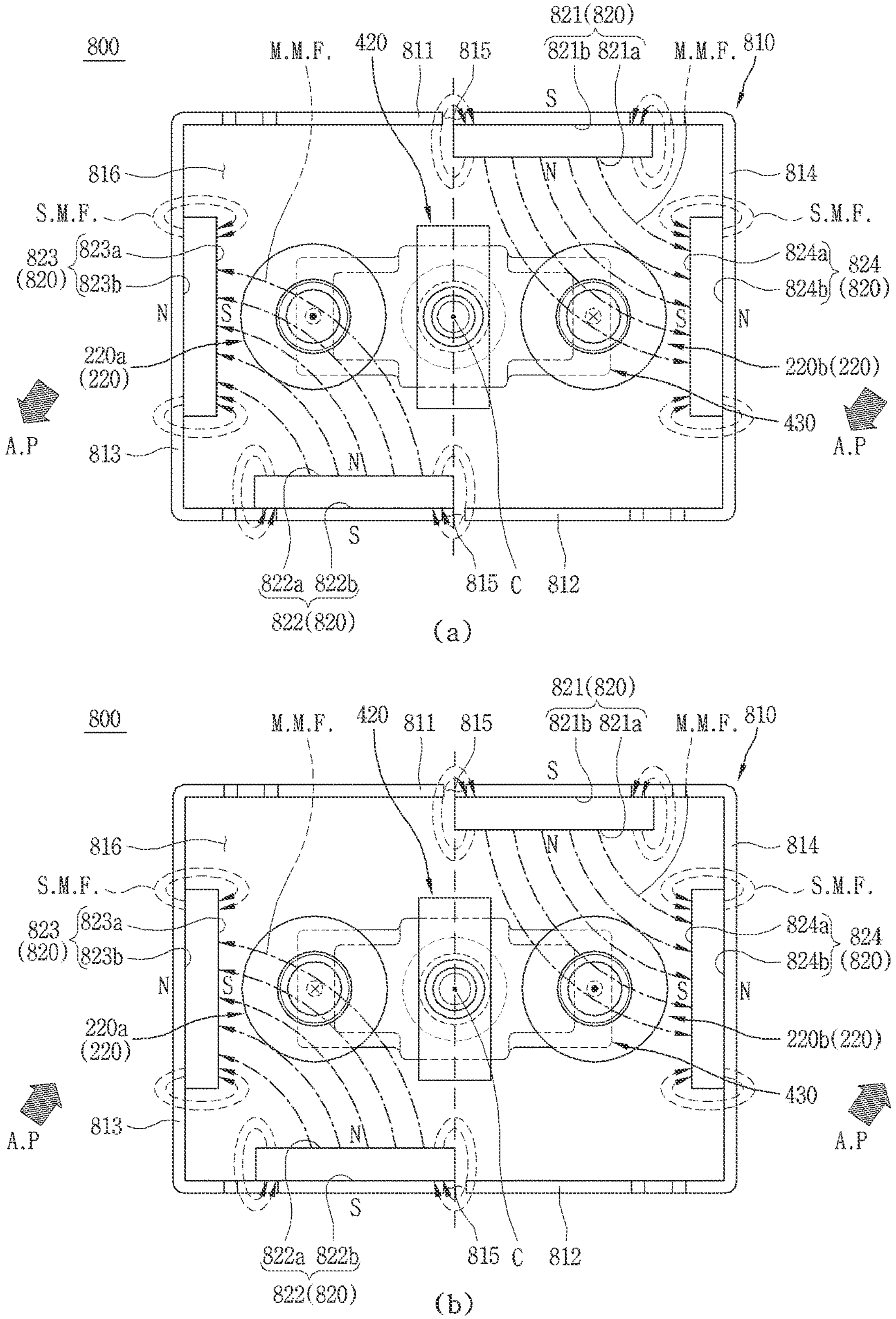
Figure 28:
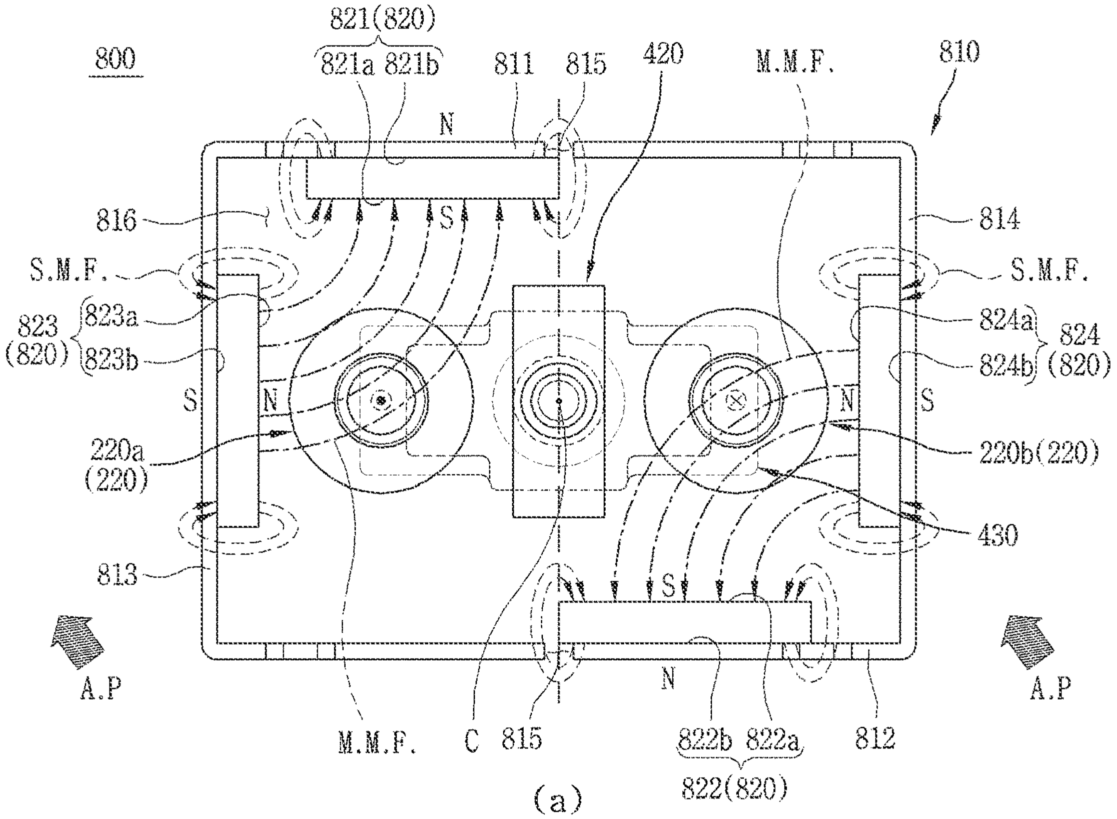
FIGS. 28 and 29 are conceptual views illustrating a state in which an arc path is formed by the arc path forming unit according to the implementation of FIG. 13.
Figure 28:
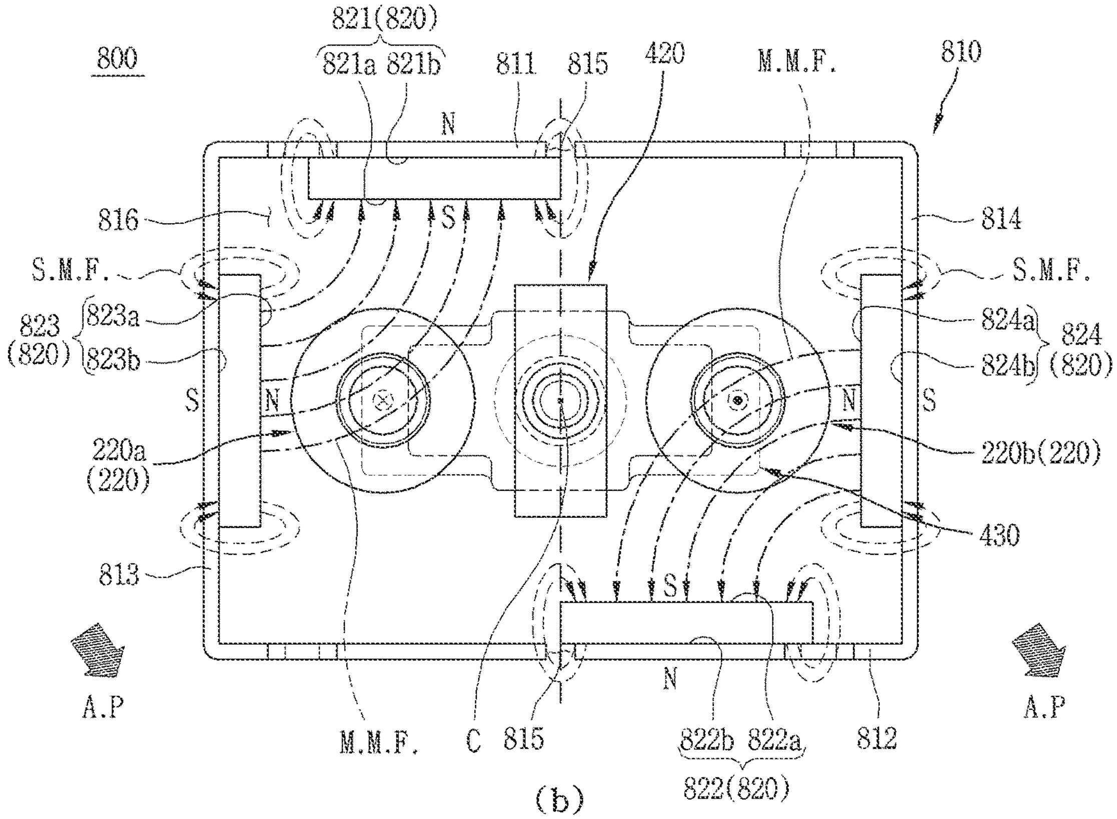
Figure 29:
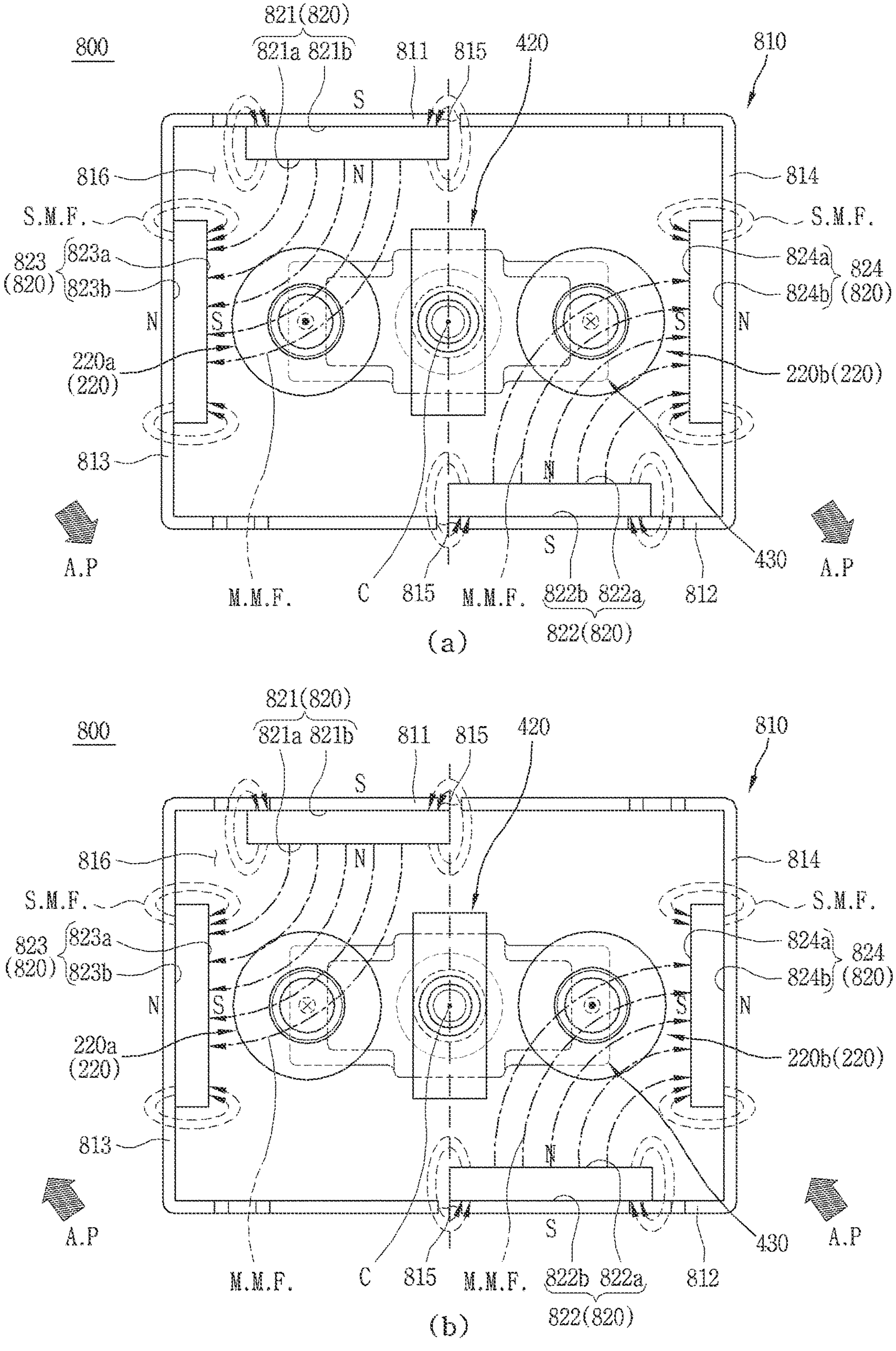

With regard to a flowing direction of current in (a) of FIG. 26, (a) of FIG. 27, (a) of FIG. 28, and (a) of FIG. 29, the current may flow into the second fixed contactor 220*b* and flow out through the first fixed contactor 220*a* via the movable contactor 430.

With regard to a flowing direction of current in (b) of FIG. 26, (b) of FIG. 27, (b) of FIG. 28, and (b) of FIG. 29, the current may flow into the first fixed contactor 220*a* and flow out through the second fixed contactor 220*b* via the movable contactor 430.

Referring to FIG. 26, the first facing surface 821*a* and the second facing surface 822*a* may be magnetized to the S pole. In addition, the third facing surface 823*a* and the fourth facing surface 824*a* may be magnetized to the N pole.

The process and direction in which the main magnetic field M.M.F and the sub magnetic field S.M.F are produced by the first magnet 821 and the fourth magnet 824 are the same as those in the previous implementation of FIG. 14.

Accordingly, in the implementation illustrated in (a) of FIG. 26, electromagnetic force may be generated near the second fixed contactor 220*b* in a direction toward the rear right. The arc path A.P may be formed toward the rear right in the direction of the electromagnetic force.

Similarly, in the implementation illustrated in (b) of FIG. 26, electromagnetic force may be generated near the second fixed contactor 220*b* in a direction toward the front left. The arc path A.P may be formed toward the front left in the direction of the electromagnetic force.

The process and direction in which the main magnetic field M.M.F and the sub magnetic field S.M.F are produced by the second magnet 822 and the third magnet 823 are the same as those in the previous implementation of FIG. 14.

Accordingly, in the implementation illustrated in (a) of FIG. 26, electromagnetic force may be generated near the first fixed contactor 220*a* in a direction toward the rear right. The arc path A.P may be formed toward the rear right in the direction of the electromagnetic force.

Similarly, in the implementation illustrated in (b) of FIG. 26, electromagnetic force may be generated near the first fixed contactor 220*a* in a direction toward the front left. The arc path A.P may be formed toward the front left in the direction of the electromagnetic force.

Accordingly, the arc path A.P of the generated arc cannot be formed toward the center region C. This can prevent components disposed at the center region C from being damaged.

Referring to FIG. 27, the first facing surface 821*a* and the second facing surface 822*a* may be magnetized to the N pole. In addition, the third facing surface 823*a* and the fourth facing surface 824*a* may be magnetized to the S pole.

The process and direction in which the main magnetic field M.M.F and the sub magnetic field S.M.F are produced by the first magnet 821 and the fourth magnet 824 are the same as those in the previous implementation of FIG. 15.

Accordingly, in the implementation illustrated in (a) of FIG. 27, electromagnetic force may be generated near the second fixed contactor 220*b* in a direction toward the front left. The arc path A.P may be formed toward the front left in the direction of the electromagnetic force.

Similarly, in the implementation illustrated in (b) of FIG. 27, electromagnetic force may be generated near the second fixed contactor 220*b* in a direction toward the rear right. The arc path A.P may be formed toward the rear right in the direction of the electromagnetic force.

The process and direction in which the main magnetic field M.M.F and the sub magnetic field S.M.F are produced by the second magnet 822 and the third magnet 823 are the same as those in the previous implementation of FIG. 15.

Accordingly, in the implementation illustrated in (a) of FIG. 27, electromagnetic force may be generated near the first fixed contactor 220*a* in a direction toward the front left. The arc path A.P may be formed toward the front left in the direction of the electromagnetic force.

Similarly, in the implementation illustrated in (b) of FIG. 27, electromagnetic force may be generated near the first fixed contactor 220*a* in a direction toward the rear right. The arc path A.P may be formed toward the rear right in the direction of the electromagnetic force.

Accordingly, the arc path A.P of the generated arc cannot be formed toward the center region C. This can prevent components disposed at the center region C from being damaged.

Referring to FIG. 28, the first facing surface 821*a* and the second facing surface 822*a* may be magnetized to the S pole. In addition, the third facing surface 823*a* and the fourth facing surface 824*a* may be magnetized to the N pole.

The process and direction in which the main magnetic field M.M.F and the sub magnetic field S.M.F are produced by the first magnet 821 and the third magnet 823 are the same as those in the previous implementation of FIG. 16.

Accordingly, in the implementation illustrated in (a) of FIG. 28, electromagnetic force may be generated near the first fixed contactor 220*a* in a direction toward the rear left. The arc path A.P may be formed toward the rear left in the direction of the electromagnetic force.

Similarly, in the implementation illustrated in (b) of FIG. 28, electromagnetic force may be generated near the first fixed contactor 220*a* in a direction toward the front right. The arc path A.P may be formed toward the front right in the direction of the electromagnetic force.

The process and direction in which the main magnetic field M.M.F and the sub magnetic field S.M.F are produced by the second magnet 822 and the fourth magnet 824 are the same as those in the previous implementation of FIG. 16.

Accordingly, in the implementation illustrated in (a) of FIG. 28, electromagnetic force may be generated near the second fixed contactor 220*b* in a direction toward the rear left. The arc path A.P may be formed toward the rear left in the direction of the electromagnetic force.

Similarly, in the implementation illustrated in (b) of FIG. 28, electromagnetic force may be generated near the second fixed contactor 220*b* in a direction toward the front right. The arc path A.P may be formed toward the front right in the direction of the electromagnetic force.

Accordingly, the arc path A.P of the generated arc cannot be formed toward the center region C. This can prevent components disposed at the center region C from being damaged.

Referring to FIG. 29, the first facing surface 821*a* and the second facing surface 822*a* may be magnetized to the N pole. In addition, the third facing surface 823*a* and the fourth facing surface 824*a* may be magnetized to the S pole.

The process and direction in which the main magnetic field M.M.F and the sub magnetic field S.M.F are produced by the first magnet 821 and the third magnet 823 are the same as those in the previous implementation of FIG. 17.

Accordingly, in the implementation illustrated in (a) of FIG. 29, electromagnetic force may be generated near the first fixed contactor 220*a* in a direction toward the front right. The arc path A.P may be formed toward the front right in the direction of the electromagnetic force.

Similarly, in the implementation illustrated in (b) of FIG. 29, electromagnetic force may be generated near the first fixed contactor 220*a* in a direction toward the rear left. The arc path A.P may be formed toward the rear left in the direction of the electromagnetic force.

The process and direction in which the main magnetic field M.M.F and the sub magnetic field S.M.F are produced by the second magnet 822 and the fourth magnet 824 are the same as those in the previous implementation of FIG. 17.

Accordingly, in the implementation illustrated in (a) of FIG. 29, electromagnetic force may be generated near the second fixed contactor 220*b* in a direction toward the front right. The arc path A.P may be formed toward the front right in the direction of the electromagnetic force.

Similarly, in the implementation illustrated in (b) of FIG. 29, electromagnetic force may be generated near the second fixed contactor 220*b* in a direction toward the rear left. The arc path A.P may be formed toward the rear left in the direction of the electromagnetic force.

Accordingly, the arc path A.P of the generated arc cannot be formed toward the center region C. This can prevent components disposed at the center region C from being damaged.

The arc path forming unit 500, 600, 700, 800 according to each implementation may produce a magnetic field. The magnetic field may allow electromagnetic force to be generated in a direction away from the center region C.

An arc generated when the fixed contactor 220 and the movable contactor 430 are separated from each other may move along an arc path A.P formed along the electromagnetic force. Therefore, the generated arc can move away from the center region C.

This can prevent various components of the DC relay 10 disposed at the center region C from being damaged due to the generated arc.

Although the foregoing description has been given with reference to the preferred implementations of the present disclosure, it will be understood that those skilled in the art are able to variously modify and change the present disclosure without departing from the spirit and scope of the invention described in the claims below.

10: DC relay
100: Frame part
110: Upper frame
120: Lower frame
130: Insulating plate
140: Supporting plate
200: Opening/closing part
210: Arc chamber
220: Fixed contactor
220*a*: First fixed contactor
220*b*: Second fixed contactor
230: Sealing member
300: Core part
310: Fixed core
320: Movable core
330: York
340: Bobbin
350: Coil
360: Return spring
370: Cylinder
400: Movable contactor part
410: Housing
420: Cover
430: Movable contactor
440: Shaft
450: Elastic portion
500: Arc path forming unit according to one implementation
510: Magnet frame
511: First surface
512: Second surface
513: Third surface
514: Fourth surface
515: Arc discharge opening
516: Space portion
520: Magnet
521: First magnet
521*a*: First facing surface
521*b*: First opposing surface
522: Second magnet
522*a*: Second facing surface
522*b*: Second opposing surface
523: Third magnet
523*a*: Third facing surface
523*b*: Third opposing surface
524: Fourth magnet
524*a*: Fourth facing surface
524*b*: Fourth opposing surface
600: Arc path forming unit according to another implementation
610: Magnet frame
611: First surface
612: Second surface
613: Third surface
614: Fourth surface
615: Arc discharge opening
616: Space portion
620: Magnet
621: First magnet
621*a*: First facing surface
621*b*: First opposing surface
622: Second magnet
622*a*: Second facing surface
622*b*: Second opposing surface
623: Third magnet
623*a*: Third facing surface
623*b*: Third opposing surface
624: Fourth magnet
624*a*: Fourth facing surface
624*b*: Fourth opposing surface
700: Arc path forming unit according to still another implementation
710: Magnet frame
711: First surface
712: Second surface
713: Third surface
714: Fourth surface
715: Arc discharge opening
716: Space portion
720: Magnet
721: First magnet
721*a*: First facing surface
721*b*: First opposing surface
722: Second magnet
722*a*: Second facing surface
722*b*: Second opposing surface
723: Third magnet
723*a*: Third facing surface
723*b*: Third opposing surface
724: Fourth magnet
724*a*: Fourth facing surface
724*b*: Fourth opposing surface
800: Arc path forming unit according to still another implementation
810: Magnet frame

811: First surface
812: Second surface
813: Third surface
814: Fourth surface
815: Arc discharge opening
816: Space portion
820: Magnet
821: First magnet
821*a*: First facing surface
821*b*: First opposing surface
822: Second magnet
822*a*: Second facing surface
822*b*: Second opposing surface
823: Third magnet
823*a*: Third facing surface
823*b*: Third opposing surface
824: Fourth magnet
824*a*: Fourth facing surface
824*b*: Fourth opposing surface
1000: DC relay according to the related art
1100: Fixed contact according to the related art
1200: Movable contact according to the related art
1300: Permanent magnet according to the related art
1310: First permanent magnet according to the related art
1320: Second permanent magnet according to the related art
C: Center region of space portion 516, 616, 716, 816
M.M.F: Main magnetic field
S.M.F: Sub magnetic field
A. P: Arc path

The invention claimed is:

1. An arc path forming unit, comprising:

a magnet frame having an inner space, and comprising a plurality of surfaces surrounding the inner space; and magnets coupled to the plurality of surfaces to form magnetic fields in the inner space, wherein the plurality of surfaces comprises:

a first surface extending in one direction; and a second surface disposed to face the first surface and extending in the one direction, wherein an arc discharge opening is formed at a middle portion of each of the first surface and the second surface in a longitudinal direction that respectively divides the first surface into a first side and a second side, and the second surface into a third side and a fourth side, wherein the third side is opposite to the first side and the fourth side is opposite to the second side, wherein the magnets comprise:

a first magnet located on one the first side of the first surface, wherein the second side of the first surface is free of magnets; surface in the extending direction; and a second magnet located on another the fourth side of the second surface, wherein the third side of the second surface is free of magnets, surface in the extending direction, another side being opposite to the one side, wherein a first facing surface of the first magnet diagonally facing the second magnet and a second facing surface of the second magnet diagonally facing the first magnet have a same polarity. polarity; and wherein an arc discharge opening is formed at a middle portion of each of the first surface and the second surface in a longitudinal direction.

2. The arc path forming unit of claim 1, wherein the plurality of surfaces comprise:

a third surface extending between one end portion of the first surface and one end portion of the second surface in the extending direction at predetermined angles with the first surface and the second surface; and a fourth surface extending between another end portion of the first surface and another end portion of the second surface in the extending direction at predetermined angles with the first surface and the second surface, the fourth surface facing the third surface, wherein the magnets comprise:

a third magnet located on the third surface; and a fourth magnet located on the fourth surface and disposed to face the third magnet, and wherein a facing surface of the third magnet facing the fourth magnet and a facing surface of the fourth magnet facing the third magnet have a same polarity.

3. The arc path forming unit of claim 2, wherein a polarity of the facing surfaces of the first magnet and the second magnet is different from a polarity of the facing surfaces of the third magnet and the fourth magnet.

4. The arc path forming unit of claim 3, wherein the facing surfaces of the first magnet and the second magnet have an S pole, and wherein the facing surfaces of the third magnet and the fourth magnet have an N pole.

5. The arc path forming unit of claim 3, wherein the first magnet is disposed closer to the third surface than to the fourth surface, and wherein the second magnet is disposed closer to the fourth surface than to the third surface.

6. The arc path forming unit of claim 3, wherein the third magnet is disposed closer to the first surface than to the second surface, and wherein the fourth magnet is disposed closer to the second surface than to the first surface.

7. The arc path forming unit of claim 3, wherein the first magnet is disposed to be in contact with the third surface, and wherein the second magnet is disposed to be in contact with the fourth surface.

8. The arc path forming unit of claim 3, wherein fixed contactors and a movable contactor configured to be brought into contact with or separated from the fixed contactors are accommodated in the inner space, and wherein the fixed contactors comprise a first fixed contactor located at one side in the extending direction and a second fixed contactor located at another side in the extending direction, and wherein the first magnet and the second magnet are disposed such that an imaginary line connecting one end portion of the first magnet facing another side of the first surface opposite to the one side in the extending direction and one end portion of the second magnet facing another side of the second surface opposite to the one side in the extending direction passes through a center of the inner space as a point where vertical distances to the first surface and the second surface are equivalent to one another and vertical distances to the third surface and the fourth surface are equivalent to one another.

9. The arc path forming unit of claim 3, wherein the first magnet is disposed closer to the fourth surface than to the third surface, and wherein the second magnet is disposed closer to the third surface than to the fourth surface.

10. The arc path forming unit of claim 3, wherein the third magnet is disposed closer to the second surface than the first surface, and wherein the fourth magnet is disposed closer to the first surface than the second surface.

11. The arc path forming unit of claim 3, wherein the first magnet is disposed to be in contact with the fourth surface, and wherein the second magnet is disposed to be in contact with the third surface.

12. The arc path forming unit of claim 1, wherein fixed contactors extending in the one direction and a movable contactor configured to be brought into contact with or separated from the fixed contactors are accommodated in the inner space, and wherein the fixed contactors comprise a first fixed contactor located at one side in the extending direction and a second fixed contactor located at another side in the extending direction, and wherein the first magnet and the second magnet are disposed such that an imaginary line connecting the first magnet and the second magnet intersects with an imaginary line connecting the first fixed contactor and the second fixed contactor.

13. The arc path forming unit of claim 12, wherein the first magnet and the second magnet are disposed such that the imaginary line connecting the first magnet and the second magnet intersects with the imaginary line connecting the first fixed contactor and the second fixed contactor at a point where the first magnet and the second magnet are spaced apart by a given distance, respectively, from the first fixed contactor to the second fixed contactor.

14. A direct current relay, comprising:

a fixed contactor extending in one direction;

a movable contactor configured to be brought into contact with or separated from the fixed contactor;

an arc path forming unit having an inner space for accommodating the fixed contactor and the movable contactor, and configured to produce a magnetic field in the inner space so as to form a discharge path of an arc generated when the fixed contactor and the movable contactor are separated from each other, wherein the arc path forming unit comprises:

a magnet frame having an inner space, and comprising a plurality of surfaces surrounding the inner space; and magnets coupled to the plurality of surfaces, wherein the plurality of surfaces comprises:

a first surface extending in one direction; and a second surface disposed to face the first surface and extending in the one direction, wherein an arc discharge opening is formed at a middle portion of each of the first surface and the second surface in a longitudinal direction that respectively divides the first surface into a first side and a second side, and the second surface into a third side and a fourth side, wherein the third side is opposite to the first side and the fourth side is opposite to the second side, wherein the magnets comprise:

a first magnet located on one the first side of the first surface, wherein the second side of the first surface is free of magnets; surface in the extending direction; and a second magnet located on another the fourth side of the second surface, wherein the third side of the second surface is free of magnets, surface in the extending direction, another side being opposite to the one side, wherein a first facing surface of the first magnet diagonally facing the second magnet and a second facing surface of the second magnet diagonally facing the first magnet have a same polarity. polarity; and wherein an arc discharge opening is formed at a middle portion of each of the first surface and the second surface in a longitudinal direction.

15. The direct current relay of claim 14, wherein the plurality of surfaces comprise:

a third surface extending between the first surface and the second surface at predetermined angles with the first surface and the second surface; and a fourth surface extending between the first surface and the second surface at predetermined angles with the first surface and the second surface, and facing the third surface, wherein the magnets comprise:

a third magnet located on the third surface; and a fourth magnet located on the fourth surface and facing the third magnet, wherein a facing surface of the third magnet facing the fourth magnet and a facing surface of the fourth magnet facing the third magnet have a same polarity, and wherein the facing surfaces of the first magnet and the second magnet have a different polarity from that of the facing surfaces of the third magnet and the fourth magnet.

16. The direct current relay of claim 15, wherein the third magnet is disposed closer to the first surface than to the second surface, and wherein the fourth magnet is disposed closer to the second surface than to the first surface.

17. The direct current relay of claim 15, wherein the first magnet is disposed to be in contact with the third surface, and wherein the second magnet is disposed closer to the fourth surface than to the third surface.

18. The direct current relay of claim 15, wherein the fixed contactors comprise a first fixed contactor located at one side in the extending direction and a second fixed contactor located at another side in the extending direction, and wherein the first magnet and the second magnet are disposed such that an imaginary line connecting one end portion of the first magnet facing another side of the first surface opposite to the one side in the extending direction and one end portion of the second magnet facing another side of the second surface opposite to the one side in the extending direction passes through a center of the inner space as a point where vertical distances to the first surface and the second surface are equivalent to one another and vertical distances to the third surface and the fourth surface are equivalent to one another.

19. The direct current relay of claim 15, wherein the third magnet is disposed closer to the second surface than to the first surface, and wherein the fourth magnet is disposed closer to the first surface than to the second surface.

20. The direct current relay of claim 15, wherein the first magnet is disposed to be in contact with the fourth surface, and wherein the second magnet is disposed closer to the third surface than to the fourth surface.

* * * * *